US012521483B2

(12) United States Patent
Spohn et al.

(10) Patent No.: US 12,521,483 B2
(45) Date of Patent: Jan. 13, 2026

(54) SYRINGE ROLLING APPARATUS AND METHOD

(71) Applicant: BAYER HEALTHCARE LLC, Whippany, NJ (US)

(72) Inventors: Michael Spohn, Fenelton, PA (US); Kevin Cowan, Allison Park, PA (US)

(73) Assignee: BAYER HEALTHCARE LLC, Whippany, NJ (US)

( * ) Notice: Subject to any disclaimer, the term of this patent is extended or adjusted under 35 U.S.C. 154(b) by 1466 days.

(21) Appl. No.: 16/970,722

(22) PCT Filed: Feb. 18, 2019

(86) PCT No.: PCT/US2019/018404
§ 371 (c)(1),
(2) Date: Aug. 18, 2020

(87) PCT Pub. No.: WO2019/161327
PCT Pub. Date: Aug. 22, 2019

(65) Prior Publication Data
US 2021/0030950 A1 Feb. 4, 2021

Related U.S. Application Data

(60) Provisional application No. 62/632,026, filed on Feb. 19, 2018.

(51) Int. Cl.
*A61M 5/145* (2006.01)
*A61M 5/24* (2006.01)
(Continued)

(52) U.S. Cl.
CPC .... *A61M 5/14586* (2013.01); *A61M 5/14546* (2013.01); *A61M 5/2425* (2013.01);
(Continued)

(58) Field of Classification Search
CPC ............... A61M 5/007; A61M 5/2425; A61M 5/14546; A61M 5/1452; A61M 5/145;
(Continued)

(56) References Cited

U.S. PATENT DOCUMENTS 352,715 A 11/1886 Sandmark
798,093 A 8/1905 Edward
(Continued)

FOREIGN PATENT DOCUMENTS

CN 103917269 A 7/2014
EP 1086661 A2 3/2001
(Continued)

OTHER PUBLICATIONS

"International Preliminary Report on Patentability from PCT Application No. PCT/US2019/018404", Sep. 3, 2020.

*Primary Examiner* — Kevin C Sirmons
*Assistant Examiner* — Antarius S Daniel
(74) *Attorney, Agent, or Firm* — Joseph L. Kent; Alexandria Quezada; James R. Stevenson

(57) ABSTRACT

A syringe rolling apparatus for initial rolling of a rolling diaphragm syringe from an unrolled state to a rolled state has a pressure jacket configured for receiving an empty, unrolled rolling diaphragm syringe, a piston reciprocally movable within the pressure jacket and configured for contacting an end wall of the syringe rolling diaphragm syringe to initiate a rolling of a flexible sidewall of the rolling diaphragm syringe, and a seal assembly configured for engaging an open discharge neck of the rolling diaphragm syringe. The seal assembly is in fluid communication with a source of pressurized fluid to pressurize an interior of the rolling diaphragm syringe during a distal movement of the piston. A method for initial rolling of a rolling diaphragm syringe from an unrolled state to a rolled state is also disclosed.

11 Claims, 24 Drawing Sheets

(51) Int. Cl.
*A61M 5/00* (2006.01)
*A61M 5/14* (2006.01)

(52) U.S. Cl.
CPC ........... *A61M 5/007* (2013.01); *A61M 5/1408* (2013.01); *A61M 2005/14553* (2013.01); *A61M 2205/0222* (2013.01); *A61M 2205/3327* (2013.01); *A61M 2205/36* (2013.01)

(58) Field of Classification Search
CPC .......... A61M 5/14593; A61M 5/14586; A61M 2005/14553; A61M 2005/14204; A61M 5/155; A61M 5/2046; A61M 2205/8218–8231; A61J 1/067; A61J 1/10
See application file for complete search history.

(56) References Cited

U.S. PATENT DOCUMENTS

| | | |
|---|---|---|
| 937,029 A | 10/1909 | Blessing et al. |
| 2,514,575 A | 7/1950 | Hein et al. |
| 2,667,163 A | 1/1954 | Smith |
| 2,667,164 A | 1/1954 | Smith |
| 2,667,165 A | 1/1954 | Smith |
| 2,667,872 A | 2/1954 | Smith |
| 2,672,866 A | 3/1954 | Kater |
| 2,673,561 A | 3/1954 | Peterson, Jr. |
| 2,688,963 A | 9/1954 | Smith |
| 2,688,964 A | 9/1954 | Smith |
| 2,690,179 A | 9/1954 | Fox |
| 2,717,598 A | 9/1955 | Krasno |
| 2,805,662 A | 9/1957 | Lawshe et al. |
| 2,911,972 A | 11/1959 | Elinger |
| 2,935,067 A | 5/1960 | Bouet |
| 2,950,717 A | 8/1960 | Bonet |
| 3,155,281 A | 11/1964 | Stracey |
| 3,161,194 A | 12/1964 | Chapman |
| 3,161,195 A | 12/1964 | Taylor et al. |
| 3,172,577 A | 3/1965 | Hartung |
| 3,190,619 A | 6/1965 | Penney et al. |
| 3,231,139 A | 1/1966 | Bouet |
| 3,301,293 A | 1/1967 | Santelli |
| 3,340,869 A | 9/1967 | Bane |
| 3,390,821 A | 7/1968 | Mullan |
| 3,411,503 A | 11/1968 | Santomieri |
| 3,442,424 A | 5/1969 | Prussin et al. |
| 3,471,058 A | 10/1969 | Latham et al. |
| 3,473,524 A | 10/1969 | Drewe |
| 3,474,844 A | 10/1969 | Lindstrom et al. |
| 3,506,163 A | 4/1970 | Rauh et al. |
| 3,557,788 A | 1/1971 | Swartz |
| 3,613,963 A | 10/1971 | Berkmuller |
| 3,618,846 A | 11/1971 | Poli |
| 3,826,409 A | 7/1974 | Chilcoate |
| 3,873,003 A | 3/1975 | Seiferth et al. |
| 3,938,514 A | 2/1976 | Boucher |
| 4,035,461 A | 7/1977 | Korth |
| 4,044,836 A | 8/1977 | Martin et al. |
| 4,064,879 A | 12/1977 | Leibinsohn |
| 4,066,080 A | 1/1978 | Sneider |
| 4,131,217 A | 12/1978 | Sandegren |
| 4,136,802 A | 1/1979 | Mascia et al. |
| 4,171,698 A | 10/1979 | Genese |
| 4,349,129 A | 9/1982 | Amneus |
| 4,392,491 A | 7/1983 | Takasugi et al. |
| 4,411,656 A | 10/1983 | Cornett, III |
| 4,526,296 A | 7/1985 | Berger et al. |
| 4,753,638 A | 6/1988 | Peters |
| 4,773,458 A | 9/1988 | Touzani |
| 4,850,807 A | 7/1989 | Frantz |
| 5,000,739 A | 3/1991 | Kulisz et al. |
| 5,201,438 A | 4/1993 | Norwood |
| 5,209,372 A | 5/1993 | Norwood |
| 5,236,204 A | 8/1993 | Hempel |
| 5,238,150 A | 8/1993 | Williams |
| 5,240,130 A | 8/1993 | Osbakk |
| 5,242,422 A | 9/1993 | Schneberger et al. |
| 5,269,428 A | 12/1993 | Gilbert |
| 5,333,761 A | 8/1994 | Davis et al. |
| 5,353,961 A | 10/1994 | Debush |
| 5,370,250 A | 12/1994 | Gilbert |
| 5,383,858 A | 1/1995 | Reilly et al. |
| 5,397,157 A | 3/1995 | Hempel |
| 5,573,129 A | 11/1996 | Nagata et al. |
| 5,584,413 A | 12/1996 | Jung |
| 5,592,948 A | 1/1997 | Gatten |
| 5,609,580 A | 3/1997 | Kwiatkowski et al. |
| 5,615,791 A | 4/1997 | Vatelot et al. |
| 5,638,995 A | 6/1997 | Mazda |
| 5,683,369 A | 11/1997 | Tsukada |
| 5,758,789 A | 6/1998 | Shin et al. |
| 5,794,107 A | 8/1998 | Russell |
| 5,827,233 A | 10/1998 | Futagawa et al. |
| 5,836,922 A | 11/1998 | Hansen et al. |
| 5,873,861 A | 2/1999 | Hitchins et al. |
| 5,899,889 A | 5/1999 | Futagawa et al. |
| RE36,377 E | 11/1999 | Gilbert |
| 5,979,326 A | 11/1999 | Ohinata |
| 6,054,194 A | 4/2000 | Kane |
| 6,062,437 A | 5/2000 | Mascitelli |
| 6,077,252 A | 6/2000 | Siegel |
| 6,105,815 A | 8/2000 | Mazda |
| 6,142,976 A | 11/2000 | Kubo |
| 6,216,915 B1 | 4/2001 | Harman et al. |
| 6,224,577 B1 | 5/2001 | Dedola et al. |
| 6,250,505 B1 | 6/2001 | Petit |
| 6,315,761 B1 | 11/2001 | Shcherbina et al. |
| 6,319,235 B1 | 11/2001 | Yoshino |
| 6,332,876 B1 | 12/2001 | Poynter et al. |
| 6,485,471 B1 | 11/2002 | Zivitz et al. |
| 6,558,358 B2 | 5/2003 | Rosoff et al. |
| 6,578,738 B1 | 6/2003 | Keller |
| 6,620,134 B1 | 9/2003 | Trombley, III et al. |
| 6,634,524 B1 | 10/2003 | Helmenstein |
| 6,652,489 B2 | 11/2003 | Trocki et al. |
| 6,702,143 B2 | 3/2004 | Wang |
| 6,773,417 B2 | 8/2004 | Fitzgibbons et al. |
| 6,840,164 B2 | 1/2005 | Eastman |
| 6,866,039 B1 | 3/2005 | Wright et al. |
| 6,869,419 B2 | 3/2005 | Dragan et al. |
| RE38,770 E | 8/2005 | Gilbert |
| 7,004,213 B2 | 2/2006 | Hansen |
| 7,011,650 B2 | 3/2006 | Rosoff et al. |
| 7,192,549 B2 | 3/2007 | Hansen |
| 7,250,039 B2 | 7/2007 | Fitzgerald |
| 7,309,463 B2 | 12/2007 | Hansen |
| 7,419,478 B1 | 9/2008 | Reilly et al. |
| 7,513,378 B2 | 4/2009 | Mori et al. |
| 7,553,294 B2 | 6/2009 | Lazzaro et al. |
| 7,604,623 B2 | 10/2009 | Brunner et al. |
| 7,666,169 B2 | 2/2010 | Cowan et al. |
| 7,802,691 B2 | 9/2010 | Musalek et al. |
| 8,728,601 B2 | 5/2014 | Hutts et al. |
| 9,173,995 B1 | 11/2015 | Tucker et al. |
| 9,180,252 B2 | 11/2015 | Gelblum et al. |
| 9,199,033 B1 | 12/2015 | Cowan et al. |
| 9,474,857 B2 | 10/2016 | Riley et al. |
| 10,046,106 B2 | 8/2018 | Cowan et al. |
| 10,105,491 B2 | 10/2018 | Gelblum et al. |
| 10,857,345 B2 | 12/2020 | Uber, III et al. |
| 10,933,190 B2 * | 3/2021 | Berry ................ A61M 5/14546 |
| 11,547,793 B2 | 1/2023 | Cowan et al. |
| 2001/0004466 A1 | 6/2001 | Heinz et al. |
| 2004/0249344 A1 | 12/2004 | Nemoto et al. |
| 2010/0091361 A1 | 4/2010 | Yuuki |
| 2012/0020911 A1 | 1/2012 | Seliktar et al. |
| 2012/0209111 A1 * | 8/2012 | Cowan ................ A61M 5/1452 600/432 |
| 2012/0253291 A1 | 10/2012 | Vosevic et al. |
| 2013/0211248 A1 | 8/2013 | Cowan et al. |
| 2013/0281940 A1 | 10/2013 | Gelblum et al. |
| 2017/0035974 A1 * | 2/2017 | Berry ................ A61M 5/31513 |
| 2017/0056604 A1 * | 3/2017 | Cowan ................ A61M 5/007 |

(56) References Cited

U.S. PATENT DOCUMENTS

| | | |
|---|---|---|
| 2019/0192770 A1 | 6/2019 | Spohn et al. |
| 2020/0237998 A1* | 7/2020 | Spears .................... A61M 5/19 |

FOREIGN PATENT DOCUMENTS

| | | |
|---|---|---|
| EP | 2098258 A1 | 9/2009 |
| FR | 1288915 A | 3/1962 |
| GB | 2214819 A | 9/1989 |
| GB | 2374143 A | 10/2002 |
| WO | 9221391 A1 | 12/1992 |
| WO | 2010004206 A2 | 1/2010 |
| WO | 2012061140 A1 | 5/2012 |
| WO | 2012155035 A1 | 11/2012 |
| WO | 2014027009 A1 | 2/2014 |
| WO | 2015066506 A2 | 5/2015 |
| WO | 2015164783 A1 | 10/2015 |
| WO | 2016058946 A1 | 4/2016 |
| WO | 2016069711 A1 | 5/2016 |
| WO | 2016069714 A1 | 5/2016 |
| WO | 2016172467 A1 | 10/2016 |
| WO | 2019055497 A1 | 3/2019 |
| WO | 2019152978 A1 | 8/2019 |

\* cited by examiner

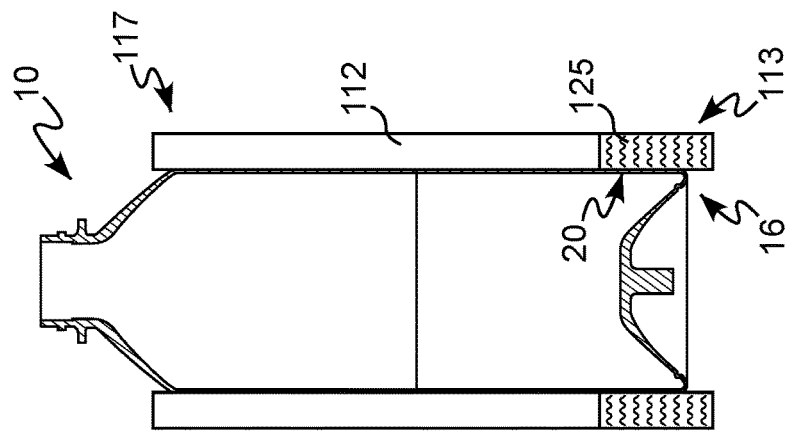
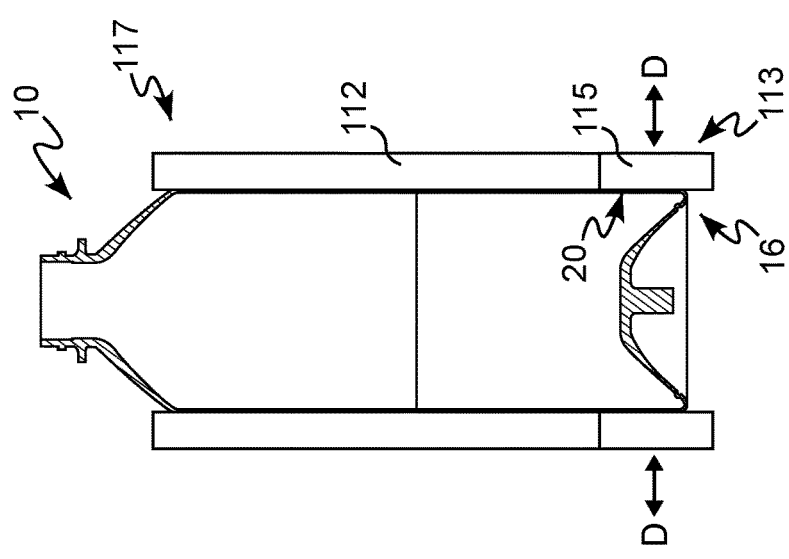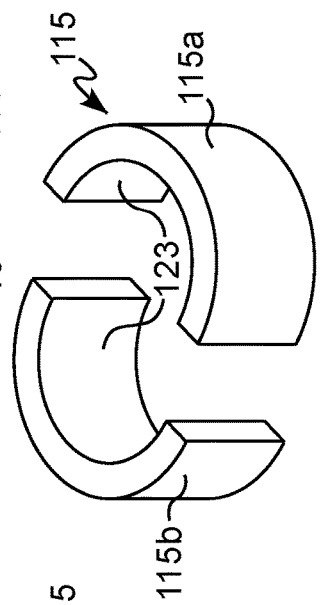
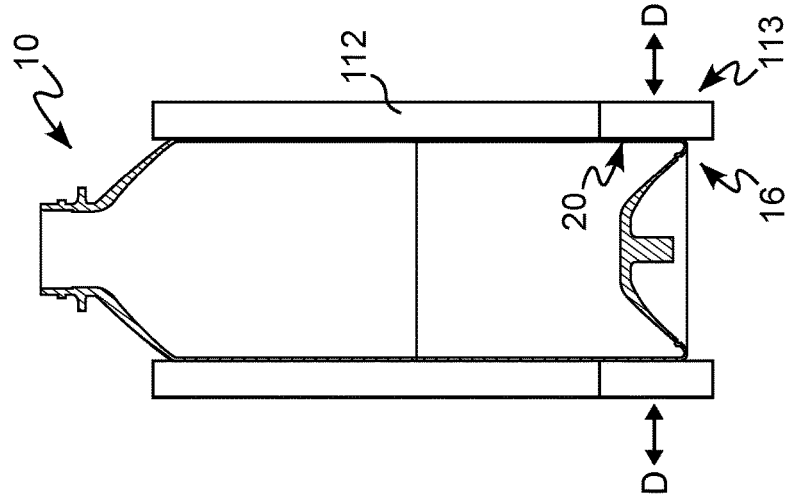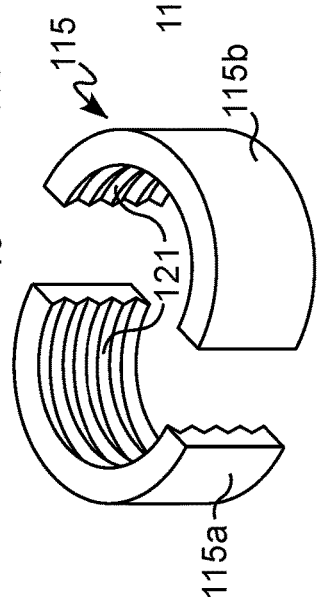
FIG. 4E  FIG. 4F  FIG. 4G

SYRINGE ROLLING APPARATUS AND METHOD

CROSS-REFERENCE TO RELATED APPLICATIONS

This application is a 371 national phase application of PCT International Application No. PCT/US2019/018404, filed Feb. 18, 2019, and claims priority to U.S. Provisional Patent Application No. 62/632,026, filed Feb. 19, 2018, the disclosures of which are hereby incorporated by reference in their entirety.

BACKGROUND OF THE DISCLOSURE

Field of the Disclosure

The present disclosure is related to syringes for use in the medical field and, more particularly, to rolling diaphragm-type syringes having a flexible sidewall that rolls upon itself when acted upon by a piston for selectively filling the syringe with a fluid and delivering the fluid from the syringe. The present disclosure is also directed to a method and apparatus for rolling the flexible sidewall of the syringe from an unrolled state or configuration to a rolled state or configuration.

Description of Related Art

In many medical diagnostic and therapeutic procedures, a medical practitioner, such as a physician, injects a patient with one or more medical fluids. In recent years, a number of injector-actuated syringes and powered fluid injectors for pressurized injection of medical fluids, such as a contrast media solution (often referred to simply as "contrast"), a flushing agent, such as saline, and other medical fluids, have been developed for use in procedures such as angiography, computed tomography (CT), ultrasound, magnetic resonance imaging (MRI), positron emission tomography (PET), and other imaging procedures. These fluid injectors are designed to deliver a preset volume of fluid at a preset pressure and/or flow rate.

Typically, powered injectors have drive members, such as pistons, that connect to a syringe plunger within the syringe. The syringe generally includes a rigid barrel with the syringe plunger being slidably disposed within the barrel. The drive members drive the plungers in a proximal and/or distal direction relative to a longitudinal axis of the barrel to draw fluid into the syringe barrel or deliver the fluid from the syringe barrel.

It is well known that syringes used in the medical field are typically disposable and are discarded after one use. Although disposable syringes are typically made by mass production methods such as injection molding, such disposable syringes are relatively expensive due to the materials and precision involved in their manufacture and economic costs associated with packaging and shipping. Accordingly, it remains desirable to develop improved designs of syringes to facilitate injection procedures.

SUMMARY OF THE DISCLOSURE

The present disclosure generally relates to syringes, as well as to devices and methods for preparing syringes for shipping and for use in fluid injectors. The syringes are rolling diaphragm syringes and the preparation apparatus and method involve rolling and shaping or reforming portions of a molded rolling diaphragm syringe prior to use to prevent buckling and/or pleating and to improve rolling, volume accuracy, flow rate accuracy, air priming/purging, friction reduction, and fluid delivery. While the various embodiments of the rolling diaphragm and rolling apparatus described herein are described with reference to specific rolling diaphragm syringes, the disclosure and embodiments described herein are not limited to syringe embodiments and could be applied to other rolling diaphragm containers and rolling apparatuses therefore, such as containers for commercial fluids and beverages.

In some examples or aspects of the present disclosure, a method for rolling of a rolling diaphragm syringe from an unrolled, blow-molded state to a rolled state. The rolling diaphragm syringe may have a proximal end including an end wall configured to engage a piston of a rolling apparatus, an open distal end comprising a discharge neck, and a flexible sidewall extending between the proximal end and the distal end along a longitudinal axis. The method may include advancing the piston of the rolling apparatus to engage the end wall and pressurizing an interior of the rolling diaphragm syringe to a first pressure by applying a pressurized fluid, such as air, ethylene oxide, or other gas, into an interior thereof. Pressurizing may include applying a sealed surface of a pressurized fluid source to the open distal end and pressurizing the interior to the desired pressure. The method may include further advancing the piston, thereby causing at least a portion of the sidewall of the rolling diaphragm syringe to roll upon itself in a radially inward direction. In certain embodiments, the method may further include disengaging and retracting the piston of the rolling apparatus, thereby forming a rolling diaphragm syringe in the rolled state.

In some examples or aspects of the present disclosure, the method may further include releasing the pressurized fluid from the interior of the rolling diaphragm syringe during advancing of the piston of the rolling apparatus in an amount necessary to maintain the first pressure in the interior of the rolling diaphragm syringe. Alternatively, the pressurized fluid in the syringe may be releases at once, so that the interior pressure is atmospheric pressure. The method may further include disengaging and retracting the piston of the rolling apparatus and maintaining the interior of the rolling diaphragm syringe at the first pressure, for example by flowing fluid into the syringe, during retracting of the piston or alternatively repressurizing the interior after retracting the piston of the rolling apparatus to unroll the rolling diaphragm syringe from the rolled state to the unrolled state, for example by the pressure differential between the pressurized interior and the lower pressure exterior within the pressure jacket of the rolling apparatus.

In some examples or aspects of the present disclosure, the method may further include advancing the piston of the rolling apparatus to reengage the end wall and repressurizing the interior of the rolling diaphragm syringe to a second pressure higher than the first pressure. The method may further include advancing the piston, thereby causing at least a portion of the sidewall of the rolling diaphragm syringe to roll upon itself in the radially inward direction, depressurizing the interior of the rolling diaphragm syringe; and disengaging and retracting the piston of the rolling apparatus, thereby forming a rolling diaphragm syringe in the rolled state. According to certain aspects, during the further advancing of the piston, a material of at least a portion of the rolled flexible sidewall may be plastically deformed.

In some embodiments of the present disclosure, the method may further include placing the rolling diaphragm syringe in a pressure jacket associated with the rolling apparatus. Pressurizing the interior of the rolling diaphragm syringe may cause at least a portion of the flexible sidewall of the rolling diaphragm syringe to expand radially outward to contact an inner sidewall of the pressure jacket. According to certain embodiments, the first pressure may range from about 80 psi and to about 100 psi. According to certain embodiments, the second pressure may range from about 300 psi and to about 350 psi.

In some embodiments of the present disclosure, the method may further include heating at least a portion of the sidewall of the rolling diaphragm syringe. In certain embodiments, the at least a portion of the sidewall may be heated prior to pressurizing the rolling diaphragm syringe. The method may further include measuring at least one physical characteristic of the syringe using a measurement device.

In certain embodiments of the present disclosure, the proximal end of the rolling diaphragm syringe may have an annular portion extending proximally from a periphery of the end wall having a substantially cylindrical sidewall and an outwardly flared portion extending radially and distally from the substantially cylindrical sidewall to the sidewall of the rolling diaphragm syringe. According to specific embodiments, during rolling of the flexible sidewall, a rolled inner surface of the flexible sidewall may be free from contact with an unrolled inner surface of an unrolled portion of the flexible sidewall.

In some embodiments of the present disclosure, the method may further include applying a surface texture feature or a pattern on an inner surface of the rolled portion of the sidewall of the rolling diaphragm syringe via contact with an outer surface of the piston of the rolling apparatus during the advancing of the piston, wherein the piston has a corresponding texture or pattern.

In some embodiments of the present disclosure, a distal portion or surface of the piston may have a cylindrical proximal portion having a first maximum diameter, a cylindrical step portion extending distally from the proximal portion having a second maximum diameter which is less than the first maximum diameter, and a hemispheroidal surface extending from the step portion and configured to be received by the end wall of the proximal end of the rolling diaphragm. The second maximum diameter may be from 1% to 5% less than the first maximum diameter. The first maximum diameter may be from 1% to 10% less than a maximum inner diameter of the sidewall of the rolling diaphragm.

In some embodiments of the present disclosure, an apparatus for rolling of a rolling diaphragm, such as a rolling diaphragm syringe, from a blow-molded, unrolled state to a rolled state is described. The apparatus may have at least one pressure jacket configured for receiving a blow-molded, unrolled rolling diaphragm and at least one piston reciprocally movable within the at least one pressure jacket and configured for contacting an end wall of the unrolled rolling diaphragm to initiate a rolling of a flexible sidewall of the rolling diaphragm. The apparatus may further have at least one seal assembly configured for forming a sealed engagement with an open discharge neck of the rolling diaphragm and providing a fluid tight seal therebetween. The at least one seal assembly may be in fluid communication with a source of pressurized fluid to pressurize an interior of the rolling diaphragm to a predetermined pressure prior to a distal movement of the at least one piston.

In some embodiments of the present disclosure, the apparatus may have at least one pressure release valve for maintaining the predetermined pressure within the interior of the rolling diaphragm during the distal movement of the at least one piston. A distal surface of the at least one piston may have a cylindrical proximal portion having a first maximum outer diameter, a cylindrical step portion extending distally from the proximal portion having a second maximum diameter which is less than the first diameter, and a hemispheroidal surface extending from the step portion and configured to be received by the end wall of the proximal end of the rolling diaphragm syringe.

In some embodiments of the present disclosure, the apparatus may have at least one pressure release valve for maintaining the predetermined pressure within the interior of the rolling diaphragm syringe during the distal movement of the at least one piston. A distal surface of the at least one piston may have a cylindrical proximal portion having a first maximum outer diameter, and a cylindrical step portion extending distally from the proximal portion having a second maximum diameter which is less than the first diameter. The second maximum diameter may be from 1% to 5% less than the first maximum diameter. The first maximum diameter may be from 1% to 10% less than a maximum inner diameter of the sidewall of the rolling diaphragm syringe.

In various embodiments, the apparatus may further comprise at least one heating device for heating at least a portion of the sidewall of the rolling diaphragm. The at least one heating device may be provided on one or both of the at least one pressure jacket and the at least one piston. According to specific embodiments, the at least one heating device may be a laser. In various embodiments, the apparatus may further comprise at least one measurement device for measuring at least one physical characteristic of the rolling diaphragm. The at least one physical characteristic of the rolling diaphragm measured by the at least one measurement device may include at least one of an inner diameter of the rolling diaphragm, an outer diameter of the rolling diaphragm, and a thickness of the sidewall of the rolling diaphragm. The at least one measurement device may be a laser, which in certain embodiments the laser may further serve as the at least one heating device.

Further embodiments of the rolling apparatus may include at least one texturization feature on the at least one piston for applying a surface texturization feature or a pattern on an inner surface of a rolled portion of the sidewall of the rolling diaphragm via contact with an outer surface of the at least one piston. According to various embodiments, the at least one texturization feature comprises a plurality of ribs on the outer surface of the at least one piston.

In certain embodiments of the present disclosure, an apparatus for rolling of a rolling diaphragm syringe from a blow-molded, unrolled state to a rolled state may have at least one pressure jacket configured for receiving the blow-molded, unrolled rolling diaphragm syringe, at least one distal seal assembly configured for forming a sealed engagement with an open discharge neck of the rolling diaphragm syringe and providing a fluid tight seal therebetween, and at least one proximal seal assembly configured for forming a sealed engagement with a proximal end of the at least one pressure jacket. The at least one distal seal assembly may be in fluid communication with a source of pressurized fluid to pressurize an interior of the rolling diaphragm syringe to a first predetermined pressure. The at least one proximal seal assembly may be in fluid communication with a second source of pressurized fluid to pressurize a cavity within the pressure jacket proximal of an end wall of the rolling diaphragm syringe to a second predetermined pressure higher than the first predetermined pressure to initiate rolling over of a sidewall of the rolling diaphragm syringe.

In some embodiments, the apparatus may have at least one pressure release valve for maintaining at least one of the first predetermined pressure and the second predetermined pressure. In certain embodiments of the present disclosure, the apparatus may have at least one heating device for heating at least a portion of the sidewall of the rolling diaphragm syringe. The at least one heating device may be provided on the at least one pressure jacket and/or the at least one piston. The at least one heating device may be a laser.

In certain embodiments of the present disclosure, the apparatus may have at least one measurement device for measuring at least one physical characteristic of the rolling diaphragm syringe. The at least one physical characteristic of the rolling diaphragm syringe may be at least one of an inner diameter of the rolling diaphragm syringe, an outer diameter of the rolling diaphragm syringe, and a thickness of the sidewall of the rolling diaphragm syringe. The at least one measurement device may be a laser. In certain embodiment, the laser may also heat at least a portion of the sidewall of the rolling diaphragm syringe.

In various embodiments of the present disclosure, a rolling diaphragm syringe for receiving a medical fluid therein may have a proximal end including a concave, dome-shaped end wall configured to receive and engage a piston of a fluid injector, an open distal end having a discharge neck, and a flexible sidewall extending between the proximal end and the distal end along a longitudinal axis. The sidewall may be flexible and roll upon itself when acted upon by the piston such that an outer surface of a rolled portion of a proximal portion of the sidewall is rolled in a radially inward direction relative to an outer surface of an unrolled distal portion of the sidewall as the piston is advanced at least partially from the proximal end to the distal end. A material of at least a portion of the rolled portion of the sidewall may be plastically deformed relative to the material of the unrolled portion. The flexible sidewall may be initially provided to an end user in a compressed, rolled state and may be configured to be unrolled during a filling process as the piston retracts the end wall in a proximal direction.

In some embodiments of the present disclosure, the proximal end may have one or more annular ribs at a transition portion between the end wall and the flexible sidewall. The end wall may have a piston engagement portion configured for engagement with an engagement mechanism on the piston of the fluid injector. For example in certain embodiments, the piston engagement portion may have a stem having a first end connected to the end wall and a second end extending proximally from the first end. According to specific embodiments, the second end may have at least one projection that extends radially outward relative to the stem. According to other embodiments, the second end may have at least one groove recessed radially inward into the stem.

In some embodiments of the present disclosure, a rolling diaphragm syringe for receiving a medical fluid therein is provided. The rolling diaphragm syringe may have a proximal end including a concave, dome-shaped end wall configured to receive and engage a piston of a fluid injector, an open distal end having a discharge neck, and a flexible sidewall extending between the proximal end and the distal end along a longitudinal axis. The sidewall may be flexible and roll upon itself when acted upon by the piston such that an outer surface of a rolled portion of the sidewall is rolled in a radially inward direction relative to an outer surface of an unrolled portion of the sidewall as the piston is advanced from the proximal end to the distal end. The proximal end may have one or more annular ribs at a transition portion between the end wall and the flexible sidewall. According to certain embodiments, the proximal end of the sidewall may an outwardly flared portion extending radially and distally up a portion of the sidewall of the rolling diaphragm syringe.

In certain embodiments of the present disclosure, the flexible sidewall may be provided to an end user in a compressed, rolled state and is configured to be unrolled during a filling process as the piston retracts the end wall in a proximal direction. According to certain embodiments, the plastic material of at least a portion of the rolled portion of the sidewall may be plastically deformed relative to the material of the unrolled portion.

In various embodiments of the present disclosure, the proximal end may have one or more annular ribs at a transition portion between the end wall and the flexible sidewall. The end wall may have a piston engagement portion configured for engagement with an engagement mechanism on the piston of the fluid injector. The piston engagement portion may have a stem having a first end connected to the end wall and a second end extending proximally from the first end. The second end may have at least one projection that extends radially outward relative to the stem. The second end may have at least one groove recessed radially inward into the stem.

Further aspects of the rolling diaphragm syringes, syringe rolling apparatus for initially rolling the rolling diaphragm syringes, and a method of initially rolling the rolling diaphragm syringes are further disclosed in the following enumerated clauses.

Clause 1. A method for rolling of a rolling diaphragm syringe from an unrolled state to a rolled state, the method comprising: advancing a piston of a rolling apparatus to engage an end wall of the rolling diaphragm syringe, wherein the rolling diaphragm syringe comprises a proximal end comprising the end wall configured to engage the piston of the rolling apparatus, an open distal end comprising a discharge neck, and a flexible sidewall extending between the proximal end and the distal end along a longitudinal axis; pressurizing an interior of the rolling diaphragm syringe to a first pressure by applying a pressurized fluid into an interior thereof; and further advancing the piston, thereby causing at least a portion of the sidewall of the rolling diaphragm syringe to roll upon itself in a radially inward direction, thereby forming a rolling diaphragm syringe in the rolled state.

Clause 2. The method according to clause 1, further comprising releasing an amount of the pressurized fluid from the interior of the rolling diaphragm syringe during advancing of the piston of the rolling apparatus to maintain the first pressure in the interior of the rolling diaphragm syringe.

Clause 3. The method according to clause 1 or 2, further comprising disengaging and retracting the piston of the rolling apparatus from the end wall; and maintaining the interior of the rolling diaphragm syringe at the first pressure during retracting of the piston of the rolling apparatus to unroll the rolling diaphragm syringe from the rolled state to the unrolled state.

Clause 4. The method according to clause 3, further comprising: advancing the piston of the rolling apparatus to reengage the end wall; pressurizing the interior of the rolling diaphragm syringe to a second pressure higher than the first pressure; further advancing the piston, thereby causing at least a portion of the sidewall of the rolling diaphragm syringe to roll upon itself in the radially inward direction; depressurizing the interior of the rolling diaphragm syringe; and disengaging and retracting the piston of the rolling apparatus, thereby forming a rolling diaphragm syringe in the rolled state, wherein, during further advancing of the piston, a material of at least a portion of the rolled flexible sidewall is plastically deformed.

Clause 5. The method according to any of clauses 1 to 4, further comprising placing the rolling diaphragm syringe in a pressure jacket associated with the rolling apparatus, wherein pressurizing the interior of the rolling diaphragm syringe to a first pressure causes at least a portion of the flexible sidewall of the rolling diaphragm syringe to expand radially outward to contact an inner sidewall of the pressure jacket.

Clause 6. The method according to any of clauses 1 to 5, wherein the first pressure ranges from about 80 psi and to about 100 psi.

Clause 7. The method according to any of clauses 4 to 6, wherein the second pressure ranges from about 300 psi and to about 350 psi.

Clause 8. The method of according to any of clauses 1 to 7, further comprising heating at least a portion of the sidewall of the rolling diaphragm syringe.

Clause 9. The method of according to any of clauses 1 to 8, further comprising measuring at least one physical characteristic of the syringe using a measurement device.

Clause 10. The method according to any of clauses 1 to 9, wherein the proximal end of the rolling diaphragm syringe comprises an annular portion extending proximally from a periphery of the end wall having a substantially cylindrical sidewall and an outwardly flared portion extending radially and distally from the substantially cylindrical sidewall to the sidewall of the rolling diaphragm syringe.

Clause 11. The method according to any of clauses 1 to 10, wherein during rolling of the flexible sidewall, a rolled inner surface of the flexible sidewall is free from contact with an unrolled inner surface of an unrolled portion of the flexible sidewall.

Clause 12. The method according to any of clauses 1 to 11, further comprising applying a surface texture feature or a pattern on an inner surface of the rolled portion of the sidewall of the rolling diaphragm syringe via contact with an outer surface of the piston of the rolling apparatus during the further advancing of the piston, wherein the piston has the texture or the pattern.

Clause 13. The method according to any of clauses 1 to 12, wherein a distal portion of the piston comprises a cylindrical proximal portion having a first maximum diameter, a cylindrical step portion extending distally from the proximal portion having a second maximum diameter which is less than the first maximum diameter, and a distal hemispheroidal surface extending from the step portion and configured to be received by the end wall of the rolling diaphragm syringe.

Clause 14. The method according to clause 13, wherein the second maximum diameter is from 1% to 5% less than the first maximum diameter.

Clause 15. The method according to clause 13 or 14, wherein the first maximum diameter is from 1% to 10% less than a maximum inner diameter of the sidewall of the rolling diaphragm syringe.

Clause 16. An apparatus for rolling of a rolling diaphragm, such as a rolling diaphragm syringe, from an unrolled state to a rolled state, the apparatus comprising: at least one pressure jacket configured for receiving at least a portion of a rolling diaphragm in the unrolled state; at least one piston reciprocally movable within the at least one pressure jacket and configured for contacting an end wall of the unrolled rolling diaphragm to initiate a rolling of a flexible sidewall of the rolling diaphragm; and at least one seal assembly configured for forming a sealed engagement with an open discharge neck of the rolling diaphragm and providing a fluid tight seal therebetween, wherein the at least one seal assembly is in fluid communication with a source of pressurized fluid to pressurize an interior of the rolling diaphragm to a predetermined pressure prior to a distal movement of the at least one piston.

Clause 17. The apparatus according to clause 16, further comprising at least one pressure release valve for maintaining the predetermined pressure within the interior of the rolling diaphragm during the distal movement of the at least one piston.

Clause 18. The apparatus according to clause 16 or 17, wherein a distal portion of the at least one piston comprises a cylindrical proximal portion having a first maximum outer diameter and a cylindrical step portion extending distally from the proximal portion having a second maximum diameter which is less than the first diameter.

Clause 19. The apparatus according to clause 18, wherein the second maximum diameter is from 1% to 5% less than the first maximum diameter.

Clause 20. The apparatus according to clause 18 or 19, wherein the first maximum diameter is from 1% to 10% less than a maximum inner diameter of the sidewall of the rolling diaphragm.

Clause 21. The apparatus according to any of clauses 18 to 20, wherein the distal portion of the at least one piston comprises a distal hemispheroidal surface extending from the step portion and configured to be received by the end wall of the proximal end of the rolling diaphragm.

Clause 22. The apparatus according to any of clauses 16 to 21, further comprising at least one heating device for heating at least a portion of the sidewall of the rolling diaphragm.

Clause 23. The apparatus according to clause 22, wherein the at least one heating device is provided on the at least one pressure jacket.

Clause 24. The apparatus according to clause 22 or 23, wherein the at least one heating device is provided on the at least one piston.

Clause 25. The apparatus according to any clauses 22 to 24, wherein the at least one heating device is a laser.

Clause 26. The apparatus according to any of clauses 16 to 26, further comprising at least one measurement device for measuring at least one physical characteristic of the rolling diaphragm.

Clause 27. The apparatus according to clause 26, wherein the at least one physical characteristic of the rolling diaphragm is at least one of an inner diameter of the rolling diaphragm, an outer diameter of the rolling diaphragm, and a thickness of the sidewall of the rolling diaphragm.

Clause 28. The apparatus according to clause 26 or 27, wherein the at least one measurement device is a laser.

Clause 29. The apparatus according to any of clauses 16 to 28, further comprising at least one texturization feature on the at least one piston for applying a surface texturization feature or a pattern on an inner surface of a rolled portion of the sidewall of the rolling diaphragm via contact with an outer surface of the at least one piston.

Clause 30. The apparatus according to clause 29, wherein the at least one texturization feature comprises a plurality of ribs on the outer surface of the at least one piston.

Clause 31. An apparatus for rolling of a rolling diaphragm syringe from an unrolled state to a rolled state, the apparatus comprising: at least one pressure jacket configured for receiving a rolling diaphragm syringe in the unrolled state; at least one distal seal assembly configured for forming a sealed engagement with an open discharge neck of the rolling diaphragm syringe and providing a fluid tight seal therebetween; and at least one proximal seal assembly configured for forming a sealed engagement with a proximal end of the at least one pressure jacket, wherein the at least one distal seal assembly is in fluid communication with a source of pressurized fluid to pressurize an interior of the rolling diaphragm syringe to a first predetermined pressure, and wherein the at least one proximal seal assembly is in fluid communication with a second source of pressurized fluid to pressurize a cavity within the pressure jacket proximal of an end wall of the rolling diaphragm syringe to a second predetermined pressure higher than the first predetermined pressure to effect rolling of a sidewall of the rolling diaphragm syringe.

Clause 32. The apparatus according to clause 31, further comprising at least one pressure release valve for maintaining at least one of the first predetermined pressure and the second predetermined pressure.

Clause 33. The apparatus according to clause 31 or 32, further comprising at least one heating device for heating at least a portion of the sidewall of the rolling diaphragm syringe Clause 34. The apparatus according to clause 33, wherein the at least one heating device is provided on the at least one pressure jacket.

Clause 35. The apparatus according to any of clauses 31 to 34, the apparatus further comprising at least one piston reciprocally movable within the at least one pressure jacket and configured for contacting an end wall of the unrolled rolling diaphragm syringe to initiate a rolling of a flexible sidewall of the rolling diaphragm syringe prior to pressurizing the cavity within the pressure jacket proximal to the end wall to the second predetermined pressure.

Clause 36. The apparatus according to any of clauses 31 to 35, further comprising at least one measurement device for measuring at least one physical characteristic of the rolling diaphragm syringe.

Clause 37. The apparatus according to clause 36, wherein the at least one physical characteristic of the rolling diaphragm syringe is at least one of an inner diameter of the rolling diaphragm syringe, an outer diameter of the rolling diaphragm syringe, and a thickness of the sidewall of the rolling diaphragm syringe.

Clause 38. The apparatus according to clause 36 or 37, wherein the at least one measurement device is a laser.

Clause 39. A rolling diaphragm for receiving a fluid therein, the rolling diaphragm comprising: a proximal end comprising a dome-shaped end wall configured to receive and engage a piston of a fluid injector; an open distal end comprising a discharge neck; and a flexible sidewall extending between the proximal end and the distal end along a longitudinal axis, wherein the sidewall is flexible and rolls upon itself when acted upon by the piston such that an outer surface of a proximal portion of the sidewall is rolled in a radially inward direction relative to an outer surface of an unrolled distal portion of the sidewall as the piston is advanced at least partially from the proximal end to the distal end, and wherein a material of at least a portion of the rolled portion of the sidewall is plastically deformed relative to the material of the unrolled portion.

Clause 40. The rolling diaphragm according to clause 39, wherein the flexible sidewall is provided to an end user in a compressed, rolled state and is configured to be unrolled during a filling process as the piston of the fluid injector retracts the end wall in a proximal direction.

Clause 41. The rolling diaphragm according to clause 39 or 40, wherein the proximal end has one or more annular ribs at a transition portion between the end wall and the flexible sidewall.

Clause 42. The rolling diaphragm according to any of clauses 39 to 41, wherein the end wall has a piston engagement portion configured for engagement with an engagement mechanism on the piston of the fluid injector.

Clause 43. The rolling diaphragm according to clause 42, wherein the piston engagement portion comprises a stem having a first end connected to the end wall and a second end extending proximally from the first end.

Clause 44. The rolling diaphragm according to clause 43, wherein the second end has at least one projection that extends radially outward relative to the stem.

Clause 45. The rolling diaphragm according to clause 43 or 44, wherein the second end has at least one groove recessed radially inward into the stem.

Clause 46. A rolling diaphragm syringe for receiving a medical fluid therein, the rolling diaphragm syringe comprising: a proximal end comprising a dome-shaped end wall configured to receive and engage a piston of a fluid injector; an open distal end comprising a discharge neck; and a flexible wherein the sidewall is flexible and rolls upon itself when acted upon by the piston such that an outer surface of a proximal portion of the sidewall is rolled in a radially inward direction relative to an outer surface of an unrolled distal portion of the sidewall as the piston is advanced from the proximal end to the distal end, and wherein the proximal end has one or more annular ribs at a transition portion between the end wall and the flexible sidewall.

Clause 47. The rolling diaphragm syringe according to clause 46, wherein the flexible sidewall is provided to an end user in a compressed, rolled state and is configured to be unrolled during a filling process as the piston of the fluid injector retracts the end wall in a proximal direction.

Clause 48. The rolling diaphragm syringe according to clause 46 or 47, wherein a material of at least a portion of the rolled portion of the sidewall is plastically deformed relative to the material of the unrolled portion.

Clause 49. The rolling diaphragm syringe according to any of clauses 46 to 48, wherein the end wall has a piston engagement portion configured for engagement with an engagement mechanism on the piston of the fluid injector.

Clause 50. The rolling diaphragm syringe according to clause 49, wherein the piston engagement portion comprises a stem having a first end connected to the end wall and a second end extending proximally from the first end.

Clause 51. The rolling diaphragm syringe according to clause 50, wherein the second end has at least one projection that extends radially outward relative to the stem.

Clause 52. The rolling diaphragm syringe according to clause 50 or 51, wherein the second end has at least one groove recessed radially inward into the stem.

Further details and advantages of the various examples or aspects described in detail herein will become clear upon reviewing the following detailed description in conjunction with the accompanying drawing figures.

BRIEF DESCRIPTION OF THE DRAWINGS

FIG. 4E is a side cross-sectional view of a rolling diaphragm syringe and a pressure jacket of a syringe rolling apparatus according to another example or aspect of the disclosure;

FIG. 4F is a side cross-sectional view of a rolling diaphragm syringe and a pressure jacket of a syringe rolling apparatus according to another example or aspect of the disclosure;

FIG. 4G is a side cross-sectional view of a rolling diaphragm syringe and a pressure jacket of a syringe rolling apparatus according to another example or aspect of the disclosure;

DETAILED DESCRIPTION OF THE DISCLOSURE

Figure 1A:
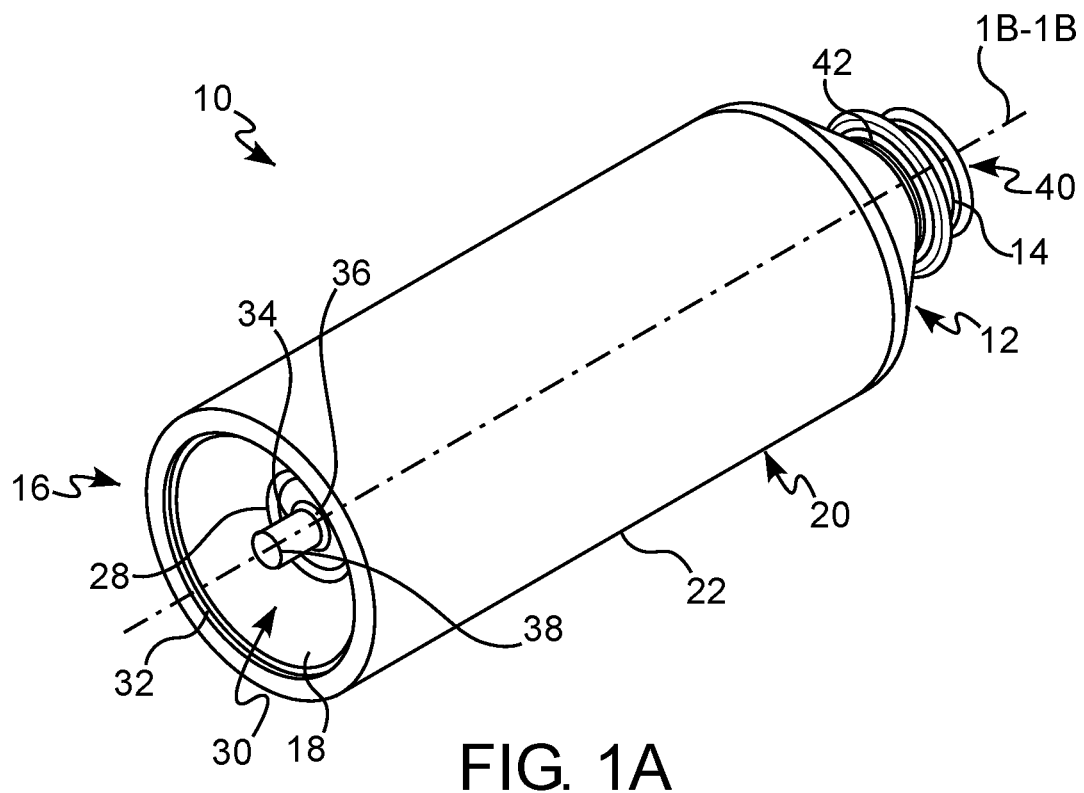
FIG. 1A is a rear perspective view of a rolling diaphragm syringe prior to initial rolling according to an example or aspect of the present disclosure.

The illustrations generally show non-limiting examples aspects of the systems and methods of the present disclosure. While the description presents various examples or aspects of the devices, it should not be interpreted in any way as limiting the disclosure. Furthermore, modifications, concepts, and applications of the disclosure's examples or aspects are to be interpreted by those skilled in the art as being encompassed, but not limited to, the illustrations and descriptions herein.

The following description is provided to enable those skilled in the art to make and use the described examples or aspects contemplated for carrying out the disclosure. Various modifications, equivalents, variations, and alternatives, however, will remain readily apparent to those skilled in the art. Any and all such modifications, variations, equivalents, and alternatives are intended to fall within the spirit and scope of the present disclosure.

For purposes of the description hereinafter, the terms "upper", "lower", "right", "left", "vertical", "horizontal", "top", "bottom", "lateral", "longitudinal", and derivatives thereof shall relate to the disclosure as it is oriented in the drawing figures. When used in relation to a syringe, a pressure jacket, and/or a rolling diaphragm syringe, the term "proximal" refers to a portion of a syringe, a pressure jacket, and/or a rolling diaphragm syringe nearest to an injector when a syringe, a pressure jacket, and/or a rolling diaphragm syringe is oriented for connecting to the injector. The term "distal" refers to a portion of a syringe, a pressure jacket, or a rolling diaphragm syringe farthest away from the injector when the syringe, the pressure jacket, or the rolling diaphragm syringe is oriented for connecting to an injector. The term "radial" refers to a direction in a cross-sectional plane normal to a longitudinal axis of the syringe, the pressure jacket, or the rolling diaphragm syringe extending between proximal and distal ends. The term "circumferential" refers to a direction around an inner or outer surface of a sidewall of the syringe, the pressure jacket, or the rolling diaphragm syringe. The term "flexible", when used in connection with a rolling diaphragm syringe, means that at least a portion of the rolling diaphragm syringe, such as a sidewall of the rolling diaphragm syringe, is capable of bending or being bent to change a direction in which it extends. The terms "roll over", "rolling over", and "rolls upon itself" refer to an ability of a portion of the rolling diaphragm syringe, such as a proximal end portion of the rolling diaphragm syringe, to bend approximately 180° relative to a second portion of the rolling diaphragm syringe, such as a distal portion of a sidewall of a rolling diaphragm syringe, when urged by a piston of a fluid injector. As used herein, the phrase "blow-molded unrolled state" refers to a state of the rolling diaphragm syringe prior to any rolling procedure. As used herein, the term "substantially" means to within plus or minus 5% variation. For example, two surfaces denoted as "substantially parallel" can be up to plus or minus 5 degrees from parallel. It is to be understood, however, that the disclosure may assume alternative variations and step sequences, except where expressly specified to the contrary. It is also to be understood that the specific devices and processes illustrated in the attached drawings, and described in the following specification, are simply exemplary aspects of the disclosure. Hence, specific dimensions and other physical characteristics related to the examples or aspects disclosed herein are not to be considered as limiting.

Referring to the drawings in which like reference characters refer to like parts throughout the several views thereof, the present disclosure is generally directed to a syringe configured as a rolling diaphragm syringe 10 (hereinafter referred to as "syringe 10" or "rolling diaphragm syringe 10") configured to be connected to a syringe rolling apparatus or a fluid injector (see, e.g., FIGS. 1A-1C). For example, the syringe 10 may be configured to be received within a pressure jacket mounted to the syringe rolling apparatus or injector for providing radial and axial support for the syringe 10 during rolling or during an injection. The present disclosure is also directed to methods and devices for rolling a blow-molded unrolled rolling diaphragm syringe 10, as is needed for initially rolling the syringe 10 prior to filling and use for fluid delivery, which is referred to herein as an initial rolling action. The present disclosure is also directed to aspects of the syringe 10 which are affected (e.g., shaped or reformed) by the initial rolling action.

In some aspects, the initial rolling action is performed in a rolling apparatus configured to support the syringe 10 during rolling and roll the syringe. The rolling apparatus may also be used to align the syringe 10 for the initial rolling action, thereby ensuring that an inner or rolled portion of the syringe 10 is substantially concentric with an outer or unrolled portion of the syringe 10. For example, a plunger or piston that rolls the syringe 10 may include alignment or centering structures, such as a linear bearing, centering ribs, or annular seals, to keep the piston or plunger centered within the pressure jacket so that during rolling the plunger or piston is kept concentric to the pressure jacket inner sidewall. In certain embodiments, force exerted on the piston or force required to advance the piston through the pressure jacket may be monitored to determine if the piston and syringe are not properly aligned. For example, force measurements may be used to evaluate whether the initial rolling process was a "valid roll" in which syringe 10 rolled correctly without requiring excessive force from contacting or rubbing between portions of the syringe 10 inner sidewall. In certain embodiments, the syringe rolling apparatus may be used for determining at least one characteristic of the syringe, such as the material properties of the syringe 10.

Figure 1C:
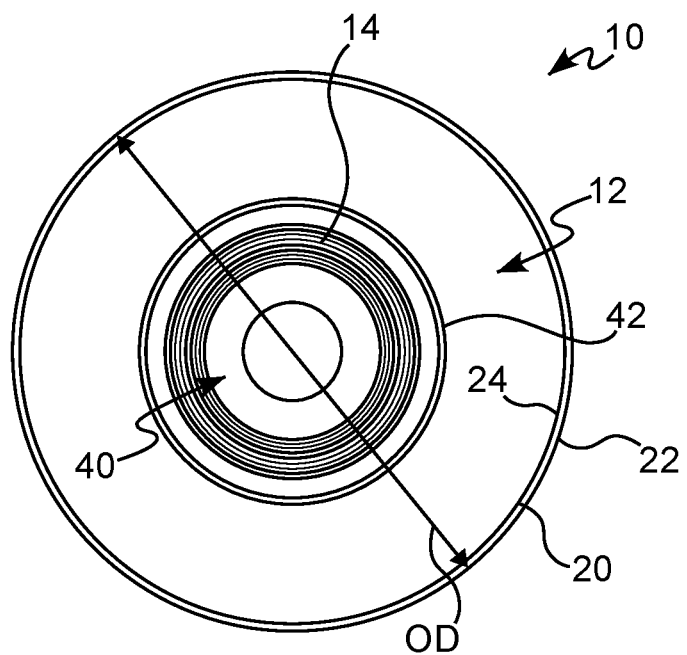
FIG. 1C is a top view of the rolling diaphragm syringe of FIG. 1A.
Figure 1B:
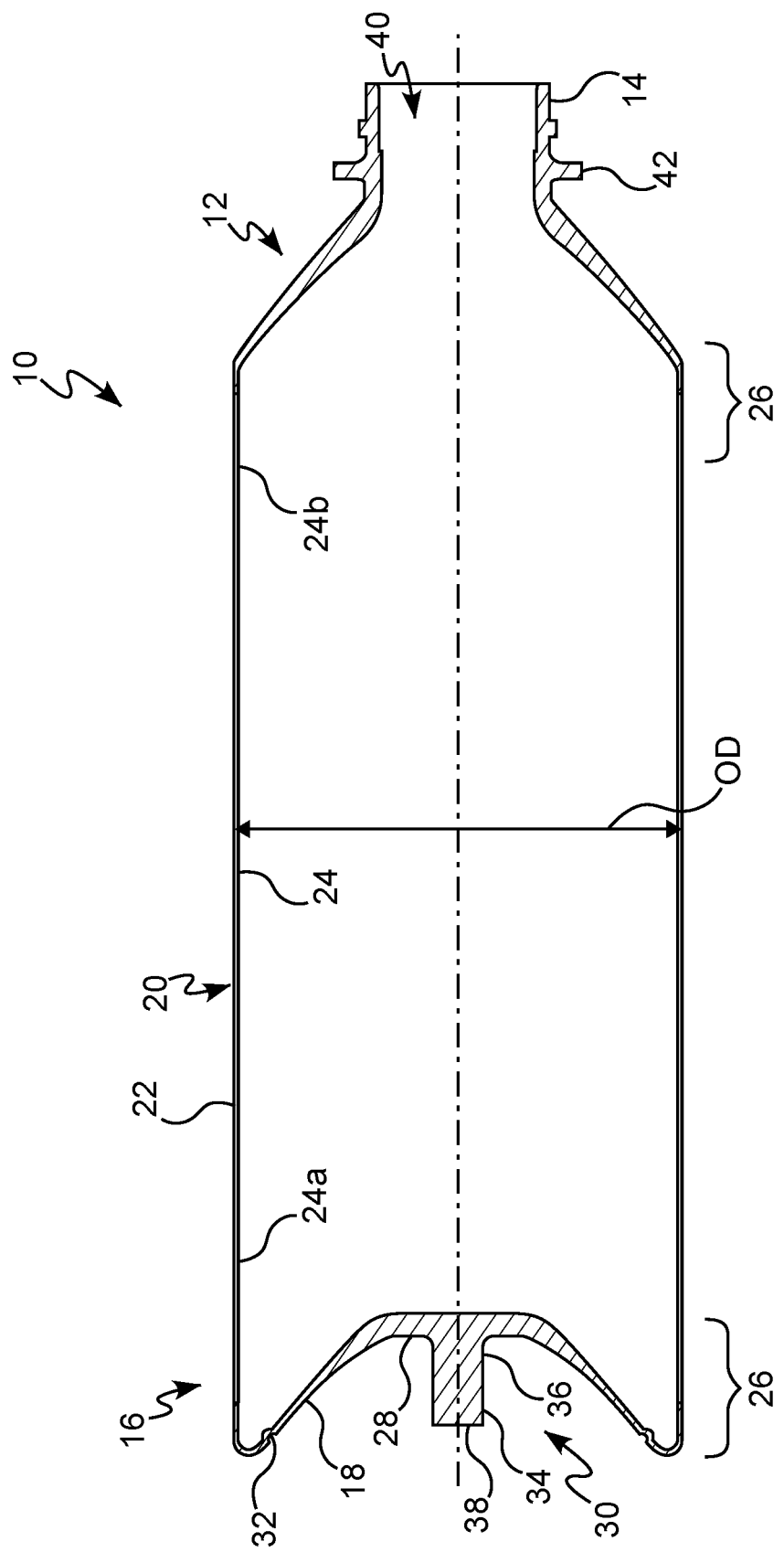
FIG. 1B is a cross-sectional view of the rolling diaphragm syringe of FIG. 1A taken along line 1B-1B.

With reference to FIGS. 1A to 2C, the rolling diaphragm syringe 10 according to various embodiments of the present disclosure may include a hollow body defining an interior that includes a forward or distal end 12 including an open discharge neck 14, a rearward or proximal end 16 having a closed end wall 18, and a flexible sidewall 20 having an outer surface 22 and an inner surface 24 extending therebetween. The syringe 10 can be any suitable length L and can have any interior volume appropriate for and depending on the fluid volume being injected and size of fluid injector being used. For example, in the unrolled or expanded state in certain embodiments, such as shown in FIGS. 1A-1B, syringe 10 can have a length L of from 4 to 8 inches, for example about 5.7 inches, a maximum outer diameter OD of 1 to 4 inches, such as about 1.9 inches, and in certain embodiments have an interior volume of about 50 to 250 mL.

In some examples or aspects, the outer diameter OD may be dimensioned such that the rolling diaphragm syringe 10 fits within an interior space defined by the throughbore and an inner surface of a pressure jacket of a fluid injector. In one aspect, the rolling diaphragm syringe 10 may fit snuggly within the pressure jacket such that the outer surface 22 of the rolling diaphragm syringe 10 abuts the inner surface of the walls of the pressure jacket. In another aspect, the rolling diaphragm syringe 10 fits loosely within the pressure jacket such that there is a gap between at least a portion of the outer surface 22 of the rolling diaphragm syringe 10 and the inner surface of the pressure jacket. As described herein, the rolling diaphragm syringe 10 may be expanded under pressure such that the outer surface 22 of the rolling diaphragm syringe 10 abuts the inner surface of the pressure jacket.

The rolling diaphragm syringe 10 may be made of any suitable medical-grade plastic or polymeric material, desirably a clear or substantially translucent plastic material, such as, but not limited to, polypropylene random copolymer, polypropylene impact copolymer, polypropylene homopolymer, polypropylene, polyethylene terephthalate (PET), POM, ABS, HPDE, nylon, cyclic olefin copolymer, multilayer polypropylene, polycarbonate, ethylene vinyl acetate, polyethylene, and the like. The material of the rolling diaphragm syringe 10 is desirably selected to meet the required tensile and planar stress requirements, water vapor transmission, and chemical/biological compatibility.

In some examples or aspects, the rolling diaphragm syringe 10 may be reusable, meaning that the syringe 10 can be rolled and unrolled multiple times before being thrown away. For example, the rolling diaphragm syringe 10 can be filled as described above, rolled to deliver fluid contained therein to the patient, and then unrolled and re-filled several times to deliver additional doses of fluid to the patient. Alternatively, the rolling diaphragm syringe 10 may be a single-use component that is disposed of after each patient use.

In some examples or aspects, the rolling diaphragm syringe 10 is formed by a stretch blow molding process in which a preform, such as a preform produced by injection molding, is elongated and enlarged by a combination of heating and stretching using a metal core and radial expansion by air pressure. A syringe 10 formed by stretch blow-molding prior to initial rolling is shown in FIGS. 1A-1C. An exemplary stretch blow molding process is described in International Patent Application No. WO 2015/066506 entitled "Blow-Molded Syringe for Use with An Injector", the disclosure of which is incorporated herein by reference in its entirety. Alternative methods for forming rolling diaphragm syringes, which may also be used with the methods for initial rolling disclosed herein, are disclosed in International Publication Nos. WO 2015/164783 and WO 2016/172467, each entitled "Syringe with Rolling Diaphragm," which are also incorporated herein by reference in their entirety.

Figure 2A:
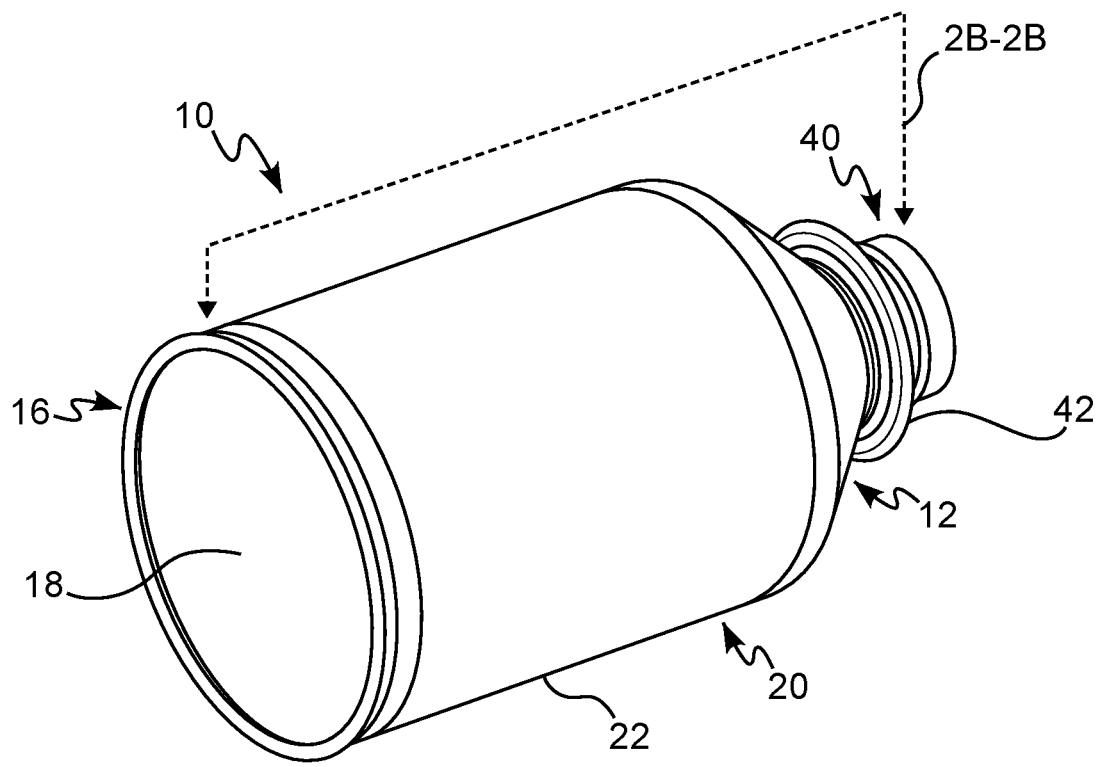
FIG. 2A is a rear perspective view of the rolling diaphragm syringe of FIG. 1A in a contracted or rolled state.

Following stretch blow-molding, the syringe 10 can be structurally modified by the initial rolling action in which, as described herein, an unfilled syringe (e.g., a syringe 10 that does not contain a medical solution) is contacted by a piston and rolled to mold or reform certain structural features. In some examples or aspects, a material of at least a portion of the sidewall 20 of the syringe 10 may undergo a structural change as a result of the rolling process from the unrolled state to the rolled state. For example, the material of at least a portion of the sidewall 20 of the syringe 10 may be plastically deformed changing the structure or configuration of the polymeric chains in the material. As used herein, "plastically deformed" refers to a permanent, non-reversible change in the material properties of at least a part of the rolled portion of the sidewall 20. A syringe 10, after initial rolling to the contracted or rolled state, is shown in FIGS. 2A and 2B. A syringe 10, after initial rolling in its expanded or unrolled state, is shown in FIG. 3A. FIGS. 3B-3C show the syringe 10 of FIG. 3A at different fill volumes as the syringe is re-rolled to deliver fluid therefrom. Shaping or reforming the syringe 10 by the initial rolling action improves how the syringe rolls and, in particular, reforms the syringe 10 so that rolled and unrolled portions of the syringe sidewall 20 readily slide past or over one another and do not come into significant frictional contact, which could potentially cause the syringe sidewall 20 to buckle during fluid injections using a powered injector.

Figure 2C:
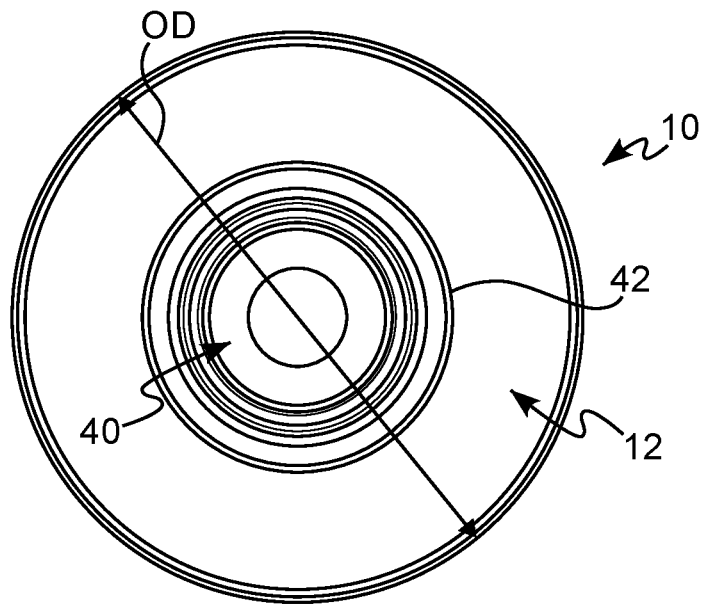
FIG. 2C is a top view of the rolling diaphragm syringe of FIG. 2A.
Figure 2B:
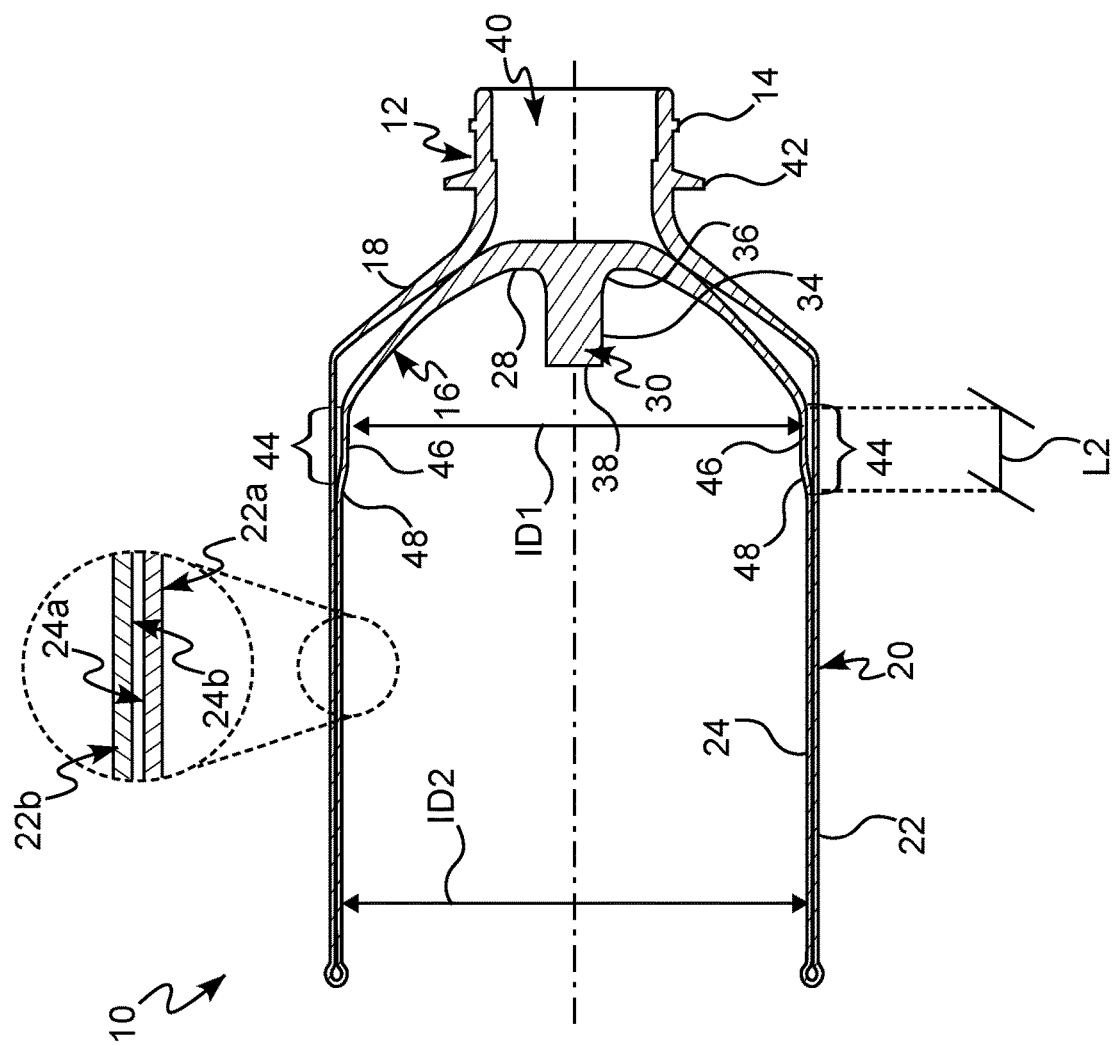
FIG. 2B is a cross-sectional view of the rolling diaphragm syringe of FIG. 2A taken along line 2B-2B.
Figure 3A:
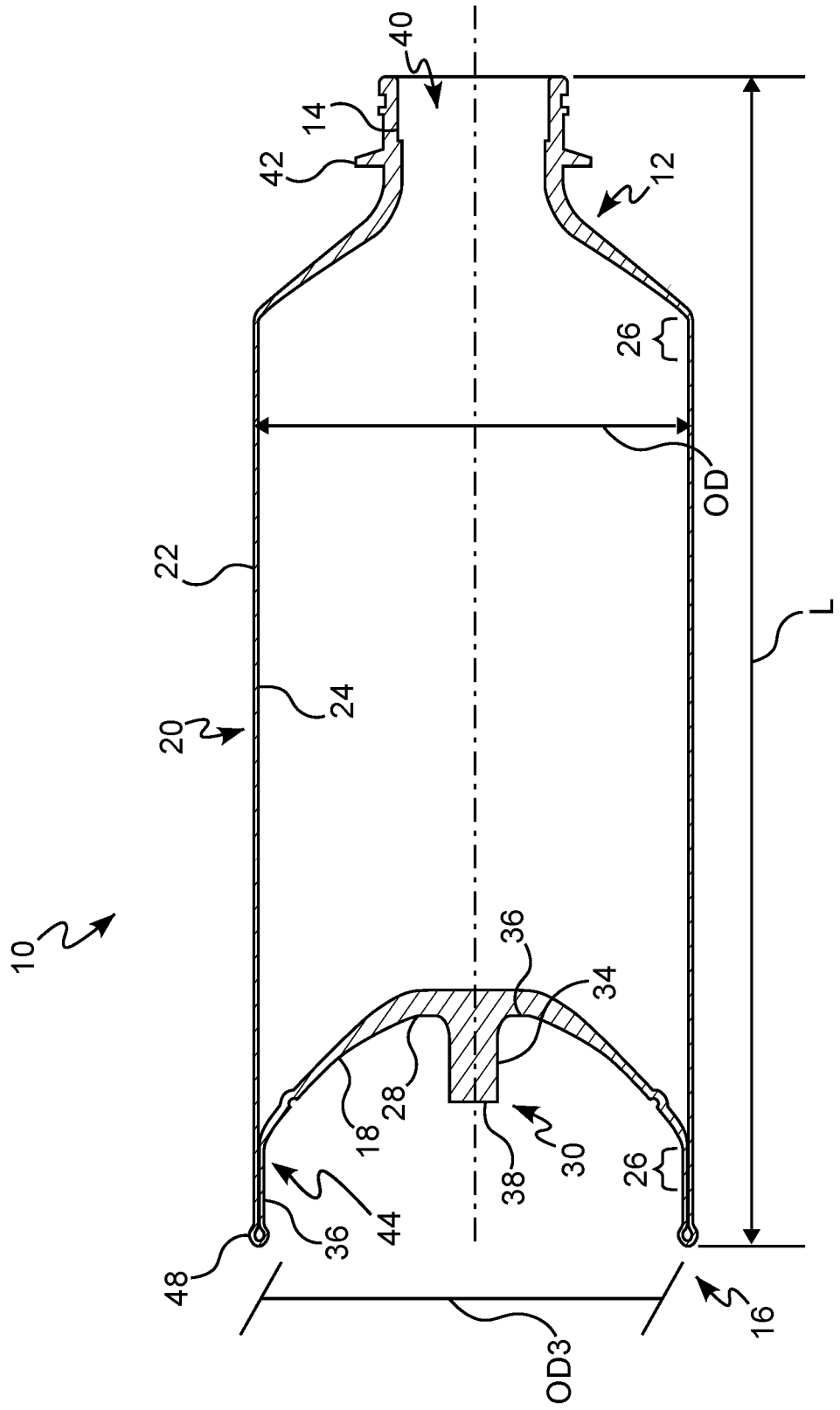
FIG. 3A is a cross-sectional view of a rolling diaphragm syringe in an expanded or unrolled state after an initial rolling according to another example or aspect of the disclosure.
Figure 3C:
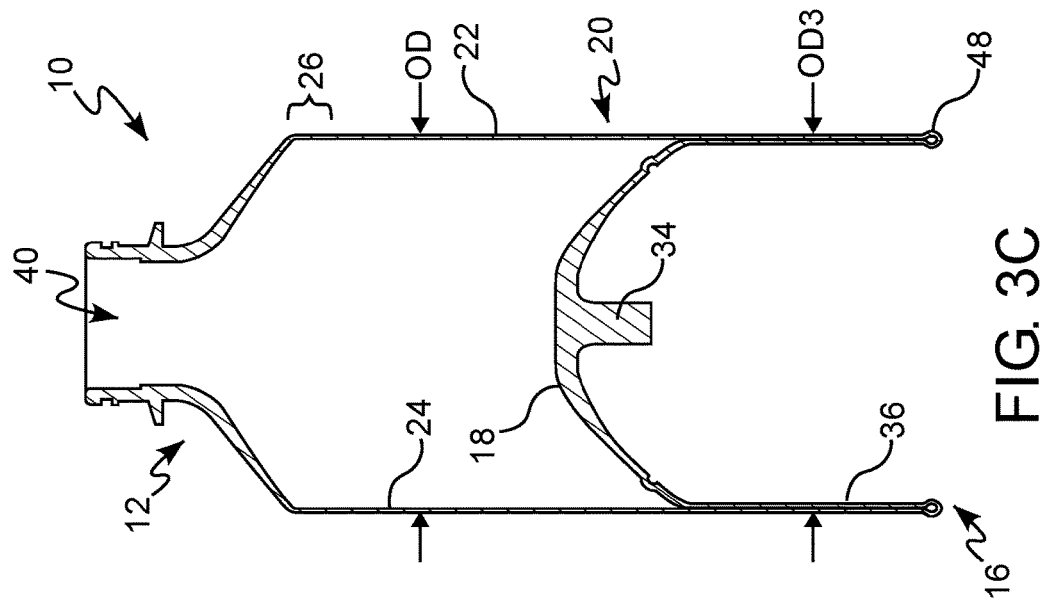
FIGS. 3B-3C are cross-sectional views of the rolling diaphragm syringe of FIG. 3A shown at different fill volumes.
Figure 3B:
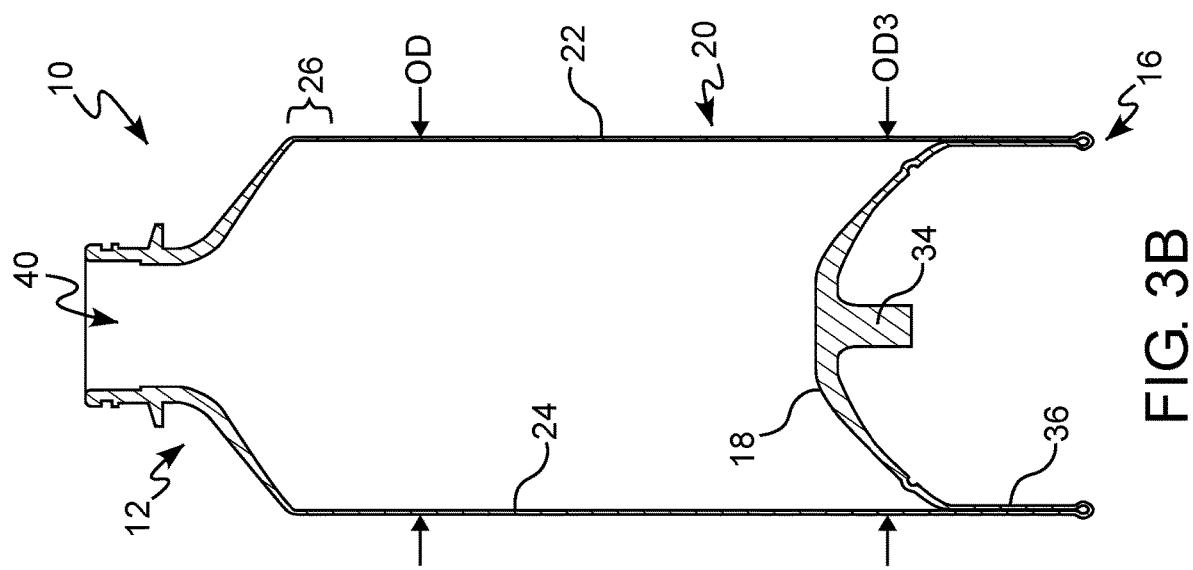

Following the initial rolling, the syringe 10 can be stored and/or shipped to customers or end user in the compressed or rolled state shown in FIGS. 2A-2C. Providing the rolling diaphragm syringe 10 in the compressed or rolled configuration provides economic benefits by reducing space required for storing manufactured syringes. Costs are also reduced since the rolling diaphragm syringes 10 disclosed herein use less raw materials and weigh less than similarly sized conventional disposable syringes used with fluid injectors, as are known in the art. Further, shipping costs are reduced due to the reduced size and weight of the syringe in the compressed, rolled configuration. When ready for use in a fluid injector, the syringe 10 is unrolled by the injector to draw fluid into the syringe interior.

With continued reference to FIGS. 1A-2C, the sidewall 20 of the syringe 10 is an elongated substantially cylindrical structure, which defines a soft, pliable or flexible, yet self-supporting body that is configured to roll upon itself, as a "rolling diaphragm", under the action of a force, such as a piston of a fluid injector and/or syringe rolling apparatus, for example a piston releasably attached or abutted to the end wall 18 of the syringe 10. In particular, the sidewall 20 of the rolling diaphragm syringe 10 is configured to roll such that its inner surface 24 is folded and inverted in a radially inward direction as the piston is moved in a distal direction, such that a rolled portion 24a (see inset in FIG. 2B) of the inner surface 24 is brought near to or in contact with an unrolled portion 24b (see inset in FIG. 2B) of the outer surface 24. The inner surface 24 unrolls and unfolds in the opposite manner in a radially outward direction as the piston is retracted in a proximal direction. In order to permit rolling, the syringe sidewall 20 is a thin sidewall having a radial thickness from 0.005 to 0.025 inch, and in certain embodiments about 0.011 inch.

In various examples or aspects of the rolling diaphragm syringe 10, two portions of the inner surface 24 of the syringe 10 must roll and slide over each other while in abutting contact as the syringe is rolled and unrolled, for example during an initial rolling procedure or an injection procedure. For example, as illustrated in FIGS. 1B and 2B, in the unrolled and rolled configuration of the rolling diaphragm syringe 10, respectively, proximal inner surface 24a is rolled and slides over distal inner surface 24b during the rolling and unrolling process. Frictional contact as the two inner surfaces, such as 24a, 24b, slide over each other results in requiring more force to roll and unroll the syringe and may result in undesired audible noise, such as a loud squeaking during an injection procedure when the frictional forces are present. Without intending to be limited by any particular mechanism, it is believed that texturization of at least a portion of the inner surfaces 24 of the rolling diaphragm syringe 10 with at least one surface texturization feature may reduce surface-to-surface contact area, thereby reducing the coefficient of friction ($\mu$) as the surfaces slide relative to each other. As the coefficient of friction ($\mu$) is reduced, undesired squeaking or other audible noise may be minimized or eliminated, in addition to facilitating in removal of air from between to the two inner surfaces 24a, 24b of rolled syringe 10. Examples of surface texturization techniques and processes that may be utilized herein are described in International Application No. PCT/US2019/016621, the disclosure of which is incorporated herein in its entirety.

According to various examples or aspects of the present disclosure, the rolling diaphragm syringe 10 described herein may comprise at least one surface texturization feature on at least a portion of an inner surface 24 of the flexible sidewall 20 of the rolling diaphragm syringe 10. The at least one surface texturization feature may be selected from the group consisting of a plurality of uniform or non-uniform longitudinal ribs, a plurality of uniform or non-uniform ribs having a spiral configuration around a circumference of the inner surface, a plurality of ribs having a non-uniform pattern on the inner surface, a plurality of flat surfaces, a uniform or non-uniform roughened surface, a plurality of particulates or beads embedded in the sidewall, or any combinations thereof. As used herein the term "uniform" means that each surface texturization feature has substantially the same shape over the entirety of the surface texturization feature, for example, a uniform longitudinal rib will have substantially the same height, length, and/or width. As used herein the term "non-uniform" means that at least one feature of a surface texturization feature has a different shape or size at at least a portion of the texturization feature, for example, a non-uniform longitudinal rib may differ in height, width, and/or length at at least a portion of the rib. Non-limiting examples of non-uniform longitudinal ribs include, for example, ribs extending along only a portion of the syringe sidewall, ribs that have different heights (e.g., extend a different radial distance into the interior volume of the syringe) along the length of the rib, ribs that have different widths (e.g., are wider at one portion than at another) along the length of the rib, ribs that may have gaps along the length of the rib, etc. Non-uniformity of the surface texturization feature may provide a benefit, such as allowing the preform or syringe to be more readily removed from the injection or blow mold, respectively by providing a suitable draft angle for mold removal and/or preventing/limiting undercuts in the molding process.

According to various examples or aspects of the present disclosure, adding at least one texturization feature to at least a portion of the inside surface finish may be accomplished in multiple ways (including combinations of different ways discussed herein). According to certain examples or aspects, texture may be added to a core portion of the injection mold during the molding (injection molding) of the preform and the resulting texture may be transferred to the inner surface of the preform, which upon blow-molding will transfer, potentially in significantly lesser extent (i.e., less depth) as the plastic is stretched during blow-molding process, onto at least a portion of the inner surface 24 of the blow-molded rolling diaphragm syringe 10. According to certain examples or aspects, addition of at least one texturization feature to the syringe 10 may be affected by imparting a texture on the inside surface of the blow-mold which would transfer to the inner surface of the syringe through the outer surface contacting the textured blow-mold surface.

According to other examples or aspects, addition of at least one texturization feature to the syringe 10 may be affected using a texturized rolling piston 210*a* (see FIG. 5D) during a rolling process, wherein at least one texturization feature 219 is transferred from the rolling piston 210*a* through the polymer surface to at least a portion of the inner surface 24 of the syringe 10 (since the rolling piston 210*a* only contacts the proximal end of the syringe 10, the at least one texturization feature would transfer to the proximal inner surface 24*a* of the syringe 10. Various texturized features, such as longitudinal ribs, lateral ribs, diagonal/spiral ribs, random surface texture, specific graphical features, such as words, logos, and outlines, may be utilized as the at least one texturization feature 219 of the rolling piston 210*a*. According to other examples or aspects, addition of at least one texturization feature to the inner surface of the pressure jacket of a rolling apparatus during an initial rolling process may transfer at least one texturization feature to the inner surface 24 (through polymer sidewall 20) as syringe 10 is rolled and pressed against an inner surface of the pressure jacket.

According to other examples or aspects, addition of at least one texturization feature to a finished syringe 10 may be affected by impacting the inner surface 24 with particulates, for example, by sandblasting, dry ice-blasting, ice-blasting, bead-blasting, and/or blasting with solid particulates of a contrast material or sodium chloride or other component of the medical fluid, a portion of the inner surface 24 of the syringe 10, or by chemically or physically (e.g., using an electromagnetic radiation source (E-beam, laser, plasma irradiation, etc.)) etching the polymeric material of the inner surface 24 of the syringe 10 to provide an appropriate texturization feature. For example, with reference to FIG. 6D, a texturization device 500 may extend within at least a portion of the interior of the syringe 10 such that the texturization device 500 faces at least a portion of the inner surface 24. In some examples or aspects, the texturization device 500 may be configured for spraying at least a portion of the inner surface 24 with solid particulates, such as, by sandblasting, dry ice-blasting, ice-blasting, or bead-blasting. In other examples or aspects, the texturization device 500 may be configured for spraying a chemical on at least a portion of the inner surface 24 to etch the polymeric material of the inner surface 24 of the syringe 10 with a desired texturization feature. In further examples or aspects, the texturization device 500 may be configured for irradiating at least a portion of the inner surface 24 with electromagnetic energy from an electromagnetic radiation source to etch the polymeric material of the inner surface 24 of the syringe 10 with a desired texturization feature. In some examples or aspects, the texturization device 500 may be configured to apply a lubricous coating to the inner surface 24 of the syringe 10, such as a medical grade silicone or a non-silicone lubricous coating, such as for example TRIBOGLIDE.

According to certain examples or aspects, the outer surface of the plunger and/or the inner surface of the pressure jacket of the rolling apparatus (not shown) may be heated, for example at a temperature from room temperature up to the glass transition temperature Tg of the material of the rolling diaphragm syringe. For example, as shown in FIG. 6D, a heater 600 may be provided for heating at least a portion of a pressure jacket 112 of a syringe rolling device. A similar heater 600 may be provided with the piston of the rolling apparatus. In some examples or aspects, the heater 600 may be a conductive heater configured for heating the surface of the pressure jacket 112 through direct physical contact with the pressure jacket 112. In other examples or aspects, the heater 600 may be configured for heating the surface of the pressure jacket 112 by radiating heat. In further examples or aspects, the heater 600 may be a laser. The heater 600 may be configured for heating at least a portion of the syringe 10 prior to and/or during rolling of the syringe 10. In some examples or aspects, the heater 600 may be configured for heating at least a portion of the syringe 10 after rolling of the syringe 10, for example to anneal at least a portion of the material of the syringe 10 after rolling.

Figure 12:
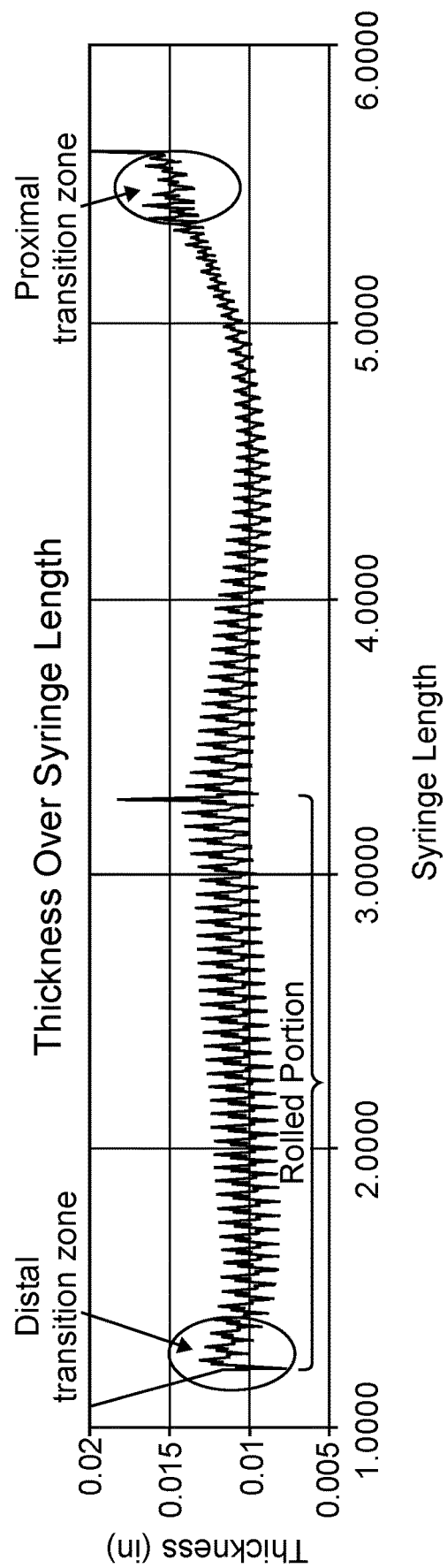
FIG. 12 is a graph showing a sidewall thickness along a longitudinal length of a rolling diaphragm syringe.

In certain embodiments, the proximal and distal ends 16, 12 of the syringe 10 may be thicker than the cylindrical sidewall 20 of the syringe 10, for example to accommodate forces of loading and delivering a fluid under pressure. Thicker sidewall 20 at the proximal and distal ends 16, 12, of the syringe 10 may also improve manufacturability of the syringe 10 during the blow-molding process. In that case, transition zones 26 between the thicker end wall portions or distal conical portion and thinner sidewalls are intended to be short, which may be accomplished by the stretch blow molding process. For example, as shown in FIG. 1B, the cylindrical portion of the sidewall 20 can taper towards the proximal and distal ends 16, 12 of the syringe 10, such that middle cylindrical portions of the sidewall 20 are about 25% to 50% thinner than the portions 26 of the sidewall 20 adjacent to the proximal and distal ends 16, 12 of the syringe 10. In some examples or aspects, the thicker portions of the sidewall 20 may have a radial thickness of from 0.015 to 0.025 inch while, as indicated above, a middle portion of the cylindrical sidewall 20 has a radial thickness from 0.005 to 0.015 inch, and in specific embodiments about 0.011 inch. FIG. 12 shows a circumferential measurement of syringe sidewall thickness along the length of the syringe 10 in a direction from the distal end 12 toward the proximal end 16. In some examples or aspects, such sidewall thickness measurement may be performed using the measurement device 700 discussed herein with reference to FIG. 6E. The peaks and valleys at each distance point illustrate a deviation in sidewall thickness about the circumference of the syringe 10. It may be desirable to minimize the variation between the peaks and valleys in the thickness measurement in order to prevent the sidewall 20 from buckling during initial rolling or during a fluid injection. Additionally, substantially uniform thickness about the circumference of the syringe 10 contributes to a uniform rolling force necessary for rolling the syringe sidewall 20.

Figure 3E:
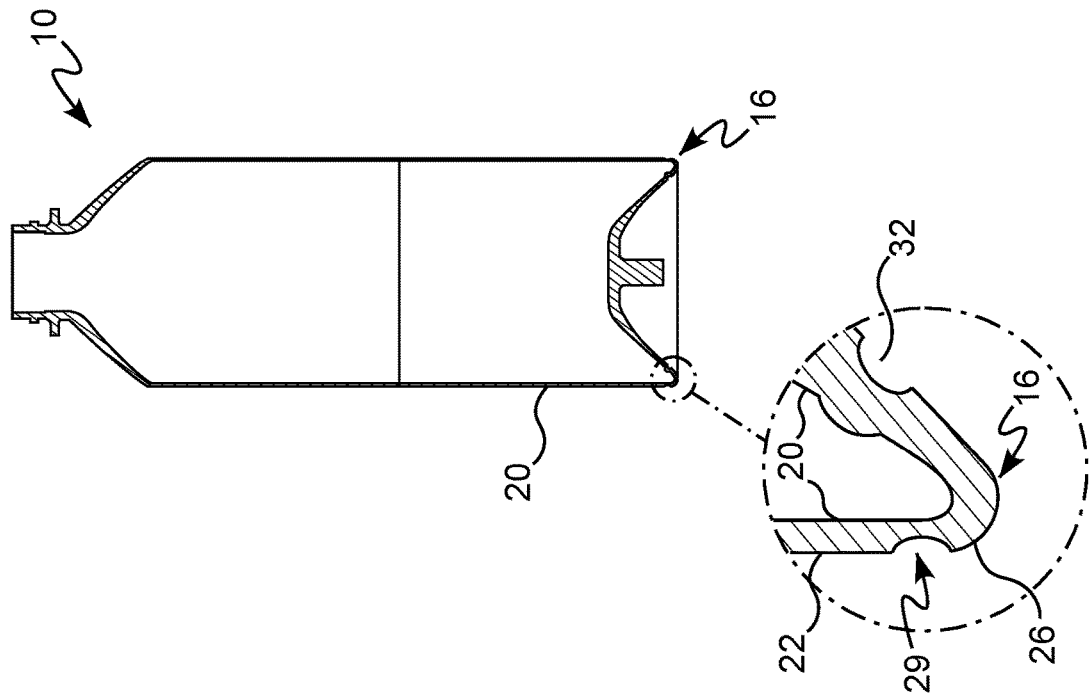
FIG. 3E is a cross-sectional view of a rolling diaphragm syringe in an expanded or unrolled state according to another example or aspect of the disclosure.
Figure 3D:
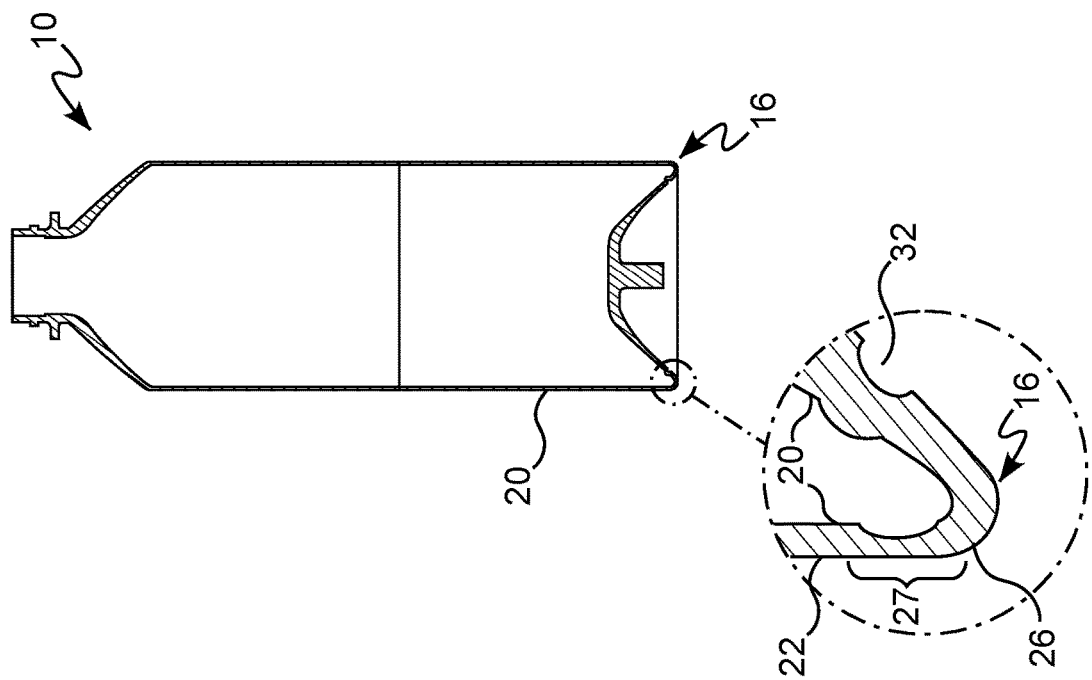
FIG. 3D a cross-sectional view of a rolling diaphragm syringe in an expanded or unrolled state according to another example or aspect of the disclosure.

With reference to FIGS. 3D-3E, the transition portion 26 and/or the sidewall 20 at the proximal end 16 of the syringe 10 may be configured to facilitate initial rolling over of the syringe 10. With reference to FIG. 3D, the transition portion 26 and/or the sidewall 20 at the proximal end 16 of the syringe 12 may have a thin portion 27 having a reduced radial thickness compared to the rest of transition portion 26 of the sidewall 20 of the syringe 10 to initiate rolling over of the syringe sidewall 20 at the thin portion 27. In some examples or aspects, the thin portion 27 of the sidewall 20 may have a radial thickness of from 0.005 inches to 0.10 inches. In other examples or aspects, such as shown in FIG. 3E, the transition portion 26 and/or the sidewall 20 at the proximal end 16 of the syringe 12 may have a notch 29 that extends radially inward from an outer surface 22 of the syringe 10. The notch 29 may have a reduced radial thickness compared to the rest of transition portion 26 of the sidewall 20 of the syringe 10 to initiate rolling over of the syringe sidewall 20 at the notch 29. In some examples or aspects, initiating the rolling of the syringe 10 having the thin portion 27 or the notch 29 may be done without pressurizing the interior of the syringe 10 or by pressurizing the interior to a lower pressure than embodiments without the thin portion 27 or the notch 29.

In certain embodiments, the sidewall 20 may have a smooth, substantially uniform structure with a constant thickness along a majority of its length. In some embodiments, the sidewall 20 can also include one or more ribs (not shown) provided thereon to facilitate rolling and/or to maintain spacing between rolled and unrolled portions of the sidewall 20. As described herein in various embodiments, at least a portion of the sidewall 20 may include at least one surface texturization feature. According to various embodiments, the thicker portions of the sidewall 20 in the transition zones 26 adjacent to the proximal and distal ends 16, 12 of the syringe 10 may be too stiff to initiate rolling over without buckling during the rolling process. For example, the thicker portion of the sidewall 20 in the transition zone 26 at the proximal end 16 may buckle during initial rolling without internally supporting the sidewall. To prevent such buckling, increased pressure within the syringe interior during the rolling process may help support the sidewall and prevents buckling. In specific embodiments of the syringe 10 having the thicker portion of the sidewall 20 in the transition zone 26 at the proximal end 16, rolling of the syringe 10 may be initiated at a portion of the sidewall 10 just distal to the transition zone 26 as the proximal end 16. During regular use of the syringe 10, such as when filling the syringe 10 with fluid, the syringe sidewall 20 may be limited from rolling back into this transition zone 26, for example, by limiting a distance over which the proximal end 16 of the syringe is retracted in the proximal direction.

In some examples or aspects, the closed end wall 18 is a concave or dome-shaped structure to facilitate initiation of the rolling of the sidewall 20 and/or to provide a receiving space or pocket to receive a convex distal end of a piston of the rolling apparatus and/or the fluid injector. Further, the end wall 18 may have a non-uniform thickness, for example in a radial direction extending from a central longitudinal axis of the rolling diaphragm syringe 10. For example, at least a portion of the end wall 18 may be thicker near the center and thinner near the connection with the sidewall 20, for example via the transition zone 26. The closed end wall 18 may be shaped to interface directly with a piston of the rolling apparatus and/or a fluid injector. In particular aspects, the piston may be shaped to substantially match the shape of the closed end wall 18 or, alternatively and as described in detail herein, pressure from the piston as it is moved distally may conform the end wall 18 and/or other portions of the proximal end 16 of the syringe 10 to substantially match a shape of at least a portion of the piston. An exemplary piston 210 that can interface with the end wall 18 is shown in FIGS. 5A-5D.

In some examples or aspects, the end wall 18 may have a central portion 28 including a piston engagement portion 30 extending proximally therefrom, such as an approximate midpoint of the central portion 28. In some aspects, a distal most end of the central portion 28 may be substantially flat. The end wall 18 can also include one or more annular ribs 32 extending around a periphery of the central portion 28. The one or more annular ribs 32 may be configured to form an initiation point for deflection during rolling of the syringe 10 and/or add hoop strength to the end wall 18. In other examples, or aspects, the one or more annular ribs 32 may reduce deflection of the end wall during a rolling or unrolling process, thereby reducing a "wiper seal" effect where close contact between the two portions of the inner surface creates a seal which can entrap air between the rolled inner surface 24a and the unrolled portion of the inner surface 24b during filling of the syringe 10 with fluid. The position of the one or more annular ribs 32 on the end wall 18 may be varied, such as by moving the one or more annular ribs 32 in a proximal or distal direction along the end wall 18, to change the initiation point for deflection during rolling of the syringe 10 and/or add hoop strength to the end wall 18. In further examples or aspects, the size of the one or more annular ribs 32, such as the depth of the one or more ribs 32 in a direction substantially perpendicular to the sidewall 20 of the syringe 10 at the end wall 18 or a width of the one or more annular ribs 32 in a direction substantially parallel to the sidewall 20 of the syringe 10 at the end wall 18, may be varied to change the initiation point for deflection during rolling of the syringe 10 and/or add hoop strength to end wall 18.

The piston engagement portion 30 is configured for engagement with an engagement mechanism on a piston of the fluid injector or the piston of the rolling apparatus. In some examples or aspects, the piston engagement portion 30 includes a stem 34 having a first end 36 connected at the central portion 28 of the end wall 18 and a second end 38 extending proximally from the first end 36. A diameter of the stem 34 may be uniform between the first end 36 and second end 38. Alternatively, the diameter of the stem 34 may be non-uniform between the first end 36 and the second end 38. For example, the diameter of the stem 34 may gradually decrease from the first end 36 to the second end 38 or in other embodiments the diameter may gradually increase from the first end 36 to the second end 38.

Further, in some examples or aspects, the second end 38 of the stem 34 may include an engagement member, such as at least one flange or protrusion 60 (shown in FIG. 6B), that protrudes radially outward relative to the outer surface of the stem 34. The engagement member could be configured as a lip (not shown) that is recessed radially inward into the stem 34. According to another embodiment, the engagement member may be an annular concave groove or convex rib extending around the circumference of the stem 34. The at least one protrusion 60 may extend circumferentially around at least a portion of the stem 34 in a continuous or discontinuous manner. The protrusion 60 may be monolithically formed with the stem 34. In some examples or aspects, the protrusion 60 may be monolithically formed with the stem 34 during rolling of the syringe 10, as described herein with reference to FIGS. 6A-6B. In other examples or aspects, the protrusion may be formed separately from the stem 34 and removably or non-removably attached to the stem 34. The protrusion can be configured for interacting with one or more engagement pins or surfaces of an engagement mechanism of a fluid injector that moves radially inward and outward to engage and disengage the stem 34 of the rolling diaphragm syringe 10.

With continued reference to FIGS. 1A-2C, in some examples or aspects, the discharge neck 14 at the open distal end 12 of the syringe 10 is adapted to be received in an interior portion of a pressure jacket such that the discharge neck 14 is aligned with an outlet port of the pressure jacket. In that case, the discharge neck 14 may have a frusto-conical shape that gradually narrows from the cylindrical sidewall 20 to the discharge neck 14. In certain aspects, the discharge neck 14 may terminate in an open discharge port 40. In some examples or aspects, the port 40 may be covered by a seal, such as a fracturable seal for sterility purposes. For example, the seal can include a piercable foil or an elastomeric seal.

The distal end 12 and/or discharge neck 14 can further include a connection member, such as a flange or threaded connection member 42, for connecting to a corresponding connection member, for example a cap, which may connect to a fluid path set (not shown) or for connecting to a portion of the fluid injector to maintain the syringe within the pressure jacket. The connection member 42 can be a radial flange or a cylindrical surface or interface having radially outwardly directed threads for connection to a corresponding threaded cap or connector. In other aspects, the connection member 42 may have one or more lips or grooves that interact with corresponding grooves or lips on a cap of a pressure jacket to releasably or non-releasably retain the rolling diaphragm syringe 10 within the pressure jacket. Alternatively, the connection member may interface with an inner surface of a cap that supports the front end of the syringe and interfaces and releasably engages the distal end of a pressure jacket.

As discussed herein, the initial rolling action may mold, shape, or form portions of the syringe 10 thereby producing a syringe 10 having a unique shape that is well suited for fluid delivery with a fluid injector. In particular according to certain embodiments, changes to the shape of the syringe 10 caused by the initial rolling action may modify the shape of the end wall 18 and/or sidewall 20 of the syringe 10 so that it is better able to reproducibly roll and unroll without buckling or yielding.

As shown in FIG. 2B, the proximal end 16 of the molded or reformed syringe 10 may include an annular recessed or step portion 44 extending along a portion of the sidewall 20 from a periphery of the end wall 18. The step portion 44 may have a substantially cylindrical sidewall 46 and an outwardly flared portion or flare 48 extending radially from the substantially cylindrical sidewall 46. A length L2 of the step portion 44 is selected to reduce contact between rolled portion of the inner surface 24a and an unrolled portion 24b of the inner surface 24 of the syringe sidewall 20 as shown in FIG. 2B. In certain embodiments, the dimensions of the annular or step portion 44 may be selected to reduce or eliminate a wiper seal effect, which occurs when portions of the inner surface 24a, 24b of the surface 24 come into contact as shown in FIG. 2B and may entrap air or other gas between the inner surfaces 24a, 24b. Further, the contact may cause noise (e.g., an undesired squeaking sound) as the syringe sidewall 20 is rolled upon itself, for example due to frictional interaction between the inner surfaces 24a and 24b. Such frictional interaction may also place additional strain on the injector motor, potentially reducing the lifetime of one or more motor components. High contact and friction forces may also cause the syringe sidewall 20 to buckle, form one or more pleats, or generate particulates from the inner surfaces 24a, 24b during rolling. In some examples or aspects, the length L2 of the annular or step portion 44 is from 0.1 to 0.5 inch, and in specific embodiments 0.3 inch. Further, an inner and an outer diameter of the annular or step portion 44 are smaller than other portions of the syringe sidewall 20, which results in the step shape shown in FIGS. 2B and 3A. For example, a maximum inner diameter ID1 of the cylindrical sidewall 46 may be from 1% to 5% less than a maximum inner diameter ID2 of the syringe sidewall 20. In one example, the maximum inner diameter ID1 of the sidewall 46 is from 1.75 inches to 1.89 inches and the maximum inner diameter ID2 of the distal end is from 1.80 to 1.90 inches.

FIG. 3A shows the syringe 10 in an unrolled or expanded state after initial rolling. The proximal end 16 and the end wall 18 are slightly recessed within the syringe sidewall 20, such that a proximal-most portion of the syringe 10 flares outwardly beyond the sidewall 20. For example, the syringe 10 may be unrolled to the step portion 44 and/or extending portion 46 formed by the piston as described above. In that case, the cylindrical portion 46 is adjacent to the sidewall 20. A flared diameter OD3 of the proximal-most portion of the syringe 10 may be slightly larger than the syringe diameter OD. For example in certain embodiments, the flared diameter OD3 may be between 1.90 and 1.940 inches.

Having described the syringe 10 both prior to initial rolling (shown in FIGS. 1A-1C and 3D-3E) and following initial rolling (shown in FIGS. 2A-3C), a syringe rolling apparatus 110 and method for initial rolling of the rolling diaphragm syringe 10 will now be described with reference to FIGS. 4-5D.

As discussed herein, during initial rolling, the syringe 10 is empty (e.g., does not contain a medical fluid for injection). For various embodiments of the rolling diaphragm syringe 10 having a thin sidewall 20, a force to initiate rolling of the syringe 10 may be greater than a force that will buckle the thin sidewall 20. As such, rolling an empty syringe 10 may cause the syringe sidewall 20 to buckle, pleat, or otherwise deform, thereby rendering the syringe unusable. According to the embodiments of the apparatus 110 and method disclosed herein, the buckling force may be counteracted by pressurizing the syringe interior with fluid so that an outer surface 22 of the sidewall 20 contacts a pressure jacket 112 positioned to support the syringe sidewall 20. Suitable pressurization fluids may include a gas, such as air, nitrogen, an inert gas, or a gas capable of sterilizing the interior of the syringe, such as ethylene oxide. Pressurizing the syringe 10 may increase the inner diameter of the syringe 10 and may press the outer surface 22 of the sidewall 20 against an inner surface of a pressure jacket 112. Pressurizing the syringe 10 may also help to keep the portions 24a, 24b of the syringe inner sidewall 24 from touching during the rolling process. Avoiding such touching is important because a coefficient of friction between the surface portions 24a, 24b can be high and lead to buckling when contact occurs and/or undesired particulate formation within the syringe.

Figure 4A:
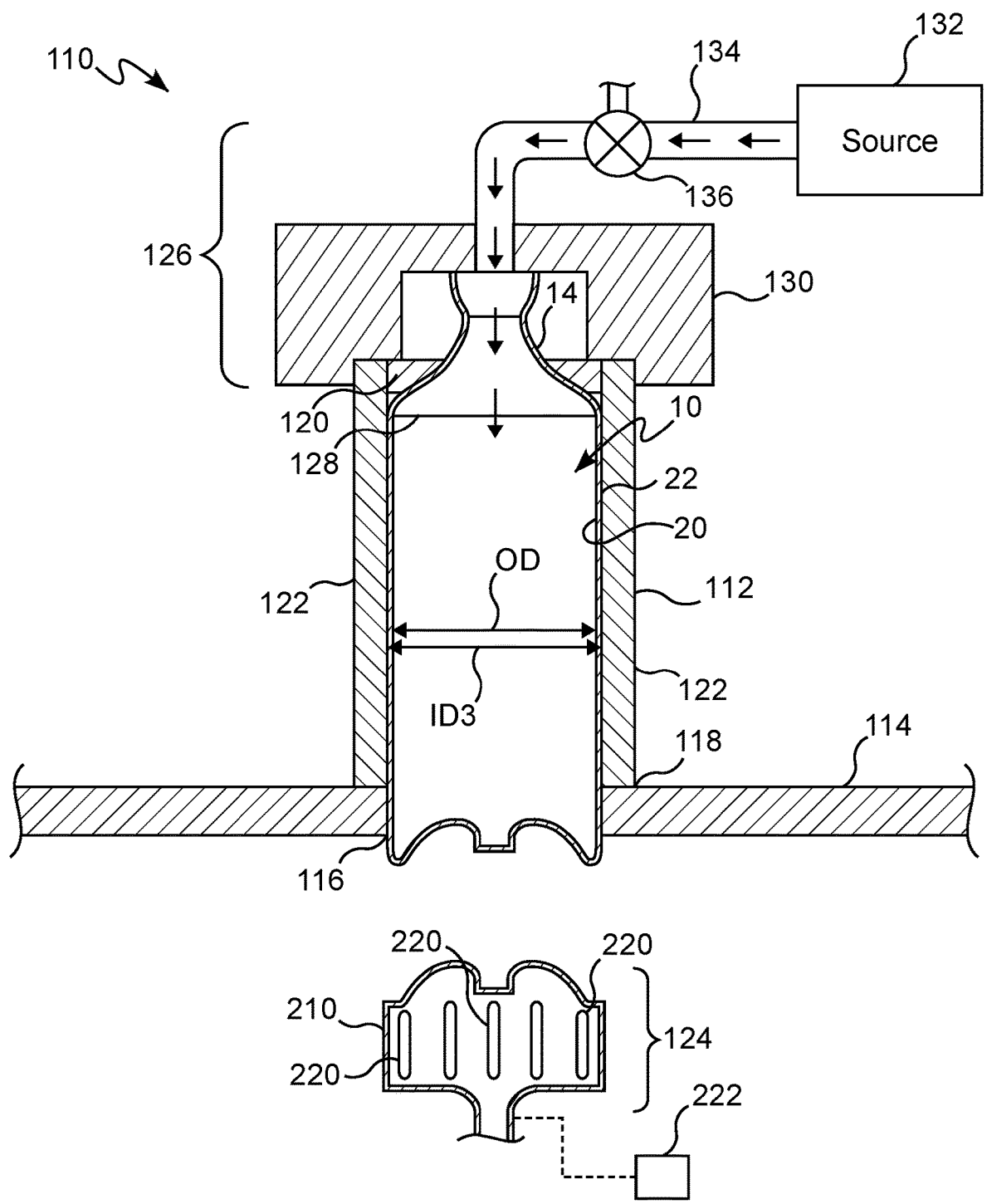
FIG. 4A is a schematic drawing of a syringe rolling apparatus for initially rolling a molded rolling diaphragm syringe according to another aspect of the present disclosure.

With reference to FIG. 4A, certain embodiments of the syringe rolling apparatus 110 includes a platform or base 114 defining one or more annular syringe ports 116 configured to each receive the empty unrolled syringe 10. In some examples or aspects, the platform or base 114 may be connected to a stand 115 (shown in FIG. 4C). According to certain embodiments, the stand 115 may have wheels 117 to allow movement of the platform or base 114. The stand 115 may have a control panel 119 for controlling one or more functions of the syringe rolling apparatus 110. While an embodiment showing an apparatus for rolling a single syringe at a time is generally shown in FIGS. 4C-4D, specific embodiments of the syringe rolling apparatus may have a plurality of syringe rolling features capable of rolling a plurality of syringes at a time in a high throughput operation are also described.

With continued reference to FIG. 4A, the syringe port 116 is surrounded by the pressure jacket 112 for providing structural support, referred to as hoop strength, for the thin sidewall 20 of the syringe 10 and, in particular, to counteract the buckling force which occurs during rolling. In some aspects, such as shown in FIGS. 4A and 4D, the pressure jacket 112 may include an elongated tubular structure including an open proximal end 118 adjacent to the syringe port 116, an open distal end 120, and a sidewall 122 extending therebetween. In certain embodiments, the pressure jacket 112 may be formed from a clear or translucent material so that a user can observe the syringe 10 as it rolls or unrolls. In other embodiments, the pressure jacket 112 may be formed from a metal or opaque composite material. In certain embodiments, the pressure jacket 112 may be slightly shorter than the syringe 10, such that the open distal end 12 and discharge neck 14 of the syringe 10 protrudes from the open distal end 120 of the pressure jacket 112. As previously described, an inner diameter ID3 of the pressure jacket 112 may be larger than the outer diameter OD of the syringe sidewall 20, thereby providing a gap between the outer surface 22 of the syringe sidewall 20 and the pressure jacket 112 prior to pressurizing the syringe 10. For example, the gap can be a radial distance of from 0.01 to 0.1 inch or more. When syringe 10 is pressurized with fluid (e.g., a gas or air), sidewall 20 of the syringe 10 extends radially outward, such that the outer surface 22 of the sidewall 20 contacts the inner surface of the pressure jacket sidewall 122.

With reference to FIGS. 4E-4F, a proximal portion 113 of the pressure jacket 112 may have a holding portion 115 for retaining the proximal end 16 of the syringe 10 during initial rolling. As shown in FIGS. 4E-4F, the holding portion 115 may have a plurality of sections 115a, 115b that are radially movable in a direction of arrow D relative to a distal end 117 of the pressure jacket 112 between a first position configured for holding the proximal end 16 of the syringe 10 and a second position configured for releasing the proximal end 16 of the syringe 10. In some examples or aspects, the holding portion 115 may have a plurality of gripping elements 121 (FIG. 4E) configured for engaging the outer surface 22 of the syringe 10 and preventing distal movement of the syringe 10 during initiation of the rolling of the sidewall 20. In other examples or aspects (FIG. 4F), the holding portion 115 may have an adhesive 123 configured for adhering to the outer surface 22 of the syringe 10 and preventing distal movement of the syringe 10 during initiation of the rolling of the sidewall 20. In further examples or aspects, the holding portion 115 may have a roughened surface texture that is configured for gripping the outer surface 22 of the syringe 10 to prevent axial movement of the syringe 10 relative to the pressure jacket 112 during rolling.

In further examples or aspects, such as shown in FIG. 4G, the proximal end 113 of the pressure jacket 112 may have a heated portion 125. The heated portion 125 may be configured for heating the sidewall 20 at the proximal end 16 of the syringe 10 to a temperature ranging from just above room temperature up to near the glass transition temperature of the syringe material. In this manner, the sidewall 20 at the proximal end 16 of the syringe 10 will be softer and more pliable than the rest of the sidewall 20, thereby assisting the initiation of the rolling of the sidewall 20 at the proximal end 16 of the syringe 10. In some examples or aspects, the piston 210 may have the heated portion 125. In further examples or aspects, both the proximal end 113 of the pressure jacket 112 and the piston 210 may have the heated portion 125. In some examples or aspects, the heated portion 125 may be a conductive heater configured for heating the surface of the pressure jacket 112 and/or the piston 210 through direct physical contact with the pressure jacket 112 and/or the piston 210. In other examples or aspects, the heated portion 125 may be configured for heating the surface of the pressure jacket 112 and/or the piston 210 by radiating heat. In further examples or aspects, the heated portion 125 may have a laser configured for heating the sidewall 20 of the syringe 10. The heater portion 125 may have a basin in which a heated liquid is received. The proximal end 16 of the syringe 10 may be placed in the heated liquid within the basin such that the heated liquid heats the sidewall 20 of the syringe 10 at the proximal end 16.

In some examples or aspects, the piston 210 may be configured for cooling the heated portion of the sidewall 20 during rolling of the syringe 10. For example, the piston 210 may be made from metal, such as aluminum, so that the piston 210 acts as a heat sink to absorb the heat from the heated portion of the sidewall 20. With pressure jackets 112 shown in FIGS. 4E-4G, initiation of rolling of the syringe sidewall 20 may be done without pressurizing the interior of the syringe 10 or by pressurizing the interior of the syringe 10 to a pressure less than the first pressure. Without intending to be limited by any particular mechanism, it is believed that retaining the proximal end 16 of the syringe 10 during initiation of the rolling of the sidewall 20 may help prevent buckling of the sidewall 20 during the rolling process.

With reference to FIG. 4A, embodiments of the syringe rolling apparatus 110 may further include a linear or rotary actuator 124 configured to drive a rolling piston 210 through the syringe port 116 to engage the end wall 18 of the syringe 10 to initiate rolling of the syringe 10. Exemplary pistons 210 which can be used for reforming or molding the proximal end of the syringe 10 are shown in FIGS. 5A-5D. The piston 210 may include a cylindrical bottom portion 212 having a first maximum outer diameter OD1 and a cylindrical step portion 214 extending distally from the bottom portion 212 having a second maximum outer diameter OD2. The second maximum outer diameter OD2 is less than the first maximum diameter OD1, resulting in the stepped configuration. For example, the second maximum outer diameter OD2 can be from 1% to 5% less than the first maximum outer diameter OD1. In one example, the first diameter OD1 may range from 1.80 to 1.85 inches and the second diameter OD2 may range from 1.75 inches to 1.80 inches. The piston 210 may further include a cap portion 216 defining a distal hemispheroidal surface 218 extending from the step portion 214 configured to be received by the concave dome-shaped end wall 18 of syringe 10.

Figure 5A:
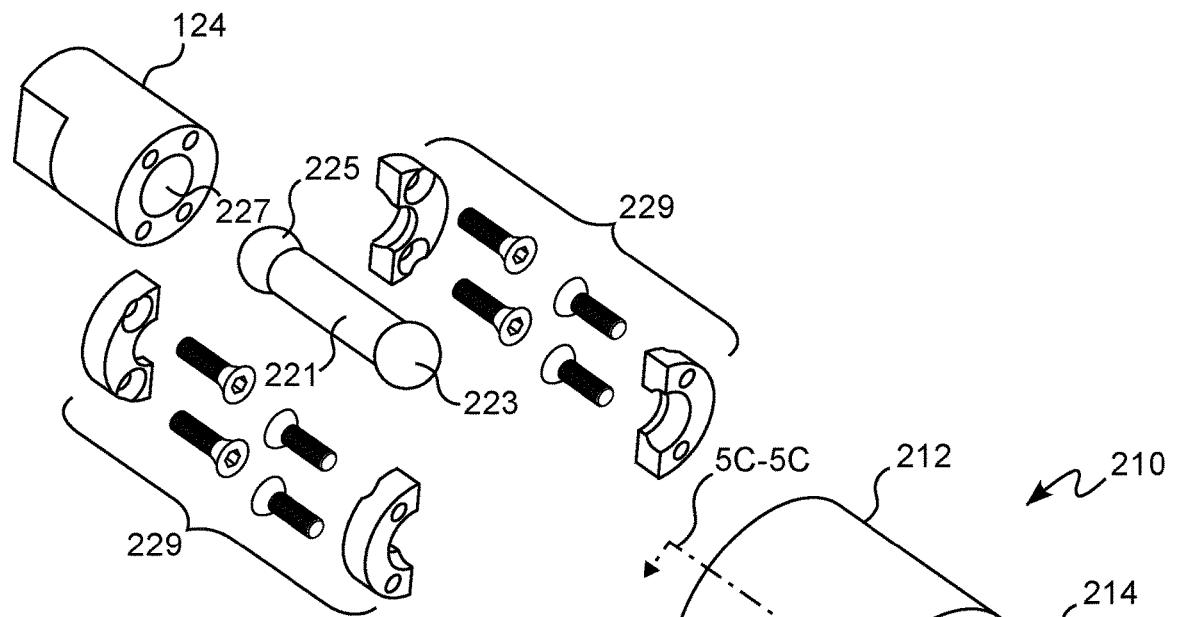
FIG. 5A is a perspective view of a piston of the syringe rolling apparatus of FIG. 4A according to another example or aspect of the disclosure.
Figure 5B:
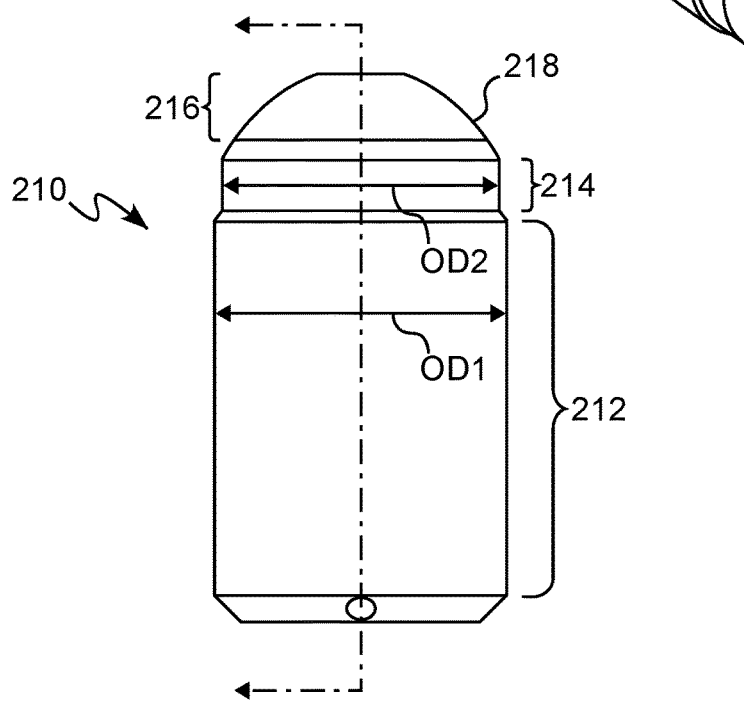
FIG. 5B is a front view of the piston of FIG. 5A.
Figure 5C:
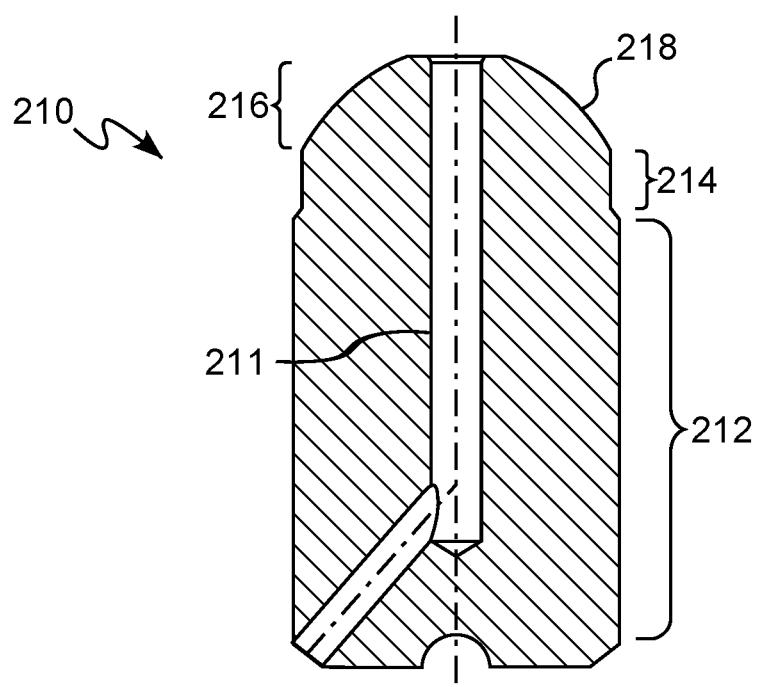
FIG. 5C is a cross-sectional view of the piston of FIG. 5A taken at line 5C-5C.
Figure 5D:
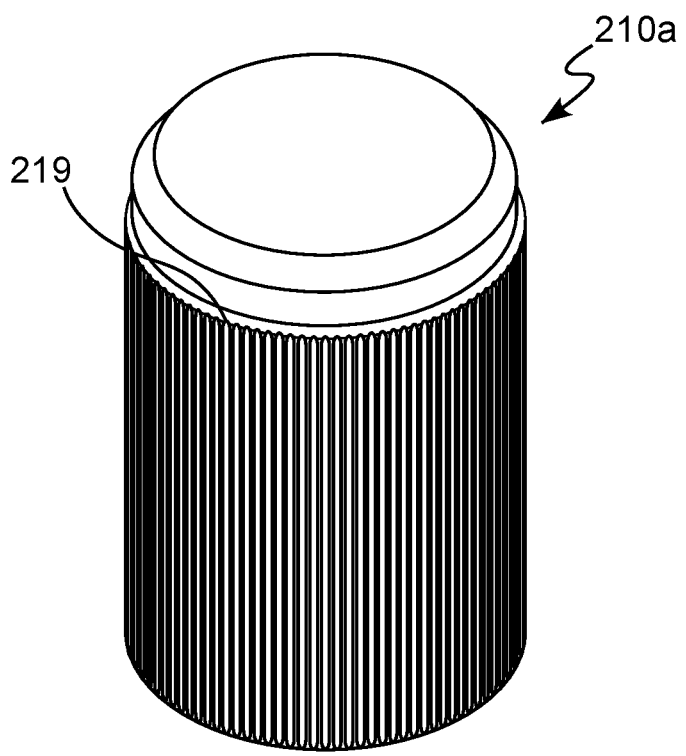
FIG. 5D is a perspective view of a piston of the syringe rolling apparatus of FIG. 4A according to another example or aspect of the disclosure.

As shown in FIG. 5A, an embodiment of the piston 210 may have a post 221 having a first end 223 connected to the piston 210 and a second end 225 connected to the actuator 124. In some examples or aspects, the first and second ends 223, 225 of the post 221 may be substantially spherical and configured for being received within a corresponding socket 227 on the piston 210 and the actuator 124. The first and second ends 223, 225 of the post 221 may be retained within the corresponding sockets 227 on the piston 210 and the actuator 124 by one or more retaining elements 229. FIG. 5C includes a cross-sectional view of an embodiment of the piston 210. The piston 210 may include a pressure relief passageway 211 extending through the body of the piston 210 to allow pressure equilibration between the distal end 218 and the end wall 18 of the syringe 10 as the piston 210 engage or disengages the end wall 18. As shown in FIG. 5D, at least one texturization feature 219 may be provided on at least a portion of an outer surface of the rolling piston 210a to provide various texturized features on the inner surface of the sidewall of the syringe 10, such as longitudinal ribs, lateral ribs, diagonal/spiral ribs, random surface texture, specific graphical features, such as words, logos, and outlines.

Referring to FIG. 4A, in some examples or aspects, the piston 210 includes centering ribs 220 extending axially along a sidewall of the piston 210. As discussed above, the centering ribs 220 are structures for maintaining positioning of the piston 210 within the pressure jacket 112 and, in particular, to keep the piston 210 centered in the pressure jacket 110 so that rolled and unrolled portions of the syringe 10 are properly aligned following initial rolling. For example, the centering ribs 220 can be configured to contact the inner surface 122 of the pressure jacket 112 as the piston 210 is advanced through the pressure jacket 112 to ensure that the sidewall of the piston 210 remains parallel to the inner surface 122 of the pressure jacket 110 during rolling and unrolling. In other examples or aspects, a centering structure could be an annular seal extending around a portion of the piston 210. In other examples or aspects, linear bearings in the piston 210 or linear actuator 124 could be used for maintaining positioning of the piston 210. According to certain embodiments, the centering ribs 220 may also texturize as least a portion of the inner surface 24 of the sidewall 20 of the syringe 10.

In certain embodiments, the piston 210 and/or actuator 124 can further include a force sensor 222 for measuring force required to advance the piston 210 through the pressure jacket 112 and roll the syringe 10. If a force measured by the force sensor 222 is greater than a predetermined or target value, the system 110 may determine that the piston 210 was not properly positioned and that the rolled syringe 10 is out of specification or not valid. As such, any syringes 10 which requires more than the expected force to roll can be discarded.

With further reference to FIG. 4A, the syringe rolling apparatus 110 may include a seal assembly 126 configured to engage the open discharge neck 14 of the syringe 10 for producing a fluid-tight seal about the discharge neck 14 and for pressurizing the syringe 10 with fluid. The seal assembly 126 can include a removable mounting flange 128 (also shown in FIG. 4C) configured to attach around the discharge neck 14 of the syringe 10 and engage the distal open end 120 of the pressure jacket 112. The seal assembly 126 also includes a cap 130 connected to a source 132 of pressurized fluid (such as air, gas, or liquid) by a pressure hose 134. The cap 130 is configured to engage the flange 128 and seal the discharge neck 14 of the syringe 10. The cap 130 may be mounted on a movable arm 131 configured for movement between a raised position, in which the cap 130 is disengaged from the flange 128, and a lowered position, in which the cap 130 is sealed against the flange 128 and the discharge neck 14 of the syringe 10. When the cap 130 is sealed to the discharge neck 14 of the syringe 10, fluid communication between the source 132 of pressurized air and the interior of the syringe 10 is established through the pressure hose 134. The source 132 of pressurized gas or liquid can be, for example, a mechanical pump or a compressed air or gas reservoir. Once the seal assembly 126 is properly engaged to the syringe 10, gas or liquid can be pumped into the interior of the syringe 10 through the pressure hose 134 to pressurize the syringe 10.

In some aspects, the syringe rolling apparatus 110 may also include a pressure release valve 136, such as a check valve or high pressure crack valve, positioned in the conduit or flow path 134 for releasing excessive pressure from the interior of the syringe 10 as the syringe is being rolled and/or to maintain the pressure in the syringe 10 at the first pressure. In other embodiments once rolling is initiated, less pressure may be needed to counteract the buckling force of the syringe sidewall 20 and pressurized fluid, such as air, can be released from the syringe interior as the risk of buckling is reduced. In some aspects, the valve 136 can be configured so that pressure of the syringe interior remains below an acceptable level, such as 100 psi. It is believed that when subjected to pressure above 100 psi, the plastic material of the syringe 10 may permanently yield or deform.

Figure 4B:
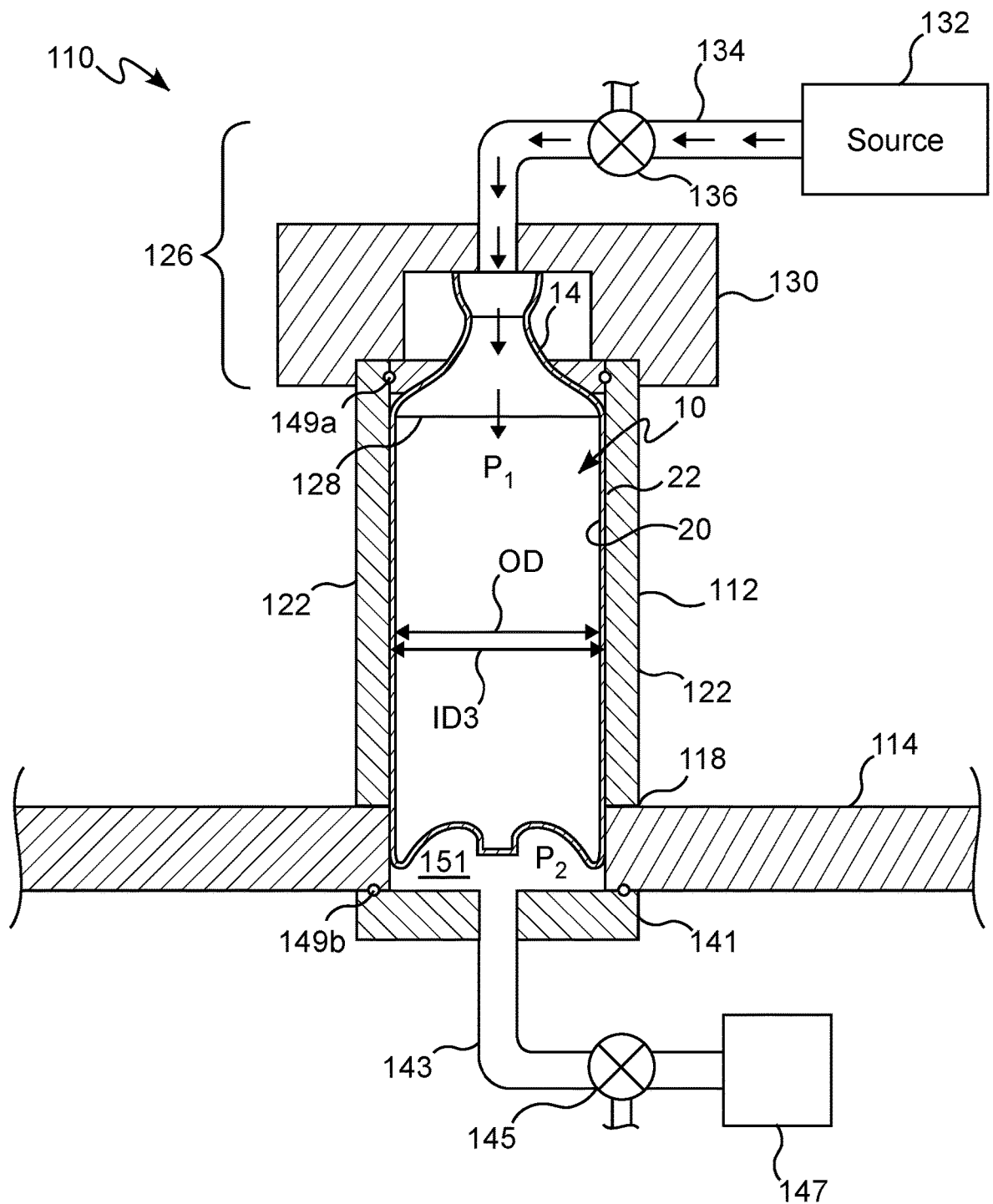
FIG. 4B is a schematic drawing of a syringe rolling apparatus for initially rolling a molded rolling diaphragm syringe according to another aspect of the present disclosure.
Figure 4D:
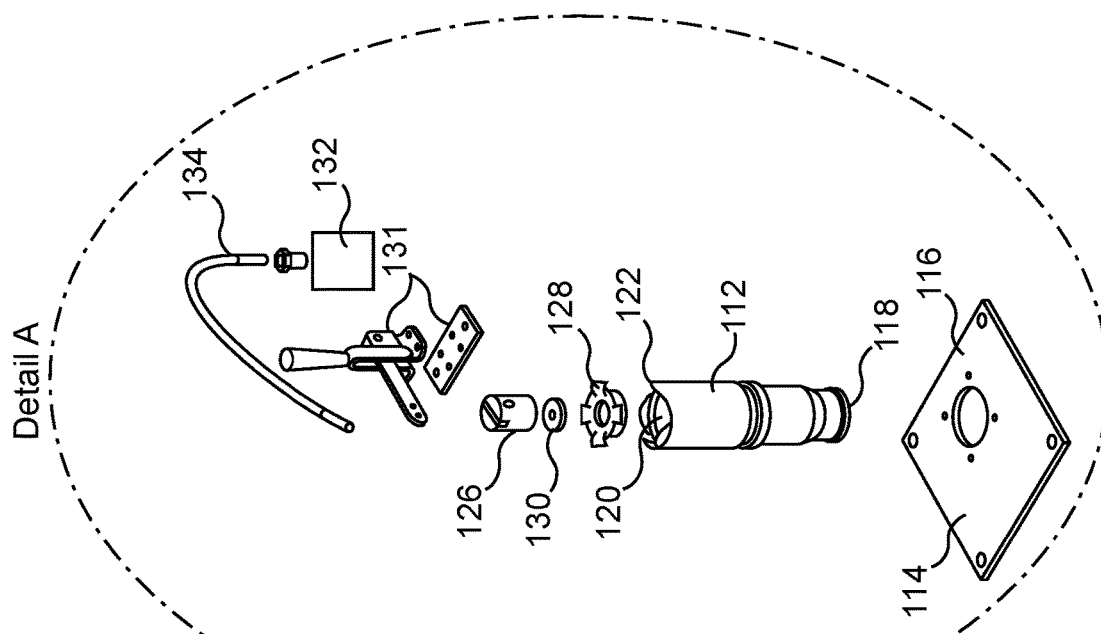
FIG. 4D is an exploded perspective view of Detail A shown in FIG. 4C.
Figure 4C:
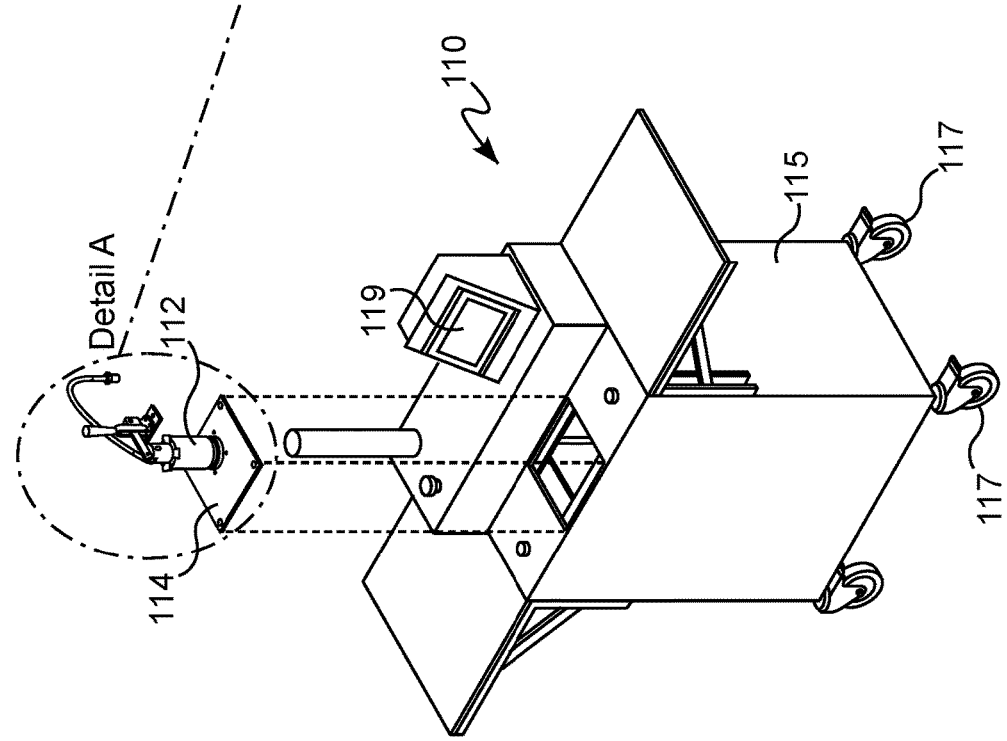
FIG. 4C is a perspective view of a syringe rolling apparatus for initially rolling a molded rolling diaphragm syringe according to another aspect of the present disclosure.

With reference to FIG. 4B, another embodiment of a syringe rolling apparatus 110 is describe and includes the same or similar platform or base 114 defining an annular syringe port 116 for receiving the pressure jacket 112, as discussed herein with reference to FIG. 4A. The syringe rolling apparatus 110 of FIG. 4B may further include a distal seal assembly 126a configured to engage the open discharge neck 14 of the syringe 10 for producing a fluid-tight seal about the discharge neck 14 and for pressurizing the syringe 10 with fluid. The distal seal assembly 126a may further make a seal with the pressure jacket 112 via a distal seal 149a. Instead of a piston arrangement, such as shown in FIG. 4A, the syringe rolling apparatus 110 of FIG. 4B may have a proximal seal assembly 126b configured for sealing the proximal end 118 of the pressure jacket 112. The proximal seal assembly 126b may be configured to engage the platform or base 114 to produce a fluid-tight seal within a cavity 151 at the proximal end 118 of the pressure jacket 112 via a proximal seal 149b.

With continued reference to FIG. 4B, the proximal seal assembly 126b may be in fluid communication with a second source 147 of pressurized fluid (such as air, gas, or liquid) by a second pressure hose 143. When the proximal seal assembly 126b is sealed to the platform or base 114, fluid communication between the second source 147 of pressurized air or liquid and the cavity 151 is established through the second pressure hose 143. The second source 147 of pressurized fluid or liquid can be, for example, a mechanical pump or a compressed air reservoir. In this manner, by pressurizing the cavity 151 to a pressure P2 that is higher than a pressure P1 within the interior of the syringe 10, the end wall of the syringe 10 can be rolled in a distal direction due to the pressure differential between the cavity 151 and the interior of the syringe 10. Conversely, by pressurizing the cavity 151 to a pressure P2 that is lower than a pressure P1 within the interior of the syringe 10, the end wall of the syringe 10 can be unrolled in a proximal direction.

In some examples or aspects, the piston arrangement of FIG. 4A may be combined with the pressurized cavity 151 arrangement of FIG. 4B to roll the syringe 10. For example, the piston arrangement 210 may be used to initiate rolling of the syringe 10 via direct physical contact with the end wall of the syringe 10, such as by rolling the sidewall over a predetermined length, such as 0.1 to 1.0 inches. After initiating the rolling, the distal movement of the piston 210 can be stopped and pressurized fluid or liquid within the cavity 151 can be used to continue the rolling of the syringe sidewall in the proximal direction and complete the rolling process. According to this embodiment, the reduced movement of the piston 210 may reduce wear on the apparatus and the use of pressurized fluid may speed up the rolling process, thereby increasing manufacturing throughput. According to certain embodiments, the pressure within the cavity may be used to eject the rolled syringe 10 from the apparatus at the end of the rolling process, thereby preparing the apparatus for insertion of the next unrolled syringe.

Figure 6A:
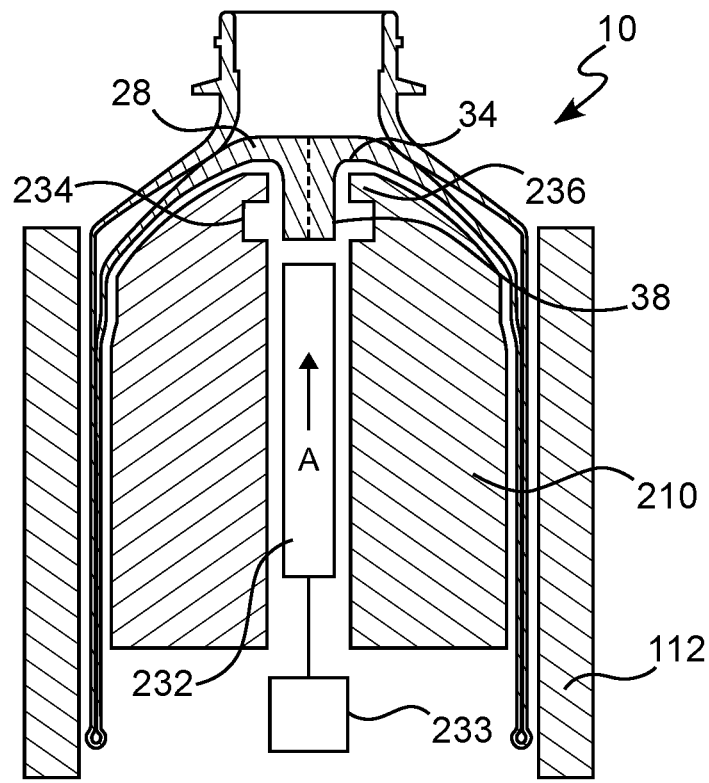
FIGS. 6A-6B are cross-sectional views of a rolling diaphragm syringe having a syringe engagement post and a device for forming the syringe engagement post.
Figure 6B:
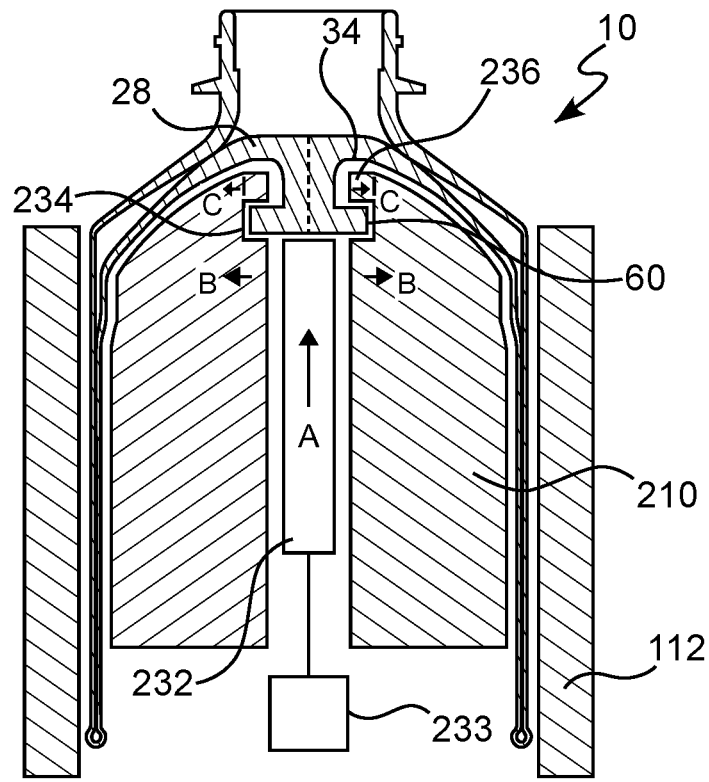

With reference to FIGS. 6A-6B, an embodiment of the rolling apparatus is described. The syringe rolling apparatus 110 may be configured for forming at least one flange or protrusion 60 (shown in FIG. 6B) on the second end 38 of the stem 34 of the piston engagement portion protruding from the end wall 18 during a rolling process. The piston 210 may have a central opening 230 sized to receive the stem 34. An actuator 232 connected to a drive device 233 may be positioned at least partially within the central opening 230 or proximal to the piston and extending into the central opening 230 and may be movable in a proximal-distal direction along a longitudinal axis of the piston 210. The actuator 232 may be movable between a retracted position (FIG. 6A) and an extended position (FIG. 6A) in a direction of arrow A. The central opening 230 may have a recess 234 or other molding feature extending in a radially outward direction or a radially inward direction. In certain embodiments, at least a portion of the central opening 230 of the piston 210 may include a heating element for heating the stem 34 to a temperature close to the glass transition temperature Tg, to improve pliability of the stem 34. The recess 234 may be shaped to impart a desired shape the stem 34, such as at least one flange or protrusion 60 or one or more inwardly facing circumferential grooves or concavities (not shown). The at least one flange or protrusion 60 may be formed by shaping of the second end 38 of the stem 34, such as due to movement of the actuator 232 from the retracted position to the extended position. For example, as the actuator 232 is moved from the retracted position to the extended position, a distal end of the actuator 232 contacts a proximal end of the stem 34. Continued movement of the actuator 232 toward the extended position in the direction of arrow A compresses the material at the second end 38 of the stem 34. As the material is compressed, it is urged radially outward in a direction of arrow B (FIG. 6A) into the recess 234, thereby forming the at least one flange or protrusion 60. The distal end of the piston 210 may have a movable gate 236 that is movable in a radially outward direction of arrow C (FIG. 6B) to allow the stem 34 with the at least one flange or protrusion 60 to be released from the recess 234. In some examples or aspects, the resulting at least one flange or protrusion 60 may have a generally circular cross-sectional shape with a diameter that is larger than a diameter of the stem 34. In other examples or aspects, the at least one protrusion of flange 60 may have any other cross-sectional shape. The cross-sectional shape of the at least one protrusion or flange 60 may be the same or different along its longitudinal length. For example, the at least one protrusion or flange 60 may have a bulbous shape that expands radially outward in a direction from a distal end of the stem 34 toward the proximal end. In various embodiments, the piston 210 and actuator 232 may be configured to impart any desired cross sectional shape to the stem 34, such as a plurality of longitudinal grooves or extensions along at least a portion of the longitudinal axis of the stem 34.

Figure 6C:
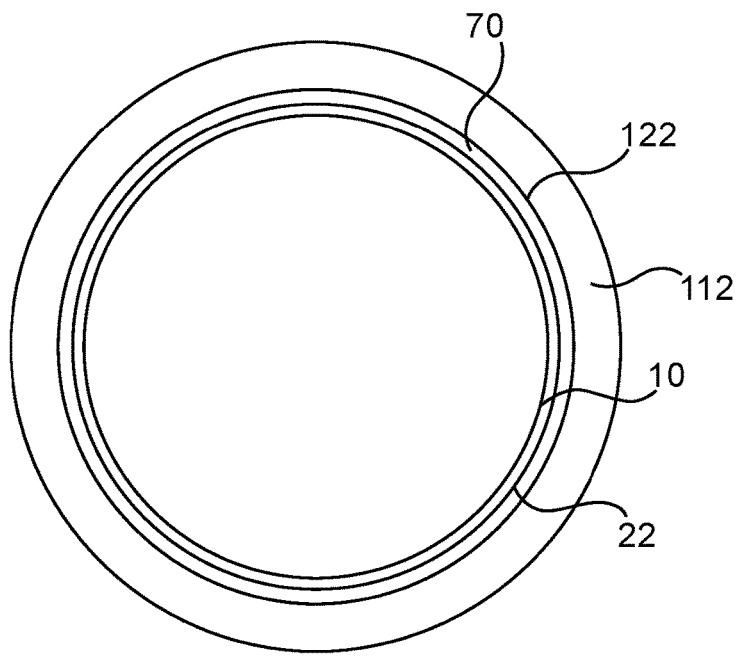
FIG. 6C is a cross-sectional view of a rolling diaphragm syringe having a label applied to an exterior surface thereof during a rolling process.
Figures 6D, 6E:
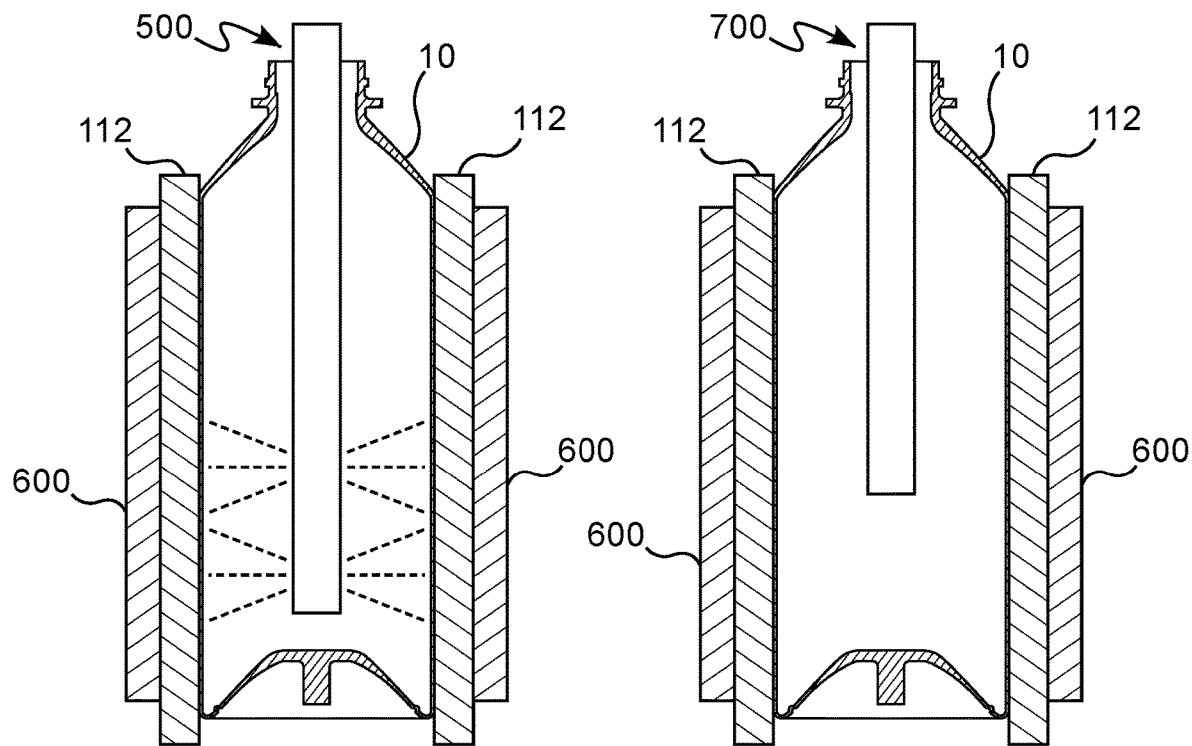
FIG. 6D is a cross-sectional view of a rolling diaphragm syringe and a syringe rolling apparatus having a device for altering surface properties of an interior surface of the rolling diaphragm syringe.
FIG. 6E is a cross-sectional view of a rolling diaphragm syringe and a syringe rolling apparatus having a measurement device for measuring at least one property of the rolling diaphragm syringe.

With reference to FIG. 6C, an embodiment of the rolling apparatus with a labelling feature is described. The syringe rolling apparatus 110 may be configured for applying at least one label 70 to an outer surface 22 of the syringe 10, for example prior to, during, or after the rolling process. The at least one label 70 may be configured to surround at least a portion of an outer circumference of the syringe 10. In some examples or aspects, the at least one label 70 may be applied to the outer surface 22 of the syringe 10 during the rolling process when the sidewall 20 of the syringe 10 is expanded in a radially outward direction due to pressurizing the interior of the syringe 10. For example, the at least one label 70 may be positioned within the interior of the pressure jacket 112 such that an outer surface of the at least one label 70 faces an inner surface 122 of the pressure jacket 112 and an inner surface of the at least one label 70 faces an outer surface 22 of the syringe 10. The at least one label 70 may be applied to the outer surface 22 of the syringe 10, for example the distal unrolled outer surface 22b, due to pressure exerted by the sidewall of the syringe 10 as the syringe 10 expands in a radially outward direction due to pressurizing the interior of the syringe 10 during the rolling process. In some examples or aspects, the at least one label 70 may have an adhesive for securing the label 70 to an outer surface 22 of the syringe 10. The at least one label 70 may be configured as a sleeve made from a heat-shrinking material. In such examples or aspects, at least one of the piston 210 and the pressure jacket 112 of the syringe rolling apparatus 110 may be heated, such as with a heater 600 discussed herein with reference to FIGS. 6D-E, to heat-shrink the at least one label 70 around the syringe 10. In some examples or aspects, the at least one label 70 may be provided on a roll that is indexed such that a new label is positioned in the interior of the pressure jacket 112 each time a new syringe 10 is rolled.

With reference to FIG. 6E, the syringe rolling apparatus 100 may have a measurement device 700 configured for measuring at least one characteristic of the syringe 10. For example, the measurement device 700 may be a sensor configured for measuring at least one physical property and/or at least one material property of the syringe 10. In some examples or aspects, the measurement device 700 may be a sensor configured for measuring an inner or outer diameter of the syringe 10 or a thickness of the sidewall 20 of the syringe 10. The sensor may be a laser sensor. In some examples or aspects, the measurement device 700 may be a device configured for measuring crystallinity of the sidewall material of the syringe 10. For example, the measurement device 700 may be a Fourier-transform infrared spectroscopy (FTIR) device configured for obtaining an infrared spectrum of absorption of the sidewall material of the syringe 10. Such measurement device 700 may be configured for determining the condition of the sidewall material, such as how well the polymer material of the sidewall is crosslinked or its crystallinity while in the apparatus.

Using physical measurement data from the measurement device 700, material properties of the syringe 10 can be determined. For example, material properties such as yield strength, tensile stress at yield, strain, and Young's modulus can be determined based on a pressure within the syringe during rolling and a change in outer diameter of the syringe during or after rolling. In some examples or aspects, stress can be calculated based on the following formula: Stress= $(P \times R)/2 \times T$, where P represents pressure within the syringe 10 during rolling, R represents a radius of the syringe 10, and T represents sidewall 20 thickness. In this manner, material stress can be calculated as a function of pressure and physical properties of the syringe 10, such as the sidewall 20 thickness. In addition, a roll force can be calculated as a function of the piston force, the pressure inside the syringe, and the cross-sectional area of the syringe. For example, the roll force can be calculated by the following equation: Roll force=F−(P×A), where F represents the force exerted by the piston to roll the syringe, P represents the pressure within the syringe 10 during rolling, and A represents the cross-sectional area of the syringe.

Figure 7A:
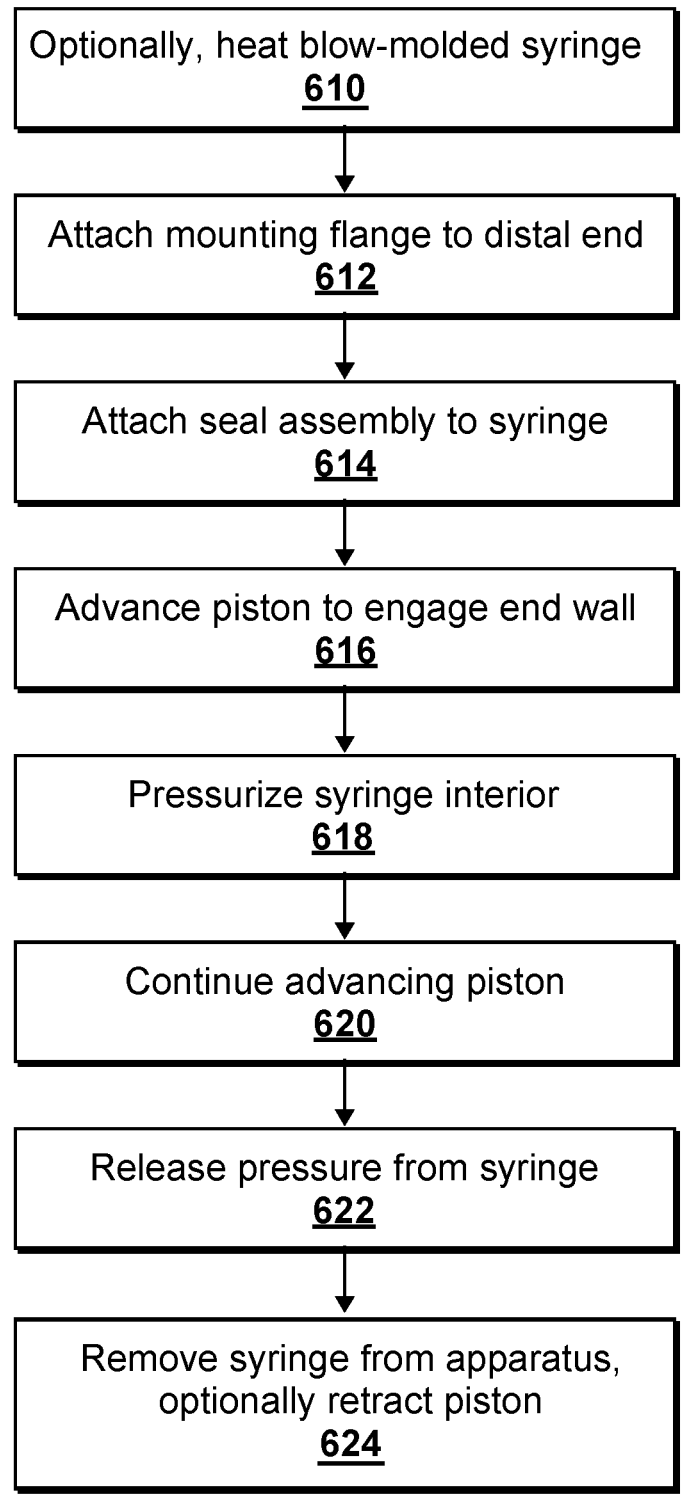
FIG. 7A is a flow chart of a process for initially rolling a molded syringe having a rolling diaphragm according to another example or aspect of the disclosure.
Figure 7B:
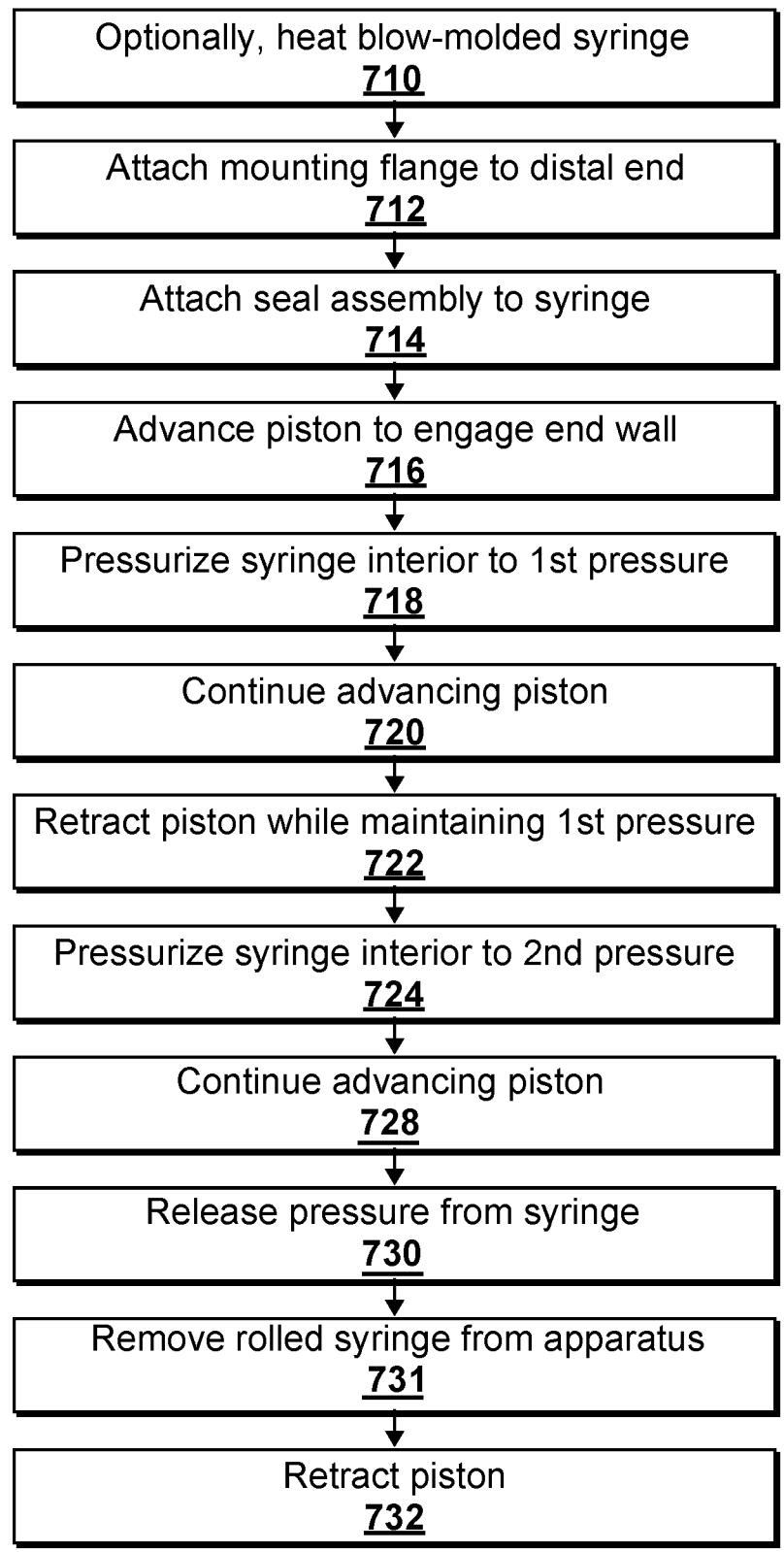
FIG. 7B is a flow chart of a process for initially rolling a molded syringe having a rolling diaphragm according to another example or aspect of the disclosure.

With reference to FIG. 7A-7B, various processes for initially rolling a syringe 10 to prepare the syringe 10 for shipping and for use in a fluid delivery device, such as a fluid injector, are illustrated. As previously described, the initial rolling process reforms or molds portions of a stretch-blow molded syringe to improve performance, reduce a risk of buckling during use, and reduce storage volume and associated shipping costs.

With reference to FIG. 7A, a flow chart of a process for initially rolling a molded syringe is shown in accordance with certain embodiments of the disclosure. Prior to rolling, at box 610, at least a portion of the syringe may optionally be heated to increase pliability of the syringe end wall and/or the flexible sidewall. For example, the syringe can be placed in an oven and heated to a suitable temperature, such as a temperature at or near the glass transition temperature of the plastic material from which the syringe is formed. In some examples or aspects, the pressure jacket or plunger of the syringe rolling apparatus may be heated to heat at least a portion of the syringe, such as using a heater discussed herein. For example, for a syringe made from a medical grade PET material suitable for use with the fluid injectors disclosed herein, the heating temperature can be from 140° F. to 210° F.

The process further includes, at box 612, attaching the mounting flange around the distal open end of the syringe. The mounting flange may be an annular structure which connects about the discharge neck of the syringe and engages the distal open end of the pressure jacket to secure the syringe in a centered position in the pressure jacket and to facilitate a connection between the syringe and pressure source. After the retaining flange is in attached and the syringe is secured in the pressure jacket of the rolling apparatus, at box 614, the cap or seal assembly is connected to the syringe and retaining flange to establish fluid communication between the syringe interior and a source of pressurized air or gas. The piston is then advanced at box 616 to engage the end wall of the syringe. The order of steps 614 and 616 may be reversed.

The syringe interior is then pressurized, at box 618, by introducing pressurized air or gas to the syringe interior. Pressurizing the syringe causes the syringe sidewall to bow radially outward to contact an interior surface of the pressure jacket, which supports the syringe sidewall to prevent buckling. The syringe can be pressurized to any pressure suitable for establishing good contact with the pressure jacket sidewall, but which does not cause the thin material of the sidewall to permanently yield or deform. For example, the syringe can be pressurized to a pressure of from 25 psi to 200 psi, such as from 80 to 100 psi. In other examples or aspects, syringe may be pressurized to any pressure suitable for establishing good contact with the pressure jacket sidewall and which causes the thin material of the sidewall to undergo plastic deformation. In such examples, the syringe can be pressurized to a pressure of from 200 psi to 500 psi, such as from 300 to 350 psi.

Once the syringe is pressurized, the piston is further advanced in a distal direction at box 620, thereby molding or reforming the proximal end of the syringe to adopt a shape of a distal portion of the piston and initiate the rolling of the syringe. Continued distal movement of the piston causes the sidewall of the syringe to continue to roll in a radially inward direction. In general, the piston is advanced at a substantially constant speed suitable for producing smooth and even rolling. In some examples or aspects, the pressure inside the syringe interior is maintained at the first pressure by relieving pressure via the check valve to account for decrease in interior volume of the syringe during rolling of the syringe. In other examples or aspects, the pressure inside the syringe may be maintained at a positive pressure below the first pressure by allowing air from the interior of the syringe to escape through the check valve. In further examples or aspects, the pressure inside the syringe may be reduced to atmospheric pressure shortly after the piston initiates the rolling over of the sidewall. If an initial rolling force is too great or if piston advancement is not constant and smooth, the syringe may buckle due to rapid advancement of the plunger and/or displacement of the sidewall. As discussed above, pressurizing the interior of the syringe prevents walls of the syringe from touching and/or sticking together during rolling. Instead, in the rolled or contracted configuration, rolled and unrolled portions of the syringe sidewall should be spaced apart and substantially parallel to one another. According to other embodiments, once the rolling has been initiated by the piston, the cavity between the distal end of the piston and the end wall of the syringe may be pressurized to a pressure greater than the interior pressure of the syringe. The pressured differential may then result in further rolling of the syringe to the fully rolled state without additional movement of the piston.

After the syringe is fully rolled, the pressure is released (see box 622), and the piston releases from the end wall of the syringe and the syringe is removed from the apparatus, at this time the piston optionally retracts through the pressure jacket, at box 624, back to the syringe port, thereby forming an initially rolled syringe in a compressed state. In some examples or aspects, the rolling process may be repeated multiple times (see, e.g., FIG. 7B). The rolled syringe can be removed from the pressure jacket and stored, along with other rolled syringes, and/or may be packaged for shipping. The rolled syringes can then be provided to a customer for use in fluid delivery applications.

With reference to FIG. 7B, a flow chart of a process for initially rolling a molded syringe is shown in accordance with another embodiment of the disclosure. Prior to rolling, at box 710, the syringe may optionally be heated to increase pliability of the syringe end wall and/or the flexible sidewall, similar to step 610 in FIG. 7A. At box 712, the mounting flange may be attached around the distal open end of the syringe to engage the distal open end of the pressure jacket to secure the syringe in a centered position in the pressure jacket and to facilitate a connection between the syringe and pressure source. After the retaining flange is in place and the syringe is secured in the pressure, at box 714, the cap or seal assembly is connected to the syringe and retaining flange to establish fluid communication between the syringe interior and the source of pressurized air or gas. The piston is then advanced through the syringe port at box 716 to engage the end wall of the syringe. The order of steps 714 and 716 may be reversed.

At box 718, the syringe interior is then pressurized to a first pressure by introducing pressurized air or gas to the syringe interior. The first pressure may be sufficient to cause the syringe sidewall to bow radially outward to contact an interior surface of the pressure jacket, but which does not cause the thin material of the sidewall to permanently yield or deform. In some examples or aspects, the first pressure may be from 25 psi to 200 psi, such as from 80 to 100 psi, or as described in step 618 of FIG. 7A.

Once the syringe is pressurized, at box 720, the piston is further advanced through the syringe port in a distal direction to engage the end wall. During advancement of the piston, the pressure inside the syringe is maintained at the first pressure, such as via a pressure release valve. After engaging the end wall of the syringe, the piston continues to advance to cause the sidewall of the syringe to roll in a radially inward direction. Alternatively, pressurized fluid in the cavity between the piston and the syringe end wall may continue rolling of the syringe without the action of the piston.

After the syringe is fully rolled, the piston is retracted in a proximal direction at box 722 while the pressure inside the syringe interior is maintained at the first pressure by introducing additional air to account for an increase in interior volume of the syringe during unrolling of the syringe or while the pressure inside the syringe is maintained at a positive pressure below the first pressure without introducing additional air inside the syringe. The syringe unrolls as the piston is retracted, for example due to the pressure inside the syringe forcing the end wall in the proximal direction. In embodiments where fluid pressure is used to continue rolling the syringe, the piston is already partially retracted and the syringe may unroll by release of the pressure within the cavity between the piston and the syringe end wall. In some examples or aspects, the piston may be retracted by stopping the distal movement of an actuator driving the piston and using the pressure inside the syringe to push the piston in the proximal direction. In other examples or aspects, the actuator that drives the piston may reverse the direction of movement of the piston such that the piston is moved in the proximal direction.

When the piston retracts to a proximal position but while engaged with the end wall of the syringe, the syringe interior is then pressurized to a second pressure (box 724) by introducing pressurized air or gas to the syringe interior. The second pressure may be higher than the first pressure. In some examples or aspects, the second pressure may be from 200 psi to 500 psi, such as from 300 to 350 psi. In some examples or aspects, the second pressure may be sufficient to cause the syringe sidewall to bow radially outward to contact an interior surface of the pressure jacket and such that at least a portion of the thin material of the sidewall is plastically deformed. For example, the sidewall of the syringe may expand slightly in a radially outward direction to contact the inner surface of the pressure jacket. Without intending to be limited by any particular mechanism, it is believed that plastic deformation of at least a portion of the sidewall reduces the roll force necessary to unroll the syringe during filling and roll the syringe during fluid delivery. In this manner, the syringe can be refilled multiple times via rolling and unrolling of the sidewall without undergoing further plastic deformation which may lead to inaccurate volume delivery.

Once the syringe is pressurized to the second pressure, at box 724, the piston is further advanced through the syringe port in a distal direction, while the pressure inside the syringe is maintained at the second pressure. At box 728, the piston continues to advance to cause the sidewall of the syringe to roll in a radially inward direction.

After the syringe is rolled, the pressure is released (see box 730) and the rolled syringe may be removed from the apparatus (box 731). The piston may then retract through the pressure jacket, at box 732, back to the syringe port, thereby forming an initially rolled syringe. After the rolled syringe is removed from the pressure jacket, it may be stored, along with other rolled syringes or may be packaged for shipping to an end user. The rolled syringes can then be provided to a customer for use in fluid delivery applications.

Having described the syringe rolling apparatus 110 and method for producing the rolled syringe 10 in a compressed state, fluid injection systems for using the produced compressed syringe for fluid delivery applications will now be described. In particular, the formed rolling diaphragm syringes 10 are configured for use with a fluid injection system for delivering a predetermined medication dose to a patient. The fluid injection system can be adapted for use in CT, MRI, PET, angiography, and like procedures and operable at typical operating pressures of, for example, about 10-1200 psi, such as 200-400 psi for procedures such as CT and MRI and from 400-1200 psi for angiography injection procedures, depending on the viscosity of the fluid and the desired rate of injection.

Figure 8:
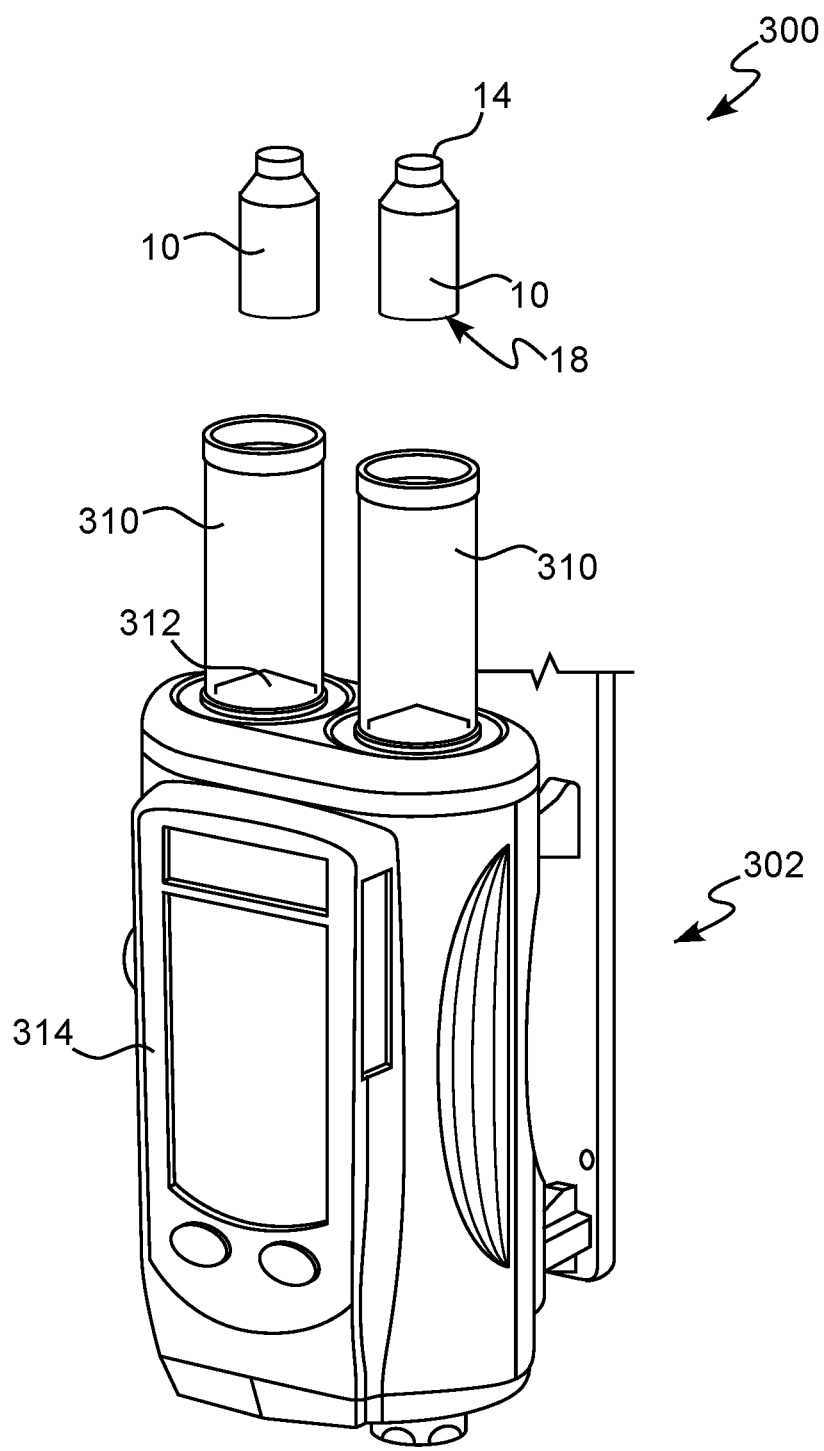
FIG. 8 is a perspective view of a fluid injection system with a rolling diaphragm syringe mounted thereto according to another aspect of the present disclosure.
Figure 9A:
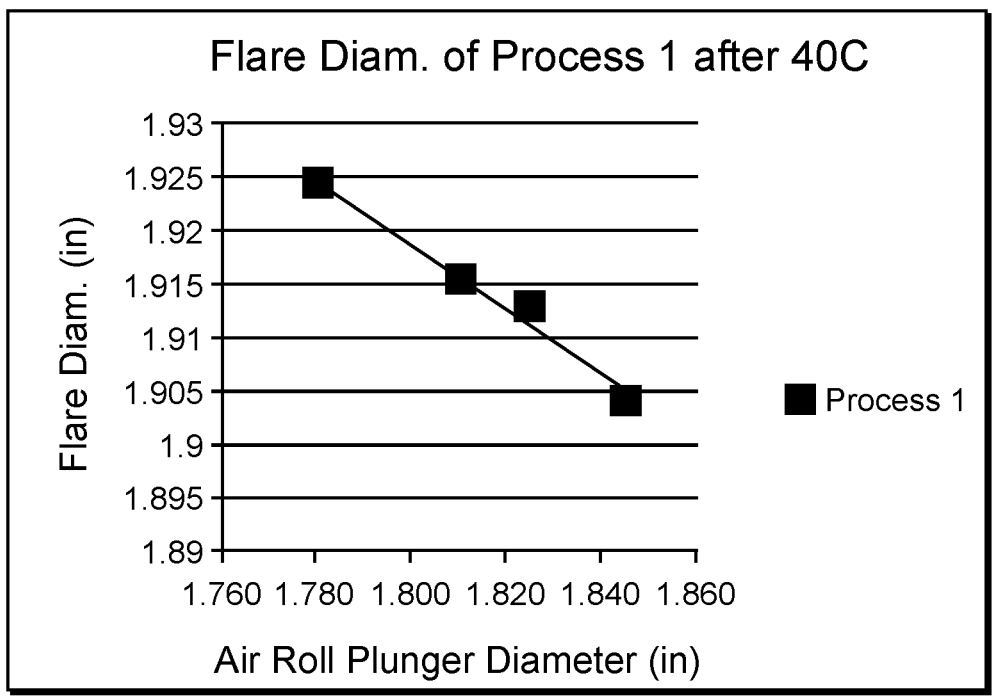
FIGS. 9A-9D are graphs of test results for various rolling diaphragm syringes made using a syringe rolling apparatus.
Figure 9B:
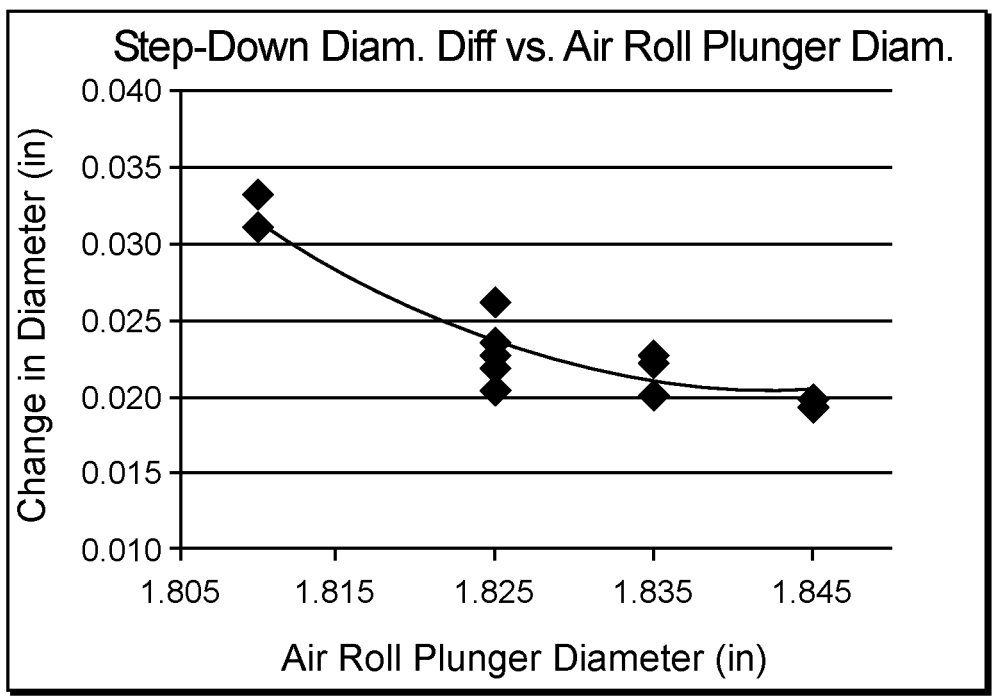
Figure 9C:
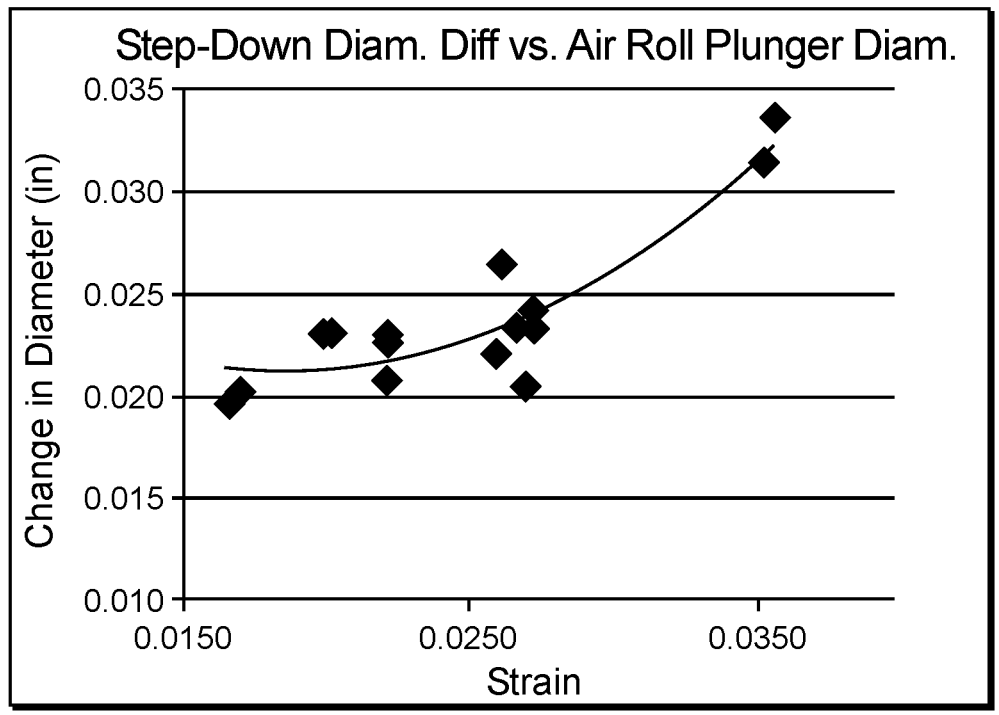
Figure 9D:
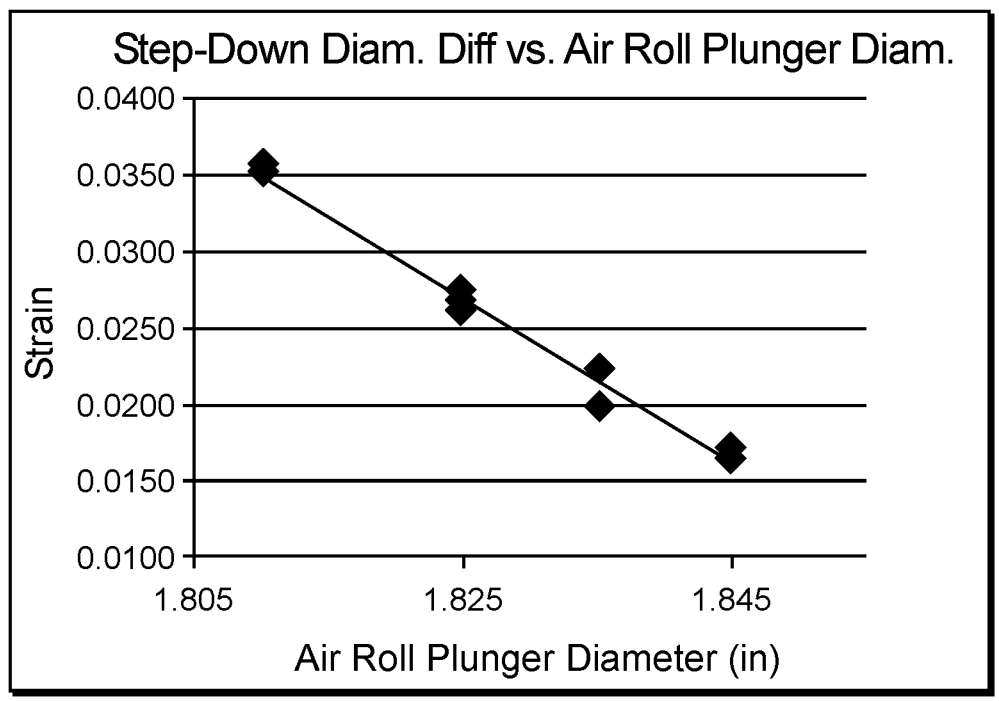

With reference to FIG. 8, a fluid injection or fluid delivery system 300 includes a fluid injector 302, such as an automated or powered fluid injector, adapted to interface with one or more rolling diaphragm syringes 10 and pressure jackets 310 with each syringe 10. Each of the syringes 10 may be independently filled with a medical fluid, such as contrast media, saline solution, or any desired medical fluid. The injector 302 may be used during a medical procedure to inject the medical fluid (e.g., contrast media or saline solution) into the body of a patient by driving a piston 312 into the at least one rolling diaphragm syringe 10 to cause the syringe 10 to roll in a distal direction to expel fluid therefrom. The piston 312 can be sized to engage the end wall 18 of the syringe 10 and, in particular, can include a stepped portion as shown in FIGS. 5A-5C, for engaging a corresponding annular step portion on the proximal end 16 of the syringe 10. The injector 302 may be a multi-rolling diaphragm syringe injector, wherein two or more rolling diaphragm syringes 10 with corresponding pressure jackets 310 are oriented in a side-by-side or other relationship and include corresponding pistons 312 actuated by a linear actuator of the injector 302. In examples or aspects with two rolling diaphragm syringes 10 and pressure jackets 310 arranged in a side-by-side relationship and filled with two different medical fluids, the injector 302 may be configured to deliver fluid from one or both of the rolling diaphragm syringes 10.

The injector 302 may be enclosed within a housing 314 formed from a suitable structural material, such as plastic or metal. The housing 314 may be of various shapes and sizes depending on the desired application. For example, the injector 302 may be a free-standing structure configured to be placed on the floor or may be a smaller design for placement on a suitable table or support frame. At least one fluid path set (not shown) may be fluidly connected with a discharge neck 14 of the syringe(s) 10 for delivering medical fluid from the at least one rolling diaphragm syringe 10 through tubing to a catheter, needle, or other fluid delivery connection (not shown) inserted into a patient at a vascular access site. Fluid flow into and from the syringe(s) 10 may be regulated by a fluid control module (not shown). The fluid control module may operate various pistons, valves, and/or flow regulating structures to regulate the delivery of the medical fluid, such as saline solution and contrast, to the patient based on user selected injection parameters, such as injection flow rate, duration, total injection volume, and/or ratio of contrast media and saline.

One example of a suitable front-loading fluid injector that may be used or modified for use with rolling diaphragm syringes 10 is disclosed in U.S. Pat. No. 5,383,858 to Reilly et al. which is incorporated by reference in its entirety. Other examples of relevant multi-fluid delivery systems that may be used or modified for use with the present system are found in U.S. Pat. No. 7,553,294 to Lazzaro et al.; U.S. Pat. No. 7,666,169 to Cowan et al.; International Patent Application Publication No. WO 2012/155035 to Shearer et al.; United States Patent Application Publication No. 2014/0027009 to Riley et al.; and International Patent Application Publication No. WO 2015/164783 to Berry et al., all of which are assigned to the assignee of the present application, and the disclosures of which are incorporated herein by reference.

In use, syringe(s) 10 can be provided to a medical facility in the compressed or rolled state as shown in FIGS. 2A-2C. For example, the syringe(s) 10 could be initially rolled with the syringe rolling apparatus and method described herein prior to being shipped to the medical facility. The rolled syringe(s) 10 are placed in the pressure jacket(s) 310 of the fluid injector 302 and placed in fluid communication with a fluid source through the discharge neck 14 of the syringe 10. Alternatively, the syringes 10 may be manufactured in a rolled state, moved to a facility where they may be filled with an appropriate medical fluid, for example an imaging contrast agent, saline, or other medical fluid, and then transferred to an imaging suite where they can be utilized in an injection procedure as a "pre-filled" syringe. Once fluid communication with the fluid source is established, the injector 302 may be actuated causing the piston 312 to advance through the pressure jacket 310 to engage the end wall 18 of the rolled syringe 10. Once the piston 312 is engaged with the end wall 18, the piston 312 can be retracted through the pressure jacket 310 causing the syringe 10 to unroll and draw fluid from the source into an interior of the syringe 10. After the syringe 10 is filled with a desired volume of fluid, fluid delivery occurs by reversing the piston 312 direction. Specifically, the piston 312 is advanced in the distal direction causing the syringe 10 to re-roll at least partially to the compressed or rolled state. Rolling the syringe 10 expels fluid from the discharge neck 14 of the syringe 10 for fluid delivery to the patient. As discussed herein, in some embodiments, the syringe(s) 10 may be single use syringes which are disposed of after each patient use. In other embodiments, the syringe(s) 10 can be reusable. In that case, the syringe(s) 10 can be re-filled by again retracting the piston 312 in the proximal direction, to unroll the syringe 10, thereby drawing another dose of fluid from a fluid source into the syringe 10 for performing another fluid injection. As discussed previously, fluid is expelled from the syringe 10 by advancing the piston 312 in the distal direction to roll the syringe 10.

While the various examples or aspects of the rolling apparatus and methods described herein are illustrated with respect to a syringe, the present disclosure is not limited to medical syringes and could also be used for any thin-walled plastic containers formed, for example by a blow molding process, where a rolling diaphragm feature may be used, for example to control and select the interior volume of the container. Examples of other suitable containers include various thin-walled containers for holding and/or storing liquid compositions, such as for example beverage bottles, water bottles; and other containers where a variable and controllable volume may be desired, for example to control and/or minimize the volume of head-space above the liquid in the container. Examples where one may wish to minimize the head-space, and thereby volume of air or other gas above a liquid surface, include for example paint or other coating containers where the liquid may react with air to begin the curing or drying process, and pharmaceutical, chemical, and biological specimens which may be reactive with air or components therein.

For example, in the beverage industry it may be desirable to have a variable volume container that may be formed using a single preform and blow mold, where the volume may be varied by the extent and distance that the thin-walled rolling diaphragm container is rolled. For instance, if the diameter of a bottle is 2.0 in. OD (5.08 cm diameter) and the bottom end is rolled to a distance of 4 in (10.16 cm) from the top of the bottle then the volume of the resulting container is 205.92 mL. Alternatively, if the same rolling diaphragm container, from the same preform/blow mold, is rolled a distance of 2 in (5.08 cm) from the top of the bottle then the volume of the container would be 102.96 mL. Such a process would allow for a large range of fill containers having different volumes from the same preform and blow mold, thereby eliminating the need for multiple different preforms and the corresponding injection molds (to mold the preform) and blow-molds (to mold the bottle) to adjust for different volume liquid (i.e., beverage) containers.

According to certain examples or aspects, the thin-walled rolling diaphragm container may be pre-rolled to contain different fluid volumes during or subsequent to the container fabrication process, depending on the volume of container desired. In various examples or aspects, the desired volume can be produced during the blow molding process, for example while the syringe is still warm, although this may limit the distance that the container may be rolled due to the pliability of the container wall. Alternatively the container may stay in the blow mold with the blow/stretch rod engaged and cold air could be blown through the stretch rod to cool the interior walls of the syringe followed by using a portion of the bottom surface of the mold (corresponding to the bottom, closed end of the container) to distally push the proximal end wall, similar to the piston of the rolling diaphragm syringe rolling apparatus, as the blow/stretch rod is retracted and the pressurizing nozzle is inserted. The portion of the bottom surface of the mold and the corresponding end wall of the container may then be pushed up the necessary distance to form the desired interior volume of the container. In another example or aspect, the container may remain in the blow-mold and allowed to cool, for example by including an extra loop in the molding production line to allow time for cooling, and then the container may be pressurized as described herein and rolled, for example using a piston that is either incorporated into the bottom surface of the blow mold or external to the blow mold.

In still another example or aspect, the piston or bottom portion of the blow mold may be cooled so that the container cools upon contact with the piston or bottom portion as the piston/bottom mold portion is moved distally while rolling the thin walled container as a rolling diaphragm. According to these example or aspects, rolling of the cooled blow molded container may minimize stretching of the thin walls of the rolling diaphragm container during the rolling process. According to other examples or aspects, the rolling diaphragm container may be delivered and/or stored at the beverage production facility in the unrolled configuration and then rolled, for example using a rolling apparatus and/or method according to the various example or aspects described herein, to the desired volume prior to a specific production run for a specific volume beverage container.

According to other examples or aspects, the rolling diaphragm container described herein may be used for containers of fluid that require minimized head space volumes to minimize exposure to air. For example, in the paint industry for conventional containers, paints and lacquers are usually repackaged into smaller containers after use of a portion of the fluid to reduce the exposure of the fluid surface area to the air in the head space of the container and reduce the hardening or curing of the fluid when the paint or lacquer is stored over an extended time period prior to the next usage. According to various examples or aspects, the rolling diaphragm container may be used as a variable volume container for fluids that aerobically react and cure, harden, decompose, or otherwise react and change composition or other physical properties when exposed to air in the head space of the container. By reducing the volume of the rolling diaphragm container, for example by rolling the flexible side wall towards the container opening, the head space volume may be minimized, thereby minimizing exposure of the fluid surface to air in the head space. According the certain examples or aspects, the rolling diaphragm container may be formed having a movable piston within a distal portion that may be moved by a user, for example by a geared system, screw, loading spring, or hydraulic system, to reduce the volume of the container to that approximating the remaining volume of liquid within the container.

According to other examples or aspects, the thin-walled rolling diaphragm containers may be utilized as a spraying device, such as for spray paint or other sprayed liquid, that would be pressurized without the need for chlorofluorocarbons (CFCs) and could operate at any angle. Conventional spray cans require a pressurizing gas, which forces a liquid (such as paint) from a bottom of the spray container up through a dip tube and out the spray nozzle. However, such a configuration can be of limited use as the spray container must typically be held in a generally upright so that the dip tube is submersed in the fluid. According to one example or aspect, a container of the present disclosure comprising a rolling diaphragm container could utilize a piston, such as a spring loaded or pneumatically loaded piston to pressurize the fluid in the interior of the container and continually reduce the container volume to maintain the interior pressure as the fluid is expelled or sprayed out of the nozzle. Because the volume would continually be reduced, the fluid would always be pressurized against the nozzle of the container and the container would dispense the fluid regardless of the angle that the container is held, even if the container is held upside down.

According to another example or aspect, a rolling diaphragm container could be utilized as a caulking container or grease container. Conventional caulk containers have a separate moveable plunger that is moved in a distal direction by a piston, for example a hand operated piston, of a caulk gun. Under high applied pressures, blow-back where the caulking material escapes between the plunger and container walls may result in loss of material and/or fouling of the caulk gun or other surfaces. According to various example or aspects, the thin-walled rolling diaphragm container described herein may be utilized as a container for caulking, grease, or other fluid material that is expelled by a similar mechanism. Utilizing a rolling diaphragm container as described herein would eliminate the possibility of blow back as the bottom portion of the container is a continuous surface. Further, utilizing a rolling diaphragm container would ensure that substantially all of the caulking or other material could be expelled from the container.

EXAMPLES

Tests were performed to determine piston dimensions of the syringe rolling apparatus for preventing buckling of the sidewalls of a rolling diaphragm syringe, as well as to reduce the wiper seal and squeaking caused by contact between portions of the syringe sidewall during rolling. In particular, these Examples sought to demonstrate a relationship between piston size (e.g., the maximum outer diameter of the piston), the step portion diameter of the piston, and strain exerted on the syringe during rolling and unrolling. As described herein, these Examples identify a relationship between the piston diameter and flare diameter, in which as the piston diameter increased relative to the internal diameter of the pressure jacket, the flare diameter decreased. As discussed above, flare diameter refers to the outer diameter (OD3) of the outwardly protruding proximal-most portion of the syringe as shown in FIG. 3A in particular where the sidewall of the syringe rolls 180 degrees. In specific embodiments, flare diameter should be minimized so that the syringe can be more easily loaded or unloaded into a front load pressure jacket. Further, a correlation between piston size and the change in outer diameter of the syringe was identified in which as the piston diameter increases, the change in outer diameter decreases. As a result, smaller change in outer diameter ($\Delta$ OD) results in better resistance to buckling when the syringe is used with large fill volumes. A correlation between plunger size and $\Delta$ OD was also linked to strain compressive caused by the rolling process. Specifically, as the piston diameter increases, the strain and change in diameter $\Delta$ OD decreases. In various embodiments, if the strain exceeds the material's strength, the roll may form pleated sections or kinks in the sidewall.

In the Examples, samples of stretch blow-molded syringes formed as described herein were filled with air and rolled using a modified Medrad® Stellant injector at 187 mL. Specifically, the syringe samples were placed in a pressure jacket of the injector having an inner diameter of 1.930 inches. The syringe samples were contacted by different examples of stepped pistons having a maximum outer diameter of 1.780 (Samples 5 and 6), 1.810 (Samples 1 and 2), 1.825 (Samples 9 and 10), and 1.845 (Samples 15 and 16) inches. The narrower step portion of the piston had a diameter of 1.7400 (samples 5 and 6) or 1.7700 (Samples 1, 2, 9, 10, 15, and 16). Specifically, in order to roll the syringe samples, each syringe sample was locked in the injector pressure jacket and pressurized to 80-90 psi. The injector was started and programmed for a 187 mL injection. The piston advanced causing the syringe sample to roll as described herein. When the injector read a piston position of 0 mL, any remaining air in the syringe interior was released and the rolled syringe was removed from the pressure jacket. Following rolling, the syringe outer diameter and flare diameter were measured. Outer diameter refers to an outer diameter of the cylindrical or middle portion of the syringe. After the outer diameter and flange diameter were measured, the syringe sample was again placed in a fluid injector and filled with 160 mL of fluid. The filled syringe was removed from the injector and an outer diameter of the syringe above and below the flare was measured. Specifically, as shown in FIG. 3A, an outer diameter below the flare refers to the outside of the inner wall portion of the syringe sidewall extending from the end wall to the flare. The outer diameter above the flare refers to an outer diameter of the sidewall extending distally from the flare towards the distal end of the syringe. Finally, the filled syringe was placed in the injector and the injector was run to eject 120 mL of fluid from the syringe to check for buckling or squeaking.

Results are shown in Table 1 and in FIGS. 9A-9D. Specifically, Table 1 lists the piston outer diameter OD (e.g., the maximum outer diameter of the piston), step portion diameter of the piston, flare diameter for the rolled syringe, the average OD of the filled syringe above the flare, the average OD of the filled syringe below the flare, and the change in diameter (Δ OD) or difference between the OD above and below the flange. The measurements for various samples were performed while keeping the inner diameter of the pressure jacket constant. A measurement for strain exerted on the syringe during rolling is also shown in the Table 1.

TABLE 1

| Sample # | Piston Maximum Diam. (in) | Piston step portion diameter (in) | Syringe OD before initial rolling (in) | Syringe Flare Diam. (after rolling) (in) | Avg. diameter above flare (filled syringe) (in) | Avg. diameter below flare (filled syringe) (in) | Δ Diam. above and below flare (in) | Strain |
|---|---|---|---|---|---|---|---|---|
| 1 | 1.780 | 1.7400 | 1.8975 | 1.9255 | 1.898 | 1.867 | 0.030 | 0.0504 |
| 2 | 1.780 | 1.7400 | 1.8964 | 1.9243 | 1.897 | 1.872 | 0.025 | 0.0502 |
| 3 | 1.810 | 1.7700 | 1.8996 | 1.9145 | 1.899 | 1.868 | 0.031 | 0.0352 |
| 4 | 1.810 | 1.7700 | 1.8982 | 1.9161 | 1.900 | 1.866 | 0.033 | 0.0356 |
| 5 | 1.825 | 1.7700 | 1.8987 | 1.9129 | 1.899 | 1.876 | 0.023 | 0.0273 |
| 6 | 1.825 | 1.7700 | 1.8988 | 1.9132 | 1.898 | 1.875 | 0.023 | 0.0267 |
| 7 | 1.845 | 1.7700 | 1.8986 | 1.9090 | 1.900 | 1.880 | 0.020 | 0.0171 |

The following observations were made while expelling fluid from the filled syringes. Samples 1 and 2 buckled under flare. For samples 1 and 2, no wiper seal was felt, though there was a squeak on pull back that went away over time. Bubbles indicating air trapped between portions of the syringe sidewall were identified. Samples 3 and 4 also buckled under flare and a wiper seal was felt. Samples 5 and 6 squeaked on pullback. The squeaking went away over time. Bubbles were identified and the wiper seal was felt. Sample 7 started to buckle a little, but continued rolling without feeling a wiper seal or squeaking. Sample 7 was the only syringe sample in this experiment which passed without buckling.

Results of the Examples are shown in FIGS. 9A-9D. The results indicate that an increased piston diameter reduces flare diameter. As such, it appears that the maximum piston diameter should be closely related to the inner diameter of the unrolled syringe. In particular, piston having a maximum diameter of less than 1.80 inches may be too narrow to achieve desired results when using the unrolled syringes disclosed herein. Further, increasing the step diameter (e.g., the difference between the piston maximum diameter and step portion diameter) reduced both the change in outer diameter Δ OD and strain on the syringe. As such, having a difference between the piston maximum diameter and step portion diameter of 0.075 inch or more appears to provide favorable results.

Figure 10A:
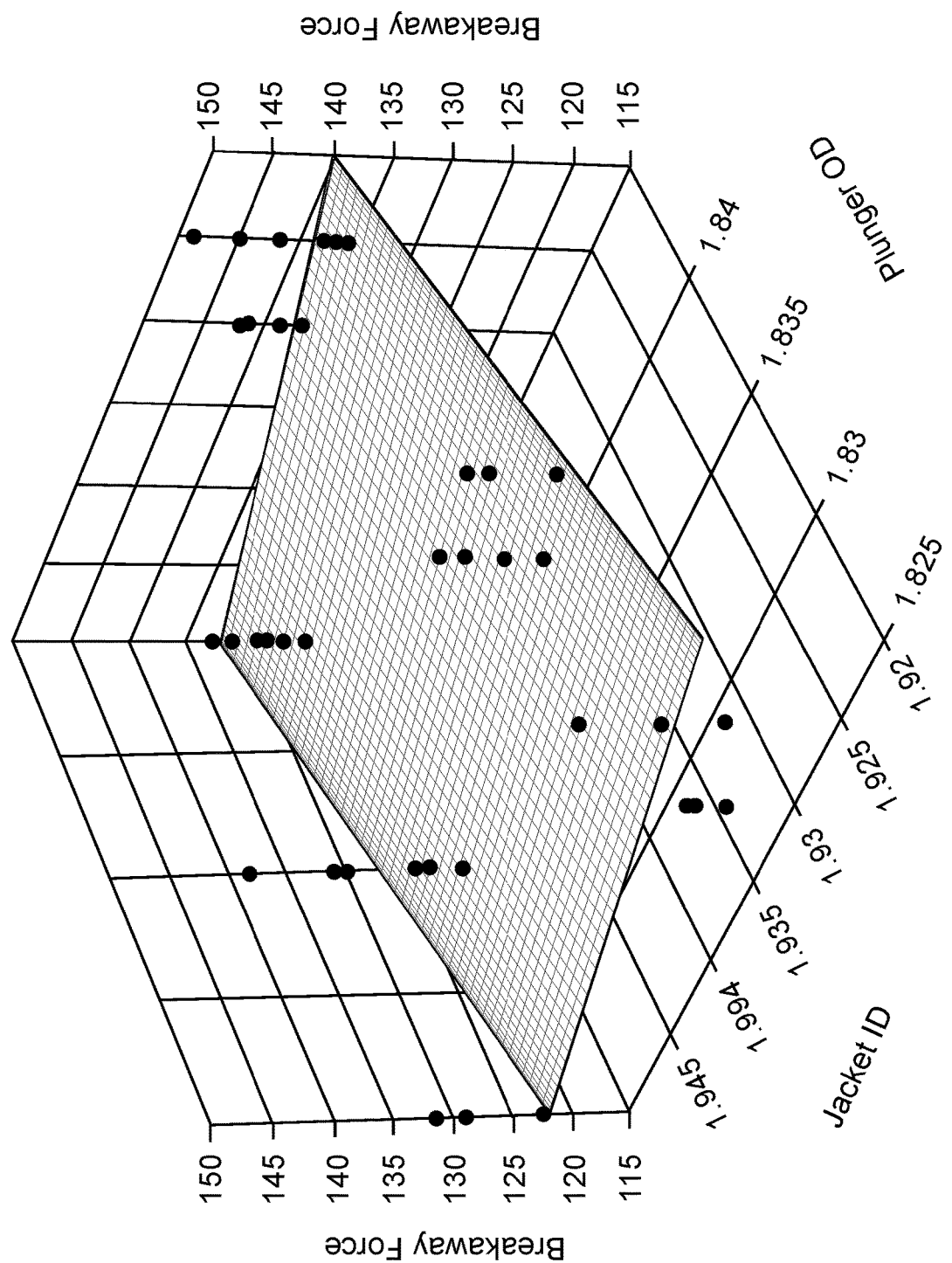
FIG. 10A is a three dimensional graph showing a breakaway force as a function of an inner diameter of a pressure jacket and an outer diameter of a piston of a syringe rolling apparatus.
Figure 10B:
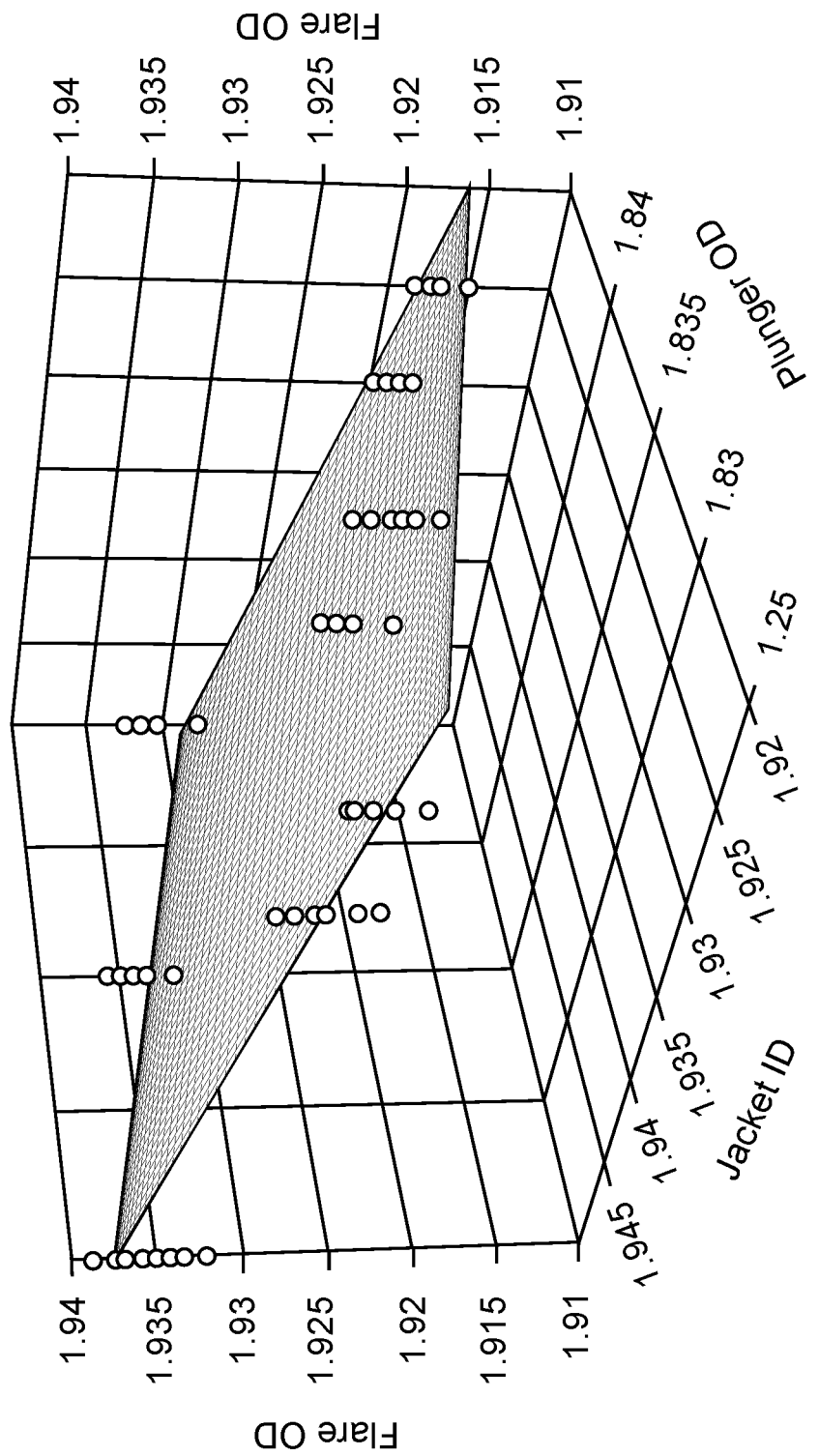
FIG. 10B is a three dimensional graph showing a flare diameter as a function of an inner diameter of a pressure jacket and an outer diameter of a piston of a syringe rolling apparatus.

With reference to FIGS. 10A-10B, a relationship between an inner diameter of the pressure jacket (in inches) and an outer diameter of the piston (in inches) is graphically shown as a 3D surface equation showing a breakaway force (in pounds) required to unroll a rolled syringe (FIG. 10A) and a flare outer diameter (in inches) that results from the combination of the pressure jacket inner diameter and the piston outer diameter (FIG. 10B). With reference to FIG. 10A, the breakaway force as a function of an inner diameter of the pressure jacket and an outer diameter of the piston can be characterized by the following equation $Z=A+CX+CY$, where $A=-283.26$, $B=511.19$, and $C=-270.71$. With reference to FIG. 10B, the outer diameter of the flare as a function of an inner diameter of the pressure jacket and outer diameter of the piston can be characterized by equation $Z=A+CX+CY$, where $A=1.96$, $B=-0.44$, and $C=0.41$.

Figure 11:
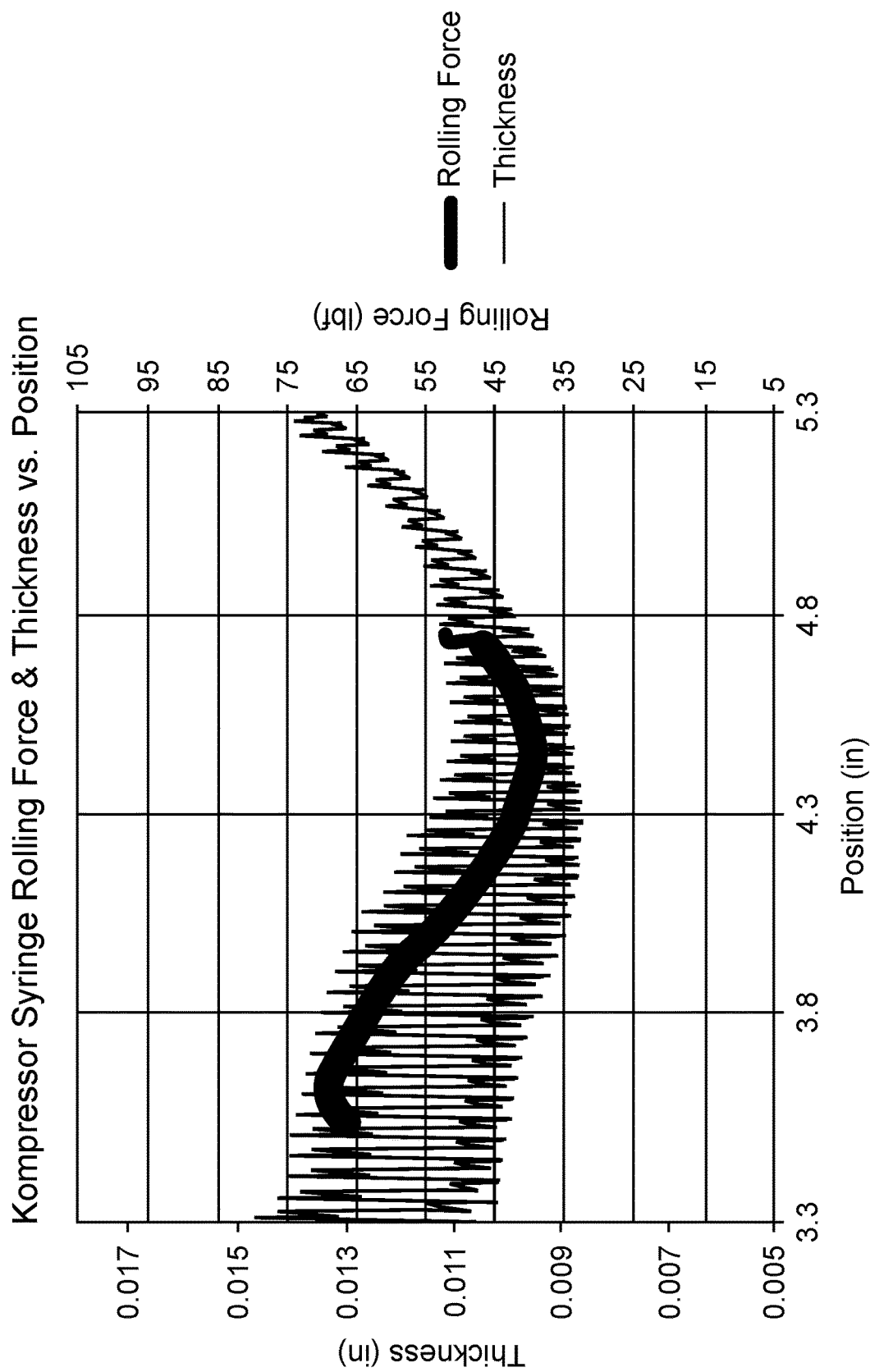
FIG. 11 is a graph showing an effect of sidewall thickness and position on the rolling force.

In some examples or aspects, thicker portions of the sidewall 20 in the transition zones 26 adjacent to the proximal and distal ends 16, 12 of the syringe 10 (see FIG. 1B) may increase the rolling force necessary to roll the syringe 10. As shown in FIG. 11, the rolling force changes during movement of the piston of the syringe rolling apparatus. In the areas of the transition zones 26, such as the transition zone 26 at the proximal end 16 of the syringe 10, the rolling force may increase significantly compared to the rolling force necessary to roll over the middle portion of the sidewall 20.

While various examples or aspects of a rolling diaphragm syringe, a rolling apparatus for rolling a rolling diaphragm syringe from an unrolled state to a rolled state, and method of rolling the rolling diaphragm syringe/container were provided in the foregoing description, those skilled in the art may make modifications and alterations to these examples or aspects without departing from the scope and spirit of the disclosure. Accordingly, the foregoing description is intended to be illustrative rather than restrictive. The disclosure described hereinabove is defined by the appended claims and all changes to the disclosure that fall within the meaning and the range of equivalency of the claims are to be embraced within their scope.

What is claimed is:

1. A method for rolling of a rolling diaphragm syringe from an empty, unrolled state to a rolled state, the method comprising:
   advancing a piston of a rolling apparatus to engage an end wall of the rolling diaphragm syringe in the empty, unrolled state, wherein the rolling diaphragm syringe comprises a proximal end comprising the end wall configured to engage the piston of the rolling apparatus, an open distal end comprising a discharge neck, and a flexible sidewall extending between the proximal end and the open distal end along a longitudinal axis;
   pressurizing an interior of the rolling diaphragm syringe in the empty, unrolled state to a first pressure by applying a pressurized gas through the open distal end of the rolling diaphragm syringe into the interior thereof;
   after the rolling diaphragm syringe is pressurized, further advancing the piston, thereby causing at least a portion of the flexible sidewall of the rolling diaphragm syringe to roll upon itself in a radially inward direction, thereby forming the rolling diaphragm syringe in the rolled state; and releasing an amount of the pressurized gas from the interior of the rolling diaphragm syringe during the further advancing of the piston of the rolling apparatus to maintain the first pressure in the interior of the rolling diaphragm syringe.

2. The method of claim 1, further comprising retracting the piston of the rolling apparatus from the end wall; and
maintaining the interior of the rolling diaphragm syringe at the first pressure during retracting of the piston of the rolling apparatus to unroll the rolling diaphragm syringe from the rolled state to the unrolled state.

3. The method of claim 2, further comprising:
advancing the piston of the rolling apparatus to reengage the end wall;
pressurizing the interior of the rolling diaphragm syringe to a second pressure higher than the first pressure;
further advancing the piston, thereby causing at least the portion of the flexible sidewall of the rolling diaphragm syringe to roll upon itself in the radially inward direction;
depressurizing the interior of the rolling diaphragm syringe; and
disengaging and retracting the piston of the rolling apparatus, thereby forming a rolling diaphragm syringe in the rolled state,
wherein, during further advancing of the piston, a material of at least the portion of the rolled flexible sidewall is plastically deformed.

4. The method of claim 1, further comprising placing the rolling diaphragm syringe in a pressure jacket associated with the rolling apparatus, wherein pressurizing the interior of the rolling diaphragm syringe to the first pressure causes at least a portion of the flexible sidewall of the rolling diaphragm syringe to expand radially outward to contact an inner sidewall of the pressure jacket.

5. The method of claim 4, wherein the first pressure ranges from about 80 psi to about 100 psi.

6. The method of claim 3, wherein the second pressure ranges from about 300 psi to about 350 psi.

7. The method of claim 1, further comprising heating at least a portion of the flexible sidewall of the rolling diaphragm syringe.

8. The method of claim 1, further comprising measuring at least one physical characteristic of the rolling diaphragm syringe using a measurement device.

9. The method of claim 1, wherein the proximal end of the rolling diaphragm syringe comprises an annular portion extending proximally from a periphery of the end wall having a substantially cylindrical sidewall and an outwardly flared portion extending radially and distally from the substantially cylindrical sidewall to the flexible sidewall of the rolling diaphragm syringe.

10. The method of claim 1, wherein during further advancing the piston to roll the flexible sidewall, a rolled inner surface of the flexible sidewall is free from contact with an unrolled inner surface of an unrolled portion of the flexible sidewall.

11. The method of claim 1, further comprising applying a surface texture feature or a pattern on an inner surface of the rolled portion of the flexible sidewall of the rolling diaphragm syringe via contact with an outer surface of the piston of the rolling apparatus during the further advancing of the piston, wherein the piston has the surface texture feature or the pattern.

* * * * *